(12) United States Patent
Powell

(10) Patent No.: US 6,990,906 B2
(45) Date of Patent: Jan. 31, 2006

(54) ELECTRICAL POWER STORAGE AND DELIVERY USING MAGNETIC LEVITATION TECHNOLOGY

(76) Inventor: James Russell Powell, Box 547, Shoreham, NY (US) 11786

( * ) Notice: Subject to any disclaimer, the term of this patent is extended or adjusted under 35 U.S.C. 154(b) by 0 days.

(21) Appl. No.: 10/473,314

(22) PCT Filed: Mar. 22, 2002

(86) PCT No.: PCT/US02/08768

§ 371 (c)(1),
(2), (4) Date: Feb. 9, 2004

(87) PCT Pub. No.: WO02/076782

PCT Pub. Date: Oct. 3, 2002

(65) Prior Publication Data

US 2004/0112247 A1    Jun. 17, 2004

Related U.S. Application Data

(60) Provisional application No. 60/279,142, filed on Mar. 26, 2001.

(51) Int. Cl.
*B60L 13/00* (2006.01)
(52) U.S. Cl. ......................... 104/281; 105/35
(58) Field of Classification Search .............. 105/35; 246/245; 104/281, 282, 127, 289
See application file for complete search history.

(56) References Cited

U.S. PATENT DOCUMENTS

| 1,216,694 | A | * | 2/1917 | Jenkins ...................... 104/289 |
| 3,965,064 | A | * | 6/1976 | Mercier et al. .......... 104/138.1 |
| 6,152,045 | A | * | 11/2000 | Powell et al. ............... 104/281 |

* cited by examiner

*Primary Examiner*—Mark T. Le
(74) *Attorney, Agent, or Firm*—Fulwider Patton Lee & Utecht, LLP

(57) ABSTRACT

One or more magnetic levitation vehicles are provided to transport a storage mass over a magnetic levitation guideway extending between an elevated upper end and a lower end at a lower elevation, and including a plurality of magnetic propulsion windings. Movement of a magnetic levitation vehicle with the storage mass along the magnetic levitation guideway from the elevated upper end to the lower end generates electrical energy through the propulsion windings of the magnetic levitation guideway. The magnetic levitation vehicle with a storage mass can be propelled from the lower end to the upper end of the magnetic levitation guideway, where the storage mass is unloaded to store gravitational potential energy. The magnetic levitation vehicle and storage mass can then be moved to the lower end of the magnetic levitation guideway to convert the stored gravitational potential energy to electrical power. The magnetic levitation guideway can be an inclined guideway or a vertically oriented guideway, can be a surface guideway, can be disposed in a sub-surface tunnel, or can be a combination of a surface guideway and a sub-surface tunnel.

12 Claims, 39 Drawing Sheets

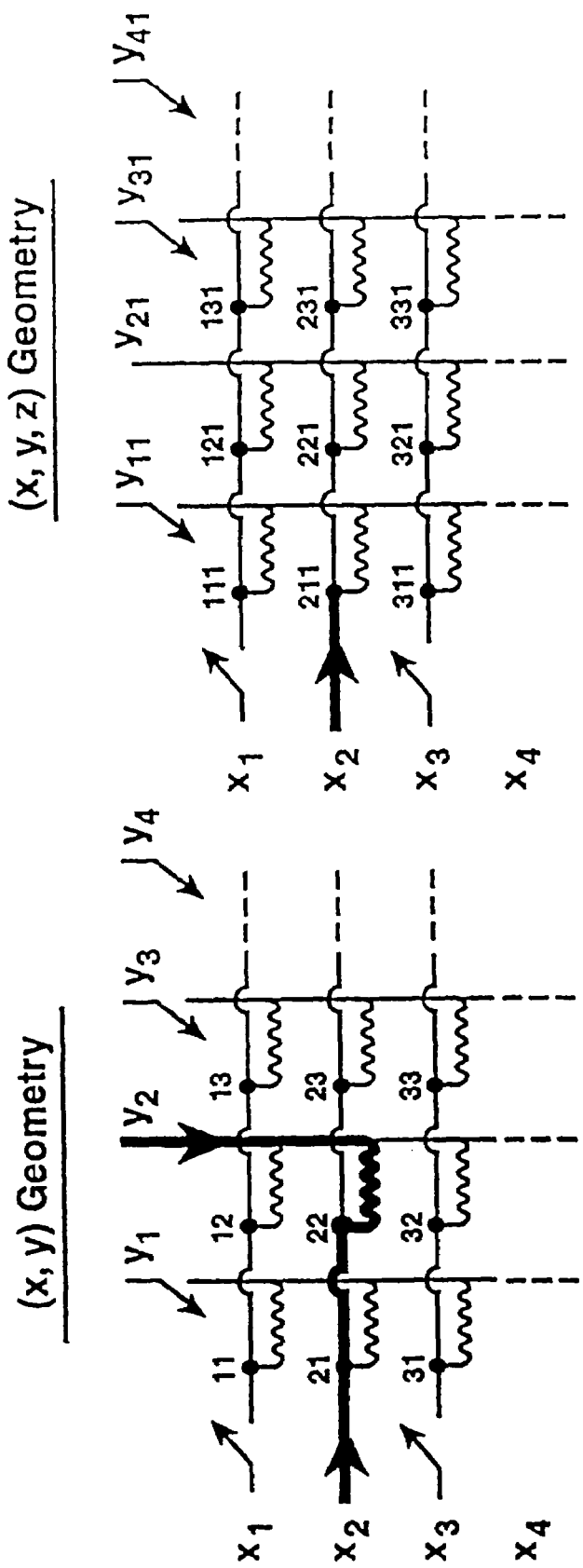

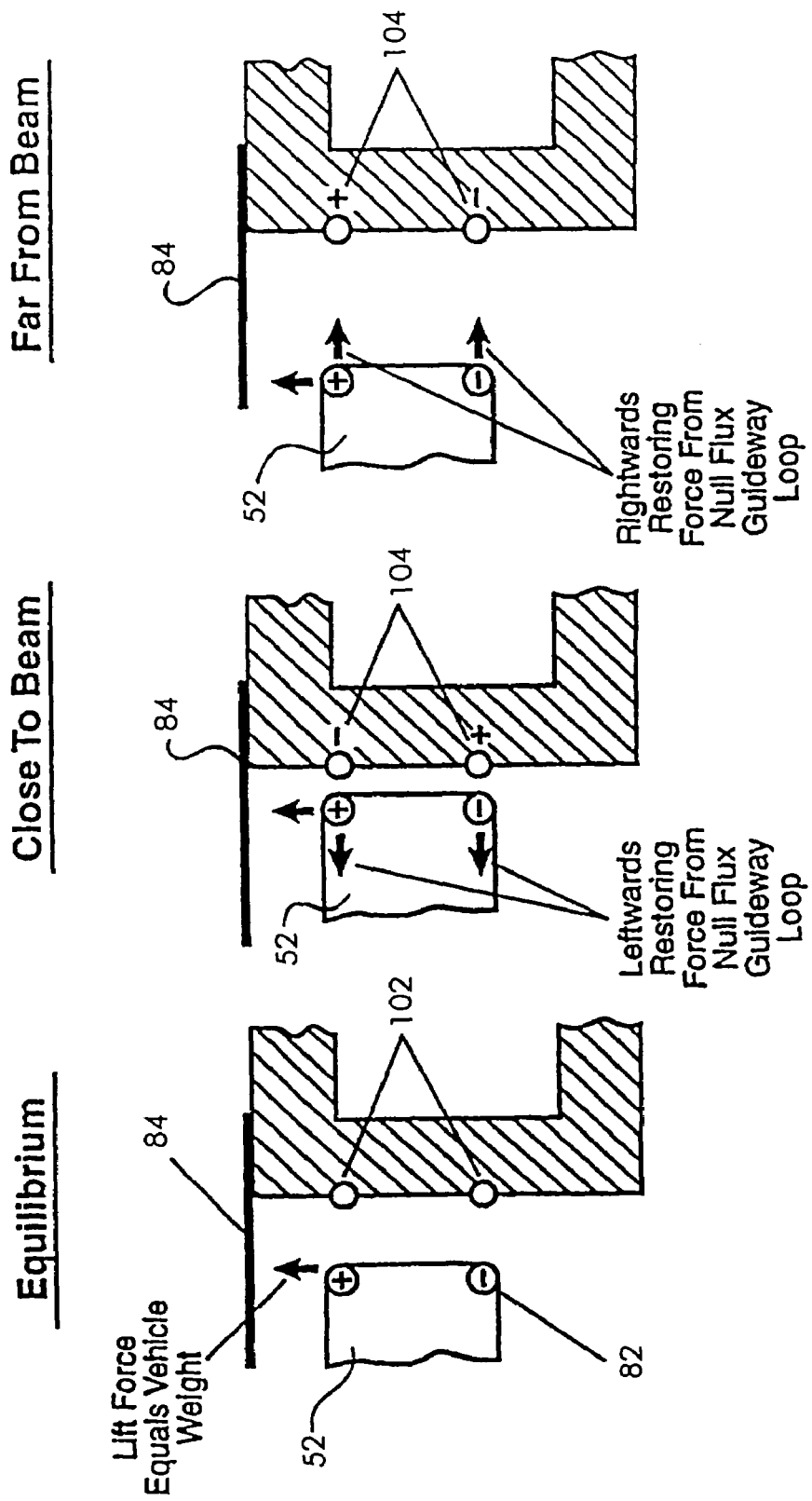

11 and 33 Are Guideway Dipole Loops
2222 and 4444 Are Guideway Figure Of 8 Loops 11 and 33 Are Guideway Dipole Loops
2222 and 4444 Are Guideway Figure Of 8 Loops

ELECTRICAL POWER STORAGE AND DELIVERY USING MAGNETIC LEVITATION TECHNOLOGY

This is a National Phase Application in the United States of America of International Application PCT/US02/08768 filed 22 Mar., 2002, which claims priority from U.S. provisional application Ser. No. 60/279,142 filed Mar. 26, 2001.

BACKGROUND OF THE INVENTION

This invention relates generally to a magnetic levitation vehicle system, and more particularly concerns a system for electrical power storage and delivery by a maglev vehicle such as a maglev train.

The demand for electric power from regional power grids is not constant, but varies substantially with time. Typically, power demand is low during the night time, increasing substantially during the day, as illustrated in FIG. 1. Much of the time, electrical grids experience two distinct peak demand periods, the first in the morning and the second in the afternoon. Power demand also varies considerably with the day of the week, being higher during the Monday to Friday period, and lower on weekends. It also varies considerably with the seasons, with the summer demand usually being substantially higher than during the rest of the year.

It would be expensive, and technically difficult to have coal and nuclear power plants go up and down in power output to meet the fluctuating load demand. Instead, peaking power is generally supplied either from combustion fired low capital cost units (e.g., turbines or combined cycle plants), or from energy storage units that take in surplus power from baseload plants during low power demand periods and return it to the grid during high demand periods. Presently, spinning reserve is provided by keeping expensive generator units hot and ready to generate large blocks of power in a very short notice.

FIG. 2 shows the current leading conventional options for peaking power. Of the present energy storage options, only pumped hydroelectric power (pumped hydro) is used to any extent. Batteries, flywheels, and superconducting energy storage (SMES) are too expensive to be practical. While pumped hydro can be practical in terms of cost, its environmental and siting problems severely constrain its usefulness.

Existing technologies for electrical power storage, such as batteries, flywheels, and superconducting energy storage (SMES) are generally too expensive and difficult, or too limited in siting, such as pumped hydro. To be useful, the great majority of peak power demand is supplied by fossil fueled peaking power plants—e.g., gas turbine—or by purchase from distant power grids. Such power generating units generally use oil or natural gas fuel. In fact, many units are designed so that they can burn either fuel, and switch back or forth depending on which is cheaper at a given point in time. The long term outlook for oil and natural gas prices is a continual increase, which will cause further hikes in the cost of peak power.

The cost of supplying peaking power can be high. For California in August of 2000, peak prices of about $500 per MWH (50 cents per KWH) were paid during this period, prior to a state cap of about $250 per MWH (25 cents per KWH) imposed on Aug. 17, 2000. The peak cost is a factor of 10 greater than the minimum cost, which would apply during low demand periods, e.g., night time. This large differential, and the high cost of peak power, provides a major opportunity for a low cost energy storage system. By buying low cost power at night storing it, and delivering it during the day at peak power rates, a low cost storage system could be more efficient and economical. An energy storage system that could store large amounts of electric power for a few cents per KWH would enable cost savings of hundreds of billions of dollars annually over the world.

The cost of wind generation of electricity was once seen as prohibitive, but is now becoming more competitive. Wind generation of electricity produces no emissions, is renewable, and is one of the cleanest sources of electricity. The same is true for solar generation of electricity. However, until an adequate electrical power storage technology can be developed, utilities can not rely on wind or solar generated electricity for peaking power requirements. While wind and solar generation of electricity account for a small fraction of the nation's electricity, and can be intermittent and unpredictable, with an adequate electrical power storage technology, wind and solar energy could be used to generate electrical power that could be stored for introduction into the power grid as needed. It thus would be desirable to provide a new energy storage technology that can provide a low cost, near term method of storing large amounts of electrical energy and delivering it rapidly and in the amounts needed to the grid. The present invention addresses these and other needs.

SUMMARY OF THE INVENTION

Briefly, and in general terms, the present invention provides for a system and method for generation of electrical energy, in which at least one magnetic levitation vehicle is provided to transport a storage mass, and a magnetic levitation guideway is provided for the at least one magnetic levitation vehicle. The magnetic levitation guideway extends between an elevated upper end and a lower end at a lower elevation, and includes a plurality of magnetic propulsion windings for propulsion of the at least one magnetic levitation vehicle. Movement of the at least one magnetic levitation vehicle along the magnetic levitation guideway from the elevated upper end of the magnetic levitation guideway to the lower end of the magnetic levitation guideway generates electrical energy through the propulsion windings of the magnetic levitation guideway.

The present invention also provides for a system and method for storage and generation of electrical energy, in which at least one magnetic levitation vehicle is provided, and a magnetic levitation guideway is provided for the at least one magnetic levitation vehicle. The magnetic levitation guideway extends between an elevated upper end and a lower end at a lower elevation, and includes a plurality of magnetic propulsion windings for propulsion of the at least one magnetic levitation vehicle. At least one storage mass is loaded on the at least one magnetic levitation vehicle at the lower end of the magnetic levitation guideway, and the at least one magnetic levitation vehicle is propelled with the at least one storage mass from the lower end of the magnetic levitation guideway to the upper end of the magnetic levitation guideway. The at least one storage mass is unloaded from the at least one magnetic levitation vehicle at the upper end of the magnetic levitation guideway to store gravitational potential energy. The at least one magnetic levitation vehicle can then be moved as desired from the elevated upper end of the magnetic levitation guideway to the lower end of the magnetic levitation guideway to convert the stored gravitational potential energy to electrical power through the propulsion windings of the magnetic levitation guideway.

In one currently preferred embodiment, the magnetic levitation guideway is an inclined guideway, and in another presently preferred embodiment, the magnetic levitation guideway is a vertically oriented guideway. The magnetic levitation guideway can be a surface guideway, can be disposed in a sub-surface tunnel, or can be a combination of a surface guideway and a sub-surface tunnel.

The system of the invention for electrical power storage and delivery is very flexible and can rapidly alter its power level by changing the rate at which the storage masses are moved up or down the guideway. For example, the power level for the system of the invention for electrical power storage and delivery could go from zero to 100% of full capability, or from 100% to zero, in less than one minute. The storage masses can be rapidly moved onto a maglev vehicle or off the vehicle for storage using an overhead trolley-wheel or surface rollway system. Peak power capabilities of about 1000 MW(e) can be generated using the system of the invention for electrical power storage and delivery. Because of its rapid response capability, in addition to providing peak power, the system of the invention for electrical power storage and delivery could also be used for low cost spinning reserve.

The much steeper grades for the system of the invention for electrical power storage and delivery (45 degrees or more, versus a maximum of about 10 degrees for passenger/freight transport), together with the considerably heavier vehicles (about 100 tons vs a maximum of about 50 tons for freight transport) necessitates much greater propulsion forces, i.e., a factor of 10 or more. The above requirements, coupled with the heavier loads and much shorter vehicles (about 6 meters for the system of the invention for electrical power storage and delivery, vs about 30 meters for passenger/freight vehicles) are accommodated by a magnet configuration which maximizes propulsion force relative to power ($I^2R$) losses in the propulsive winding. The propulsion winding/vehicle combination can operate with a pure sine wave 60 Hertz input in the motor mode, and can deliver a pure sine wave 60 Hertz output in the generator mode. Alternatively, conventional AC/DC power conversion equipment can be used to have the propulsion winding vehicle system operate at a different frequency than the 60 Hertz external power grid and still allow it to receive and deliver power to the grid as required.

In addition to its economic benefits, the system of the invention for electrical power storage and delivery is very attractive in terms of the environment. It has minimal impact on the environment, and can be sited virtually anywhere. Moreover, because it has very low cost, and can store large amounts of energy, it is a very attractive partner for solar and/or wind power, since it can deliver reliable power to the grid when the solar or wind plants are not operating. The system of the invention for electrical power storage and delivery would eliminate the need for expensive, fossil fuel burning power plants that normally would be necessary to supply backup power to the grid whenever the sunlight or wind generated power could not meet demand—i.e., during the night time or cloudy days, or when the wind stopped.

Most facilities for the system of the invention for electrical power storage and delivery would be sited in remote areas and would not impact the environment. The total land use for a 2000 MWH facility, including a dual 3 km long guideway, is only about 20 acres. The small land footprint and absence of environmental problems, together with its low storage cost, make the system of the invention for electrical power storage and delivery very attractive for peaking power and spinning reserve applications, in substitution for conventional peaking power plants that burn fossil fuels and produce pollution. The system is completely non-polluting and environmentally benign. At the design speed of 130 mph, the vehicles would be virtually silent, with aerodynamic noise below ambient levels, should make it possible to obtain permits and site approval very quickly and easily. Furthermore, since the maglev guideway would not carry passengers, safety certification would be considerably easier.

The system of the invention for electrical power storage and delivery is very attractive for near term peaking power needs. It is even more attractive for low cost energy storage used in conjunction with solar and wind power generation. Combined with the system of the invention for electrical power storage and delivery, however, solar and wind sources can deliver steady, reliable power that meets variations in load demand. The system of the invention for electrical power storage and delivery would fit in very well with a natural gas fired power economy, allowing the natural gas plants to operate close to full time during the year, with low cost energy storage provided by the system of the invention providing peak power.

These and other aspects and advantages of the invention will become apparent from the following detailed description and the accompanying drawings, which illustrate by way of example the features of the invention.

BRIEF DESCRIPTION OF THE DRAWINGS

FIG. 23 is a schematic diagram of (x, y) switch geometry for the system of the invention for electrical power storage and delivery.

FIG. 24 is a schematic diagram of (x, y, z) switch geometry for the system of the invention for electrical power storage and delivery.

FIGS. 27A, B and C illustrate the guideway loop panel layout for lateral stability of the energy storage vehicle of the invention, at lateral equilibrium, close to the guideway beam, and far from the guideway beam.

DETAILED DESCRIPTION OF THE PREFERRED EMBODIMENTS

Figure 1:
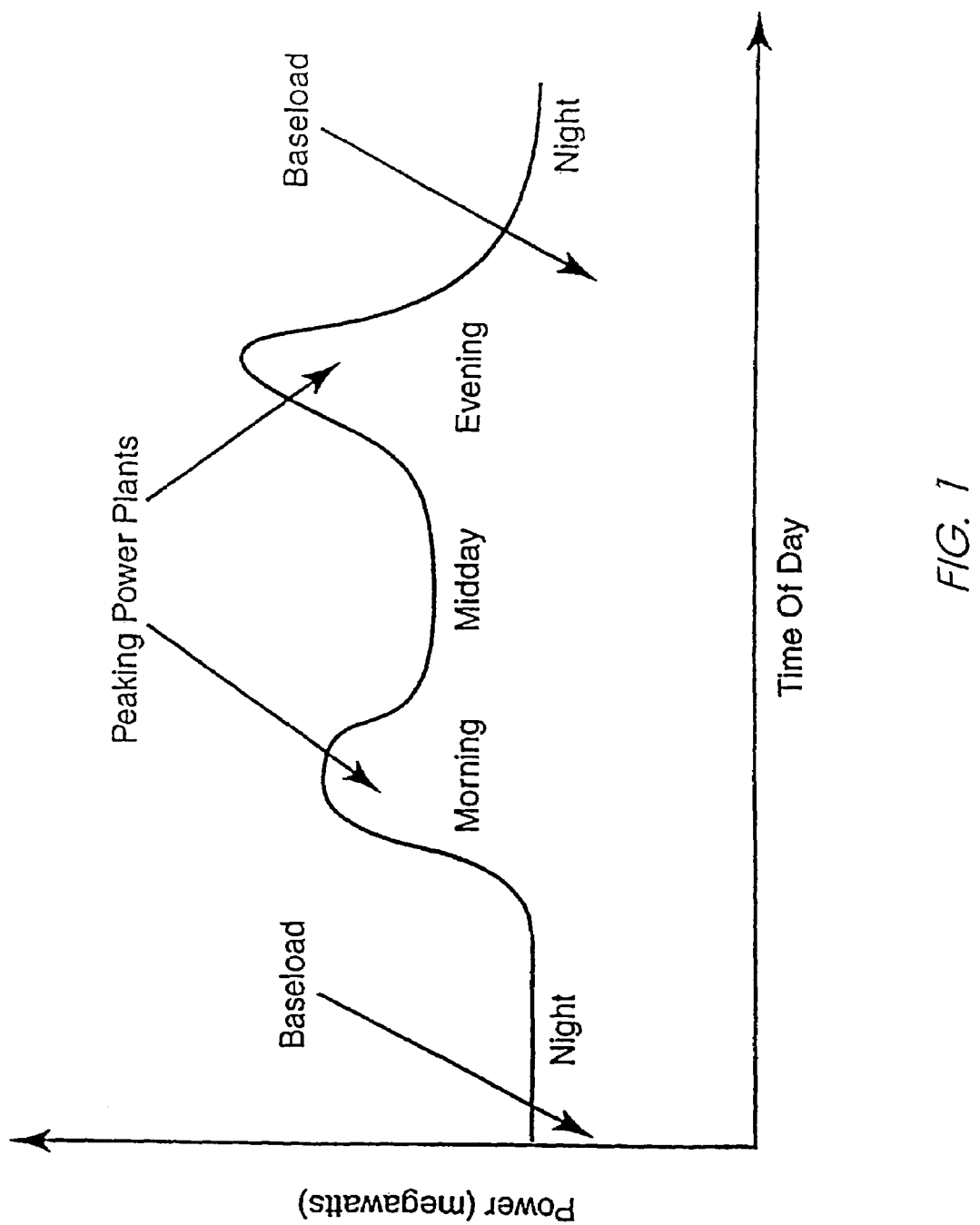
FIG. 1 is a chart illustrating the typical power peaking periods on electrical grids.
Figure 2:
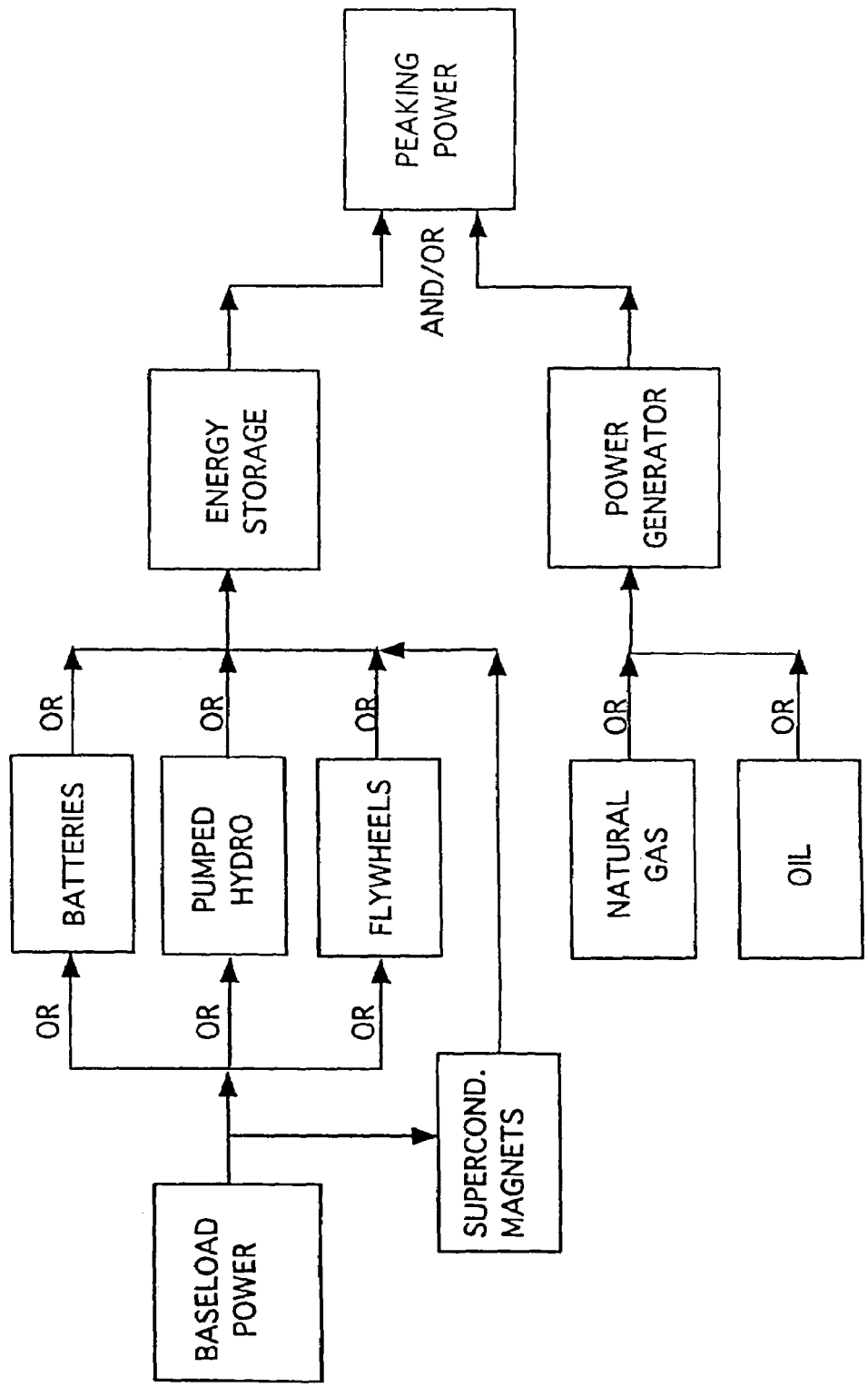
FIG. 2 is a chart illustrating the principal options for providing peaking power requirements.

As is illustrated in the drawings, the invention is embodied in a new approach for the storage and rapid delivery of electric power, based on maglev technology. This new system of the invention for electrical power storage and delivery utilizes maglev vehicles to lift storage masses distances such as a kilometer or more in altitude. In doing so, a large amount of electrical energy is drawn out of the power grid and stored as gravitational potential energy. Raising a 100 ton mass two kilometers in altitude, for example, stores 0.5 MWH of energy.

Figure 3:
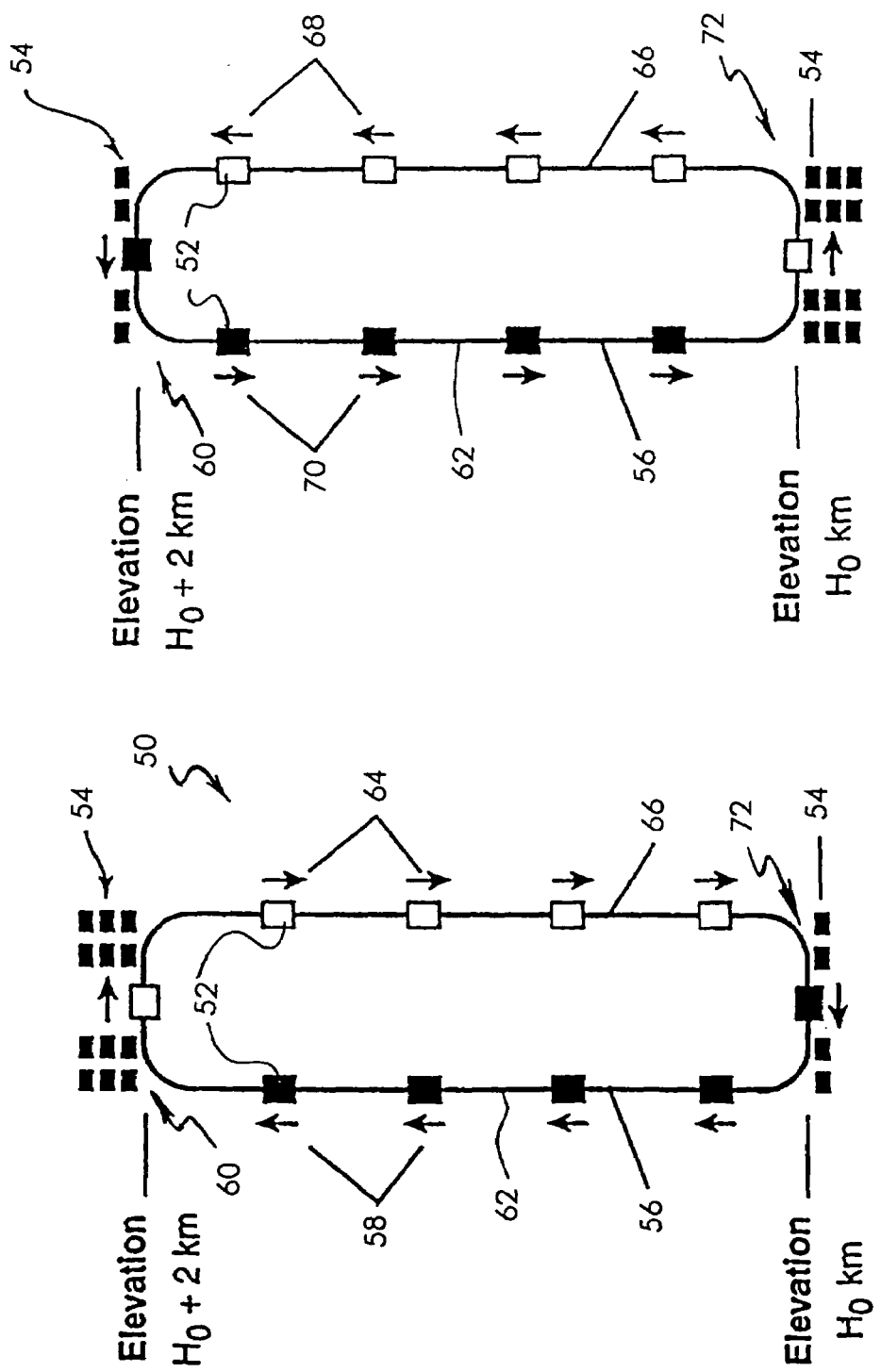
FIG. 3A is a schematic diagram of the energy storage mode of the system of the invention for electrical power storage and delivery.
FIG. 3B is a schematic diagram of the power generation mode of the system of the invention for electrical power storage and delivery.

A 100 meter×600 meter long (6 acres) storage facility could handle and deliver 2000 storage masses, equivalent to 1000 MWH of electrical energy. Overall energy efficiency, output electrical energy/input electrical energy, would be well above 90%—much higher than any other electrical storage technology. Facilities for the system of the invention for electrical power storage and delivery could be erected in a short time, e.g., 3 years or less, to meet increasing peak power demands. Raising 2000 such masses would store 1000 MWH of energy, which would be returned to the power grid at appropriate times by simply transporting the masses down to a lower altitude. During periods of electrical storage, a maglev vehicle would carry masses up to a higher altitude storage facility, with the vehicle operating in the motor mode as shown in FIGS. 3A and 3B, showing schematic diagrams of the concept of the system of the invention for electrical power storage and delivery. During periods of electrical power delivery, the storage masses would be carried down to lower altitude, with the vehicle operating in the generator mode.

As is illustrated in FIGS. 3A and 3B, in one presently preferred embodiment of the electrical power storage and delivery system 50 according to the invention, maglev vehicles 52 transport heavy storage masses 54, such as 100 ton unit masses, for example, between the upper and lower ends of an inclined guideway 56. In the storage mode illustrated in FIG. 3A, electrical energy is taken from the grid to propel loaded vehicles 58 carrying the storage masses uphill. These masses are unloaded at the upper end 60 of the heavyweight section 62 of the guideway, and the unloaded vehicles 64 return on the lightweight downhill section 66 of the two way guideway 56. When it is desired to deliver electrical energy back into the grid, the direction of vehicle movement on the guideway is reversed, as shown in FIG. 3B, and the empty vehicles 68 are loaded with the storage masses positioned at the upper end of the guideway. The loaded vehicles 70 then transport the storage masses down to the lower end 72 of the guideway where the masses are unloaded and positioned until the next energy storage period starts.

The electrical energy fed into the grid comes from the gravitational potential energy of the masses stored at the upper end of the guideway. The maglev propulsion windings on the guideway, which acted as an electric motor during the energy storage phase, now act as an electric generator, converting the gravitational potential energy to electrical power.

The system of the invention for electrical power storage and delivery is the mechanical analogue of pumped hydro energy storage, using blocks of solid material rather than streams of water. It has a number of important advantages over pumped hydro:

1. The system of the invention for electrical power storage and delivery can be sited in a much wider range of locations.
2. The system of the invention for electrical power storage and delivery can utilize a much greater change in elevation, i.e., thousands of feet instead of hundreds of feet. The pressure changes over 6000 feet of elevation change with pumped hydro, for example would be extremely large, on the order of 3000 psi. It would be very difficult to build an efficient, low cost pumped hydro unit under such conditions.
3. The system of the invention for electrical power storage and delivery has a much smaller footprint, and much less environmental impact, than pumped hydro.
4. The system of the invention for electrical power storage and delivery has a much greater overall efficiency (electrical output/electrical input) than pumped hydro. The system of the invention for electrical power storage and delivery can achieve overall efficiencies approaching 100%.
5. The system of the invention for electrical power storage and delivery can respond very rapidly to fluctuations in load demand, and be efficient over a wide range of power inputs and outputs.
6. The system of the invention for electrical power storage and delivery is very attractive in combination with solar and wind power.
7. The cost of energy storage for the system of the invention for electrical power storage and delivery will be low, compared to other systems.

The total energy delivered is determined by the number of storage masses carried up and down, while the power delivered is determined by the rate at which they are carried.

Figure 4:
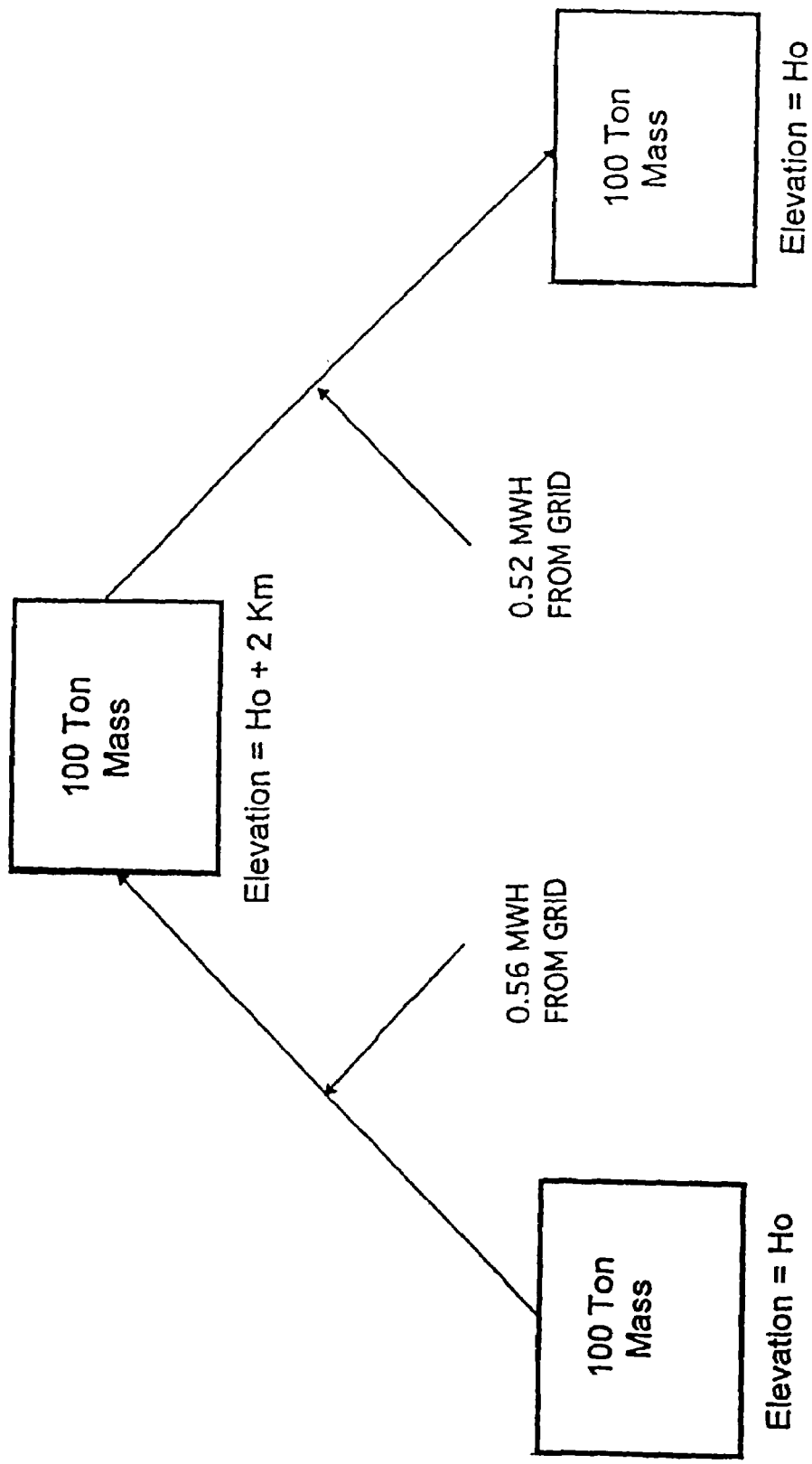
FIG. 4 is a schematic diagram illustrating the amount of energy that can be stored by raising a 100 ton mass to a 2000 meter change in elevation, according to the system of the invention for electrical power storage and delivery.

FIG. 4 illustrates the amount of energy that can be stored by raising a 100 ton mass—a representative load for a vehicle for use in the system of the invention for electrical power storage and delivery—for a 2000 meter change in elevation. Taking electrical inefficiencies into account, the system of the invention for electrical power storage and delivery would draw about 0.56 MWH from the grid in the storage mode and return about 0.52 to it in the power delivery mode.

Figure 5:
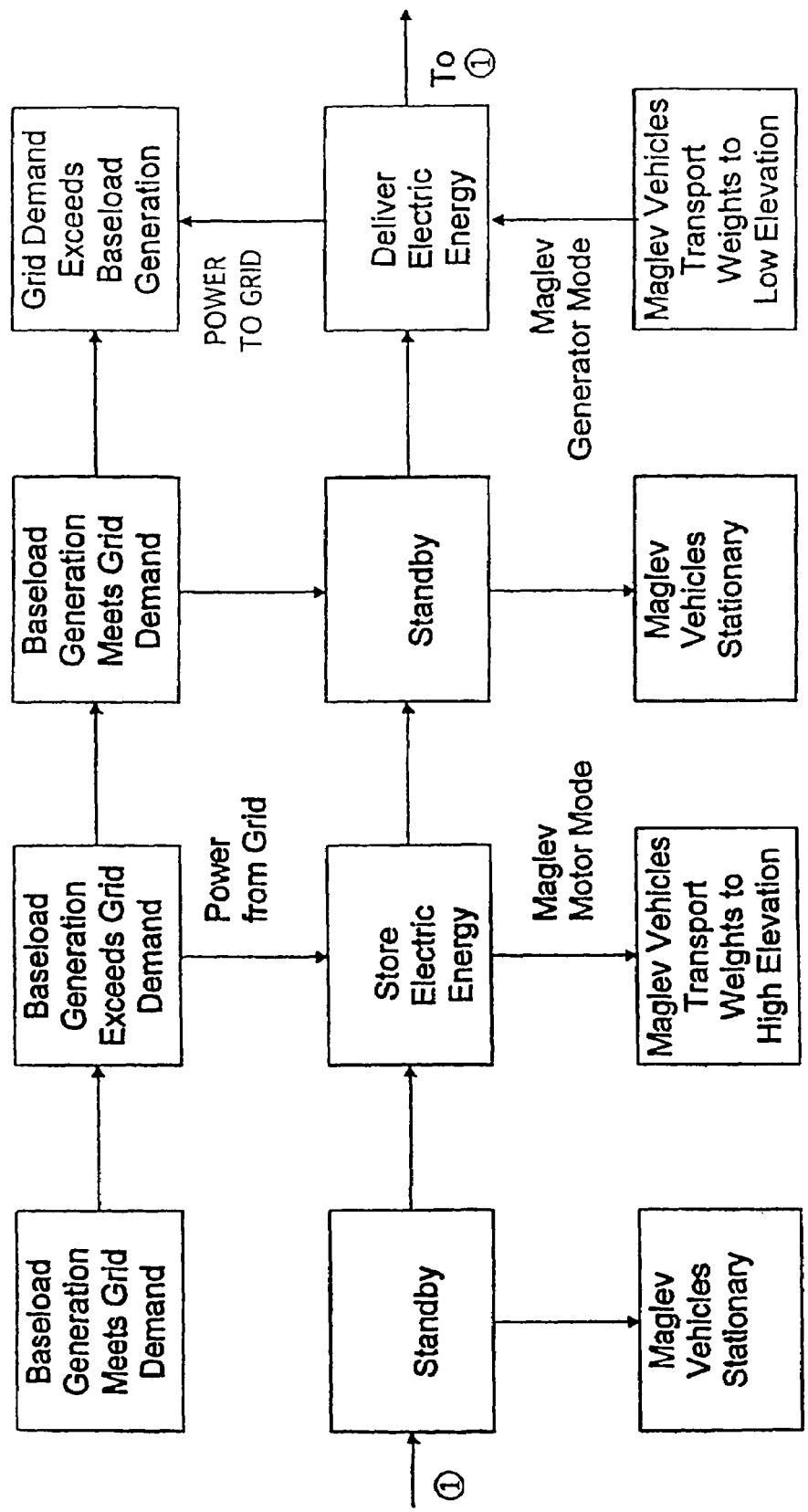
FIG. 5 is an operational flowsheet for the system of the invention for electrical power storage and delivery.

FIG. 5 shows the operational flowsheet for the system of the invention for electrical power storage and delivery. The system of the invention for electrical power storage and delivery is extremely flexible. It can accept power from the grid at any time, and deliver it at any time. Moreover, it can standby for an indefinite period without loss of energy and energy delivery capability. It can start up or shutdown in a very short time, under a minute with no operational problems. It can also change the rate at which it accepts or delivers power in a very short time.

Figure 6A:
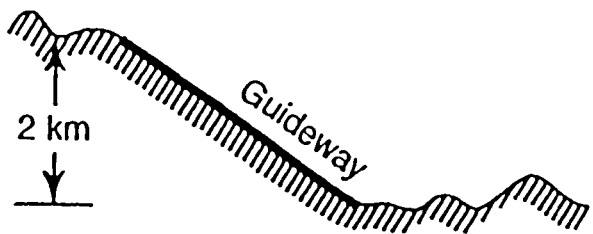
FIGS. 6A–6D illustrate the types of locations for a system for electrical power storage and delivery according to the present invention.
Figure 6B:
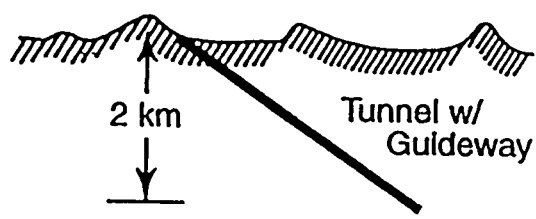
Figure 6C:
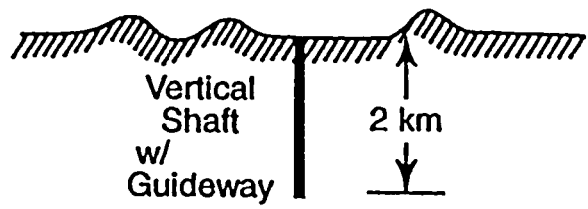
Figure 6D:
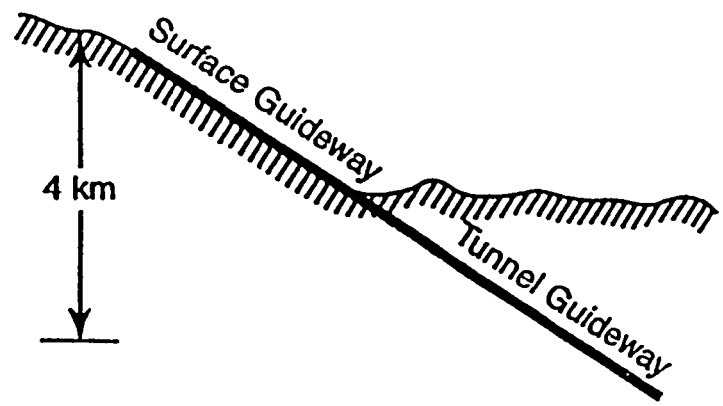

FIGS. 6A–6D illustrate the types of locations where a system according to the present invention could be sited. FIG. 6A illustrates a guideway located on a surface providing a natural elevation change. FIG. 6A illustrates a guideway located on a surface providing a natural elevation change. FIG. 6B illustrates a guideway located in a slanted tunnel. FIG. 6C illustrates a guideway located in a vertical mine shaft. FIG. 6D illustrates a guideway located on a natural surface elevation change and a slanted tunnel. In regions with elevated terrain, such as California, Washington, Oregon, the Southwest, Hawaii, Japan, France, Switzerland, and portions of Russia, China, India, and the like, inclined guideways could be used, with the incline angle being in the range from about 30 to 50 degrees. Elevation changes in these regions would probably range from about 1000 to 3000 meters. In flat plain type regions, such as Florida, the South East, Mid West, New York New Jersey, and portions of Europe, Russia, China, India, and the like, where elevation changes are generally below 1000 meters, the system of the invention for electrical power storage and delivery could be located in sub-surface tunnels. Tunnel depths of up to 2000 meters are readily achieved in underground mines and could be constructed in most of the world. These tunnels could be inclined or vertical shafts depending on the terrain. Finally, the system of the invention for electrical power storage and delivery could be located using a combination of an inclined, above—surface guideway and an inclined, sub-surface tunnel. Such a combination would provide a greater elevation change, e.g., 4000 meters instead of 2000 meters, and more energy storage capability per ton of mass weight.

There are substantial differences between a passenger/freight vehicle and a vehicle for energy storage:

1) Passenger/freight vehicles operate over a range of AC propulsion frequencies, not just the 60 Hertz value for the system of the invention for electrical power storage and delivery.
2) Vehicles used in the system of the invention for electrical power storage and delivery must climb steep grades making the propulsion force comparable to vehicle weight. In the passenger/freight application, the propulsive force is only about 10% of vehicle weight.
3) The weight per unit length of vehicle is much greater for vehicles used in the system of the invention for electrical power storage and delivery than for passenger/freight vehicles.

4) The speed of vehicles used in the system of the invention for electrical power storage and delivery is much less than passenger/freight vehicles.

Figure 7A:
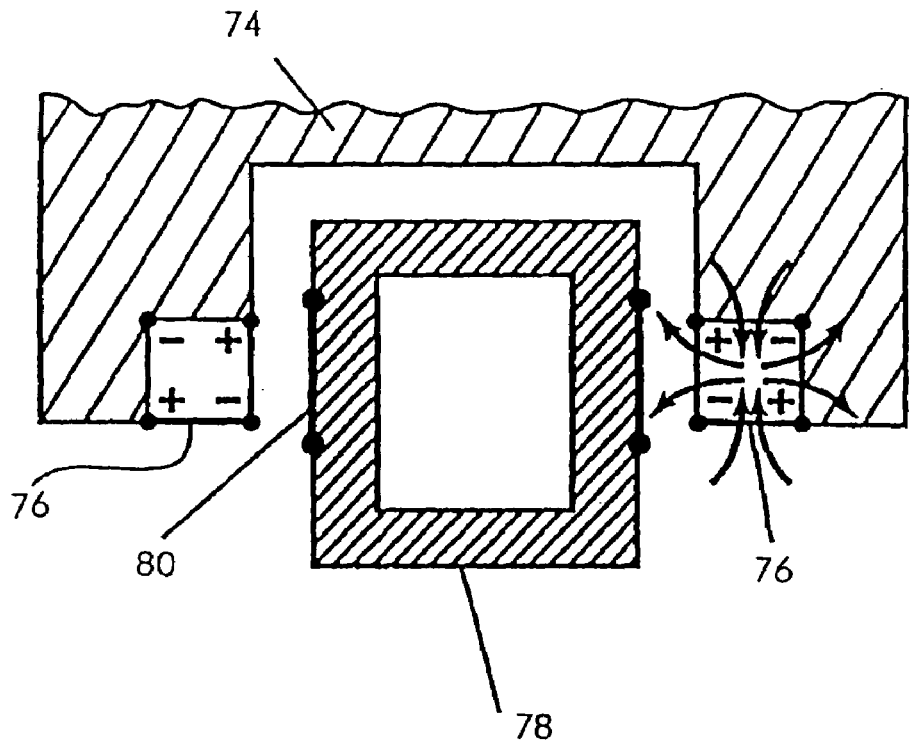
FIG. 7A shows an end view of a guideway beam with a typical propulsion loop/vehicle magnet configuration for a passenger/freight vehicle.
Figure 7B:
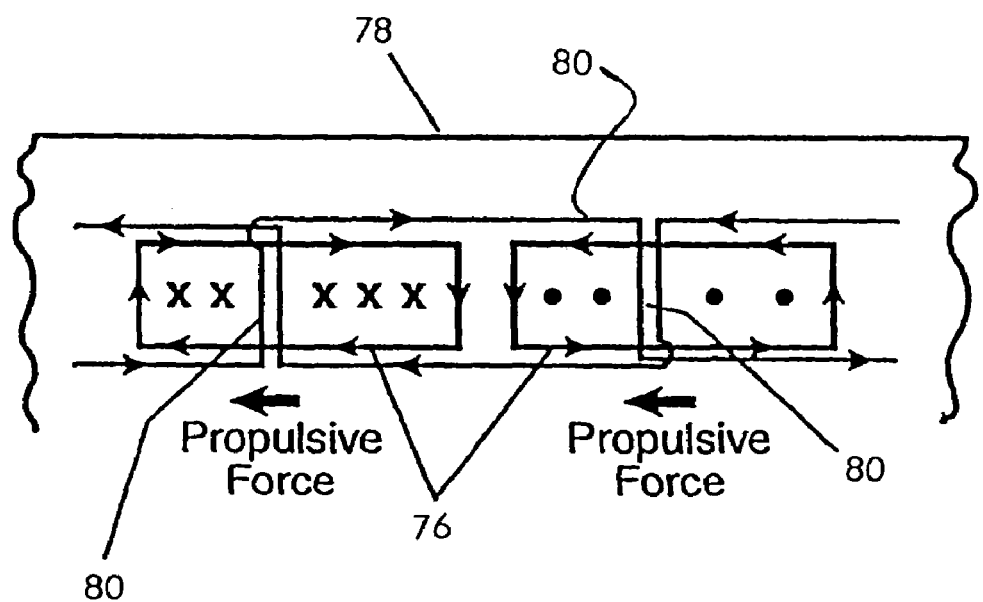
FIG. 7B shows a side view of a guideway beam with a typical propulsion loop/vehicle magnet configuration for a passenger/freight vehicle.

FIGS. 7A and 7B show a typical propulsion loop/vehicle magnet configuration for a passenger/freight vehicle 74 which typically carries vehicle quadrupole magnets 76. The guideway beam box 78 carries the guideway propulsion windings 80. The length/width ratio of the superconducting vehicle magnet loops is substantially greater than one. This is because the long sections of the vehicle superconducting and the guideway loops provide magnetic lift and stability forces, while the shorter width sections and cross-over windings of the vehicle and guideway loops provide the magnetic propulsive forces, which are small compared to the lift and stability forces.

Figure 8A:
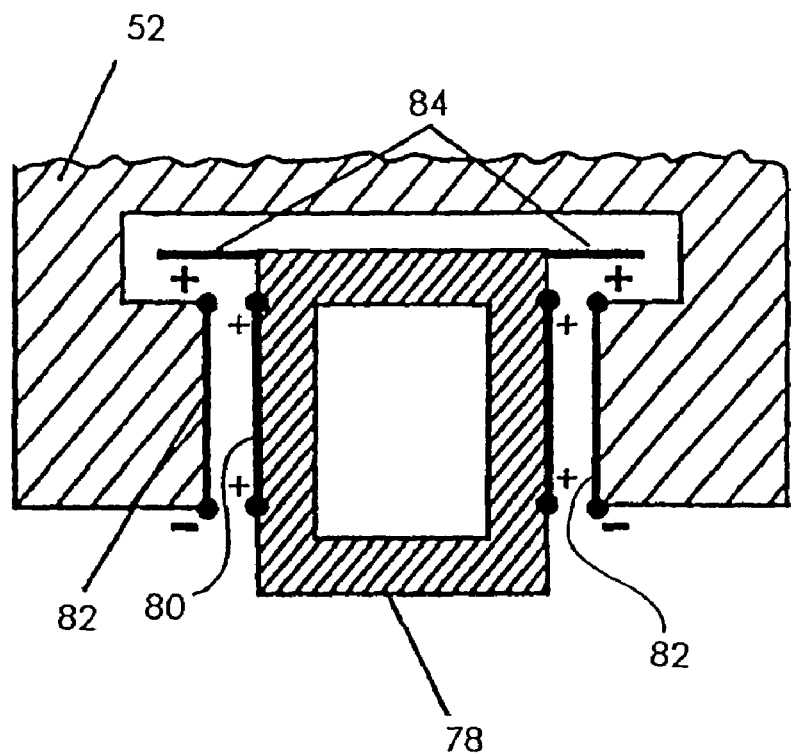
FIG. 8A shows an end view of a guideway beam with a typical propulsion loop/vehicle magnet configuration for an energy storage vehicle according to the system of the invention for electrical power storage and delivery.
Figure 8B:
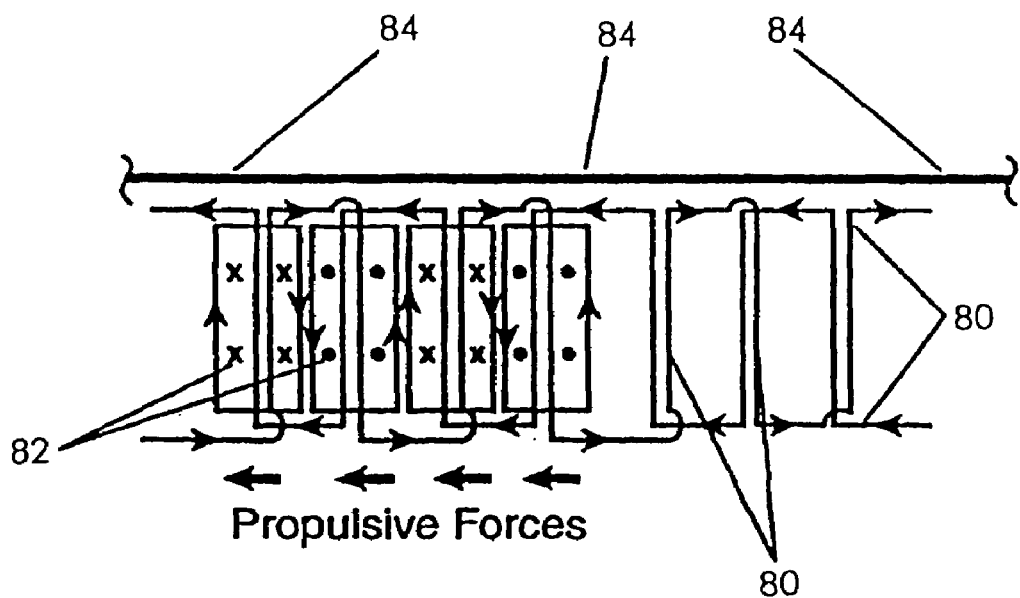
FIG. 8B shows a side view of a guideway beam with a typical propulsion loop/vehicle magnet configuration for an energy storage vehicle according to the system of the invention for electrical power storage and delivery.

The situation is different for the vehicles for use in the system of the invention for electrical power storage and delivery, as illustrated in FIGS. 8A and 8B. The vehicle 74 typically carries vehicle dipole loops 82, and the guideway beam box 78 may carry iron plates 84 to assist lift, in addition to the propulsion windings 80 (shown in FIG. 8B). Here the ratio of the loop length/loop width is substantially less than 1, in order to maximize the magnetic propulsive force, and to keep the magnet pitch relatively small so that 60 Hertz AC current can be used in the propulsion windings.

The maglev technology for energy storage has certain similarities to that for passenger and freight transport, but there are also important differences. These differences include:

1. much steeper grade for the energy storage guideway;
2. requirement for constant vehicle speed and constant grade for the energy storage guideway;
3. considerably greater vehicle loads for the energy storage guideway;
4. much shorter vehicle lengths for the energy storage guideway;
5. rapid loading and unloading of heavy storage masses from vehicles for the energy storage guideway; and
6. large ratio of load vehicle mass to unloaded vehicle mass for the energy storage guideway.

As a result of these differences, the design of the vehicle and guideway for use in the system of the invention for electrical power storage and delivery differs substantially from that for passenger and freight transport. First, the much steeper grades for the system according to the present invention (45 degrees or more, versus a maximum of about 10 degrees for passenger/freight transport), together with the considerably heavier vehicles (about 100 tons vs a maximum of about 50 tons for freight transport) necessitates much greater propulsion forces, i.e., a factor of 10 or more.

Second, passenger/freight maglev vehicles will operate over a range of speeds and grades on the guideway depending on local conditions. Their maglev propulsion systems can accommodate these varying conditions by changing the frequency and current delivered by the AC power in the propulsion windings.

In order to efficiently levitate the short heavy vehicle with minimum I²R losses, iron plates incorporated into the narrow beam guideway can assist the levitation force, with null flux loops used for stability and oscillation damping. Depending on system design, iron lift assistance may or may not be employed.

Figure 9A:
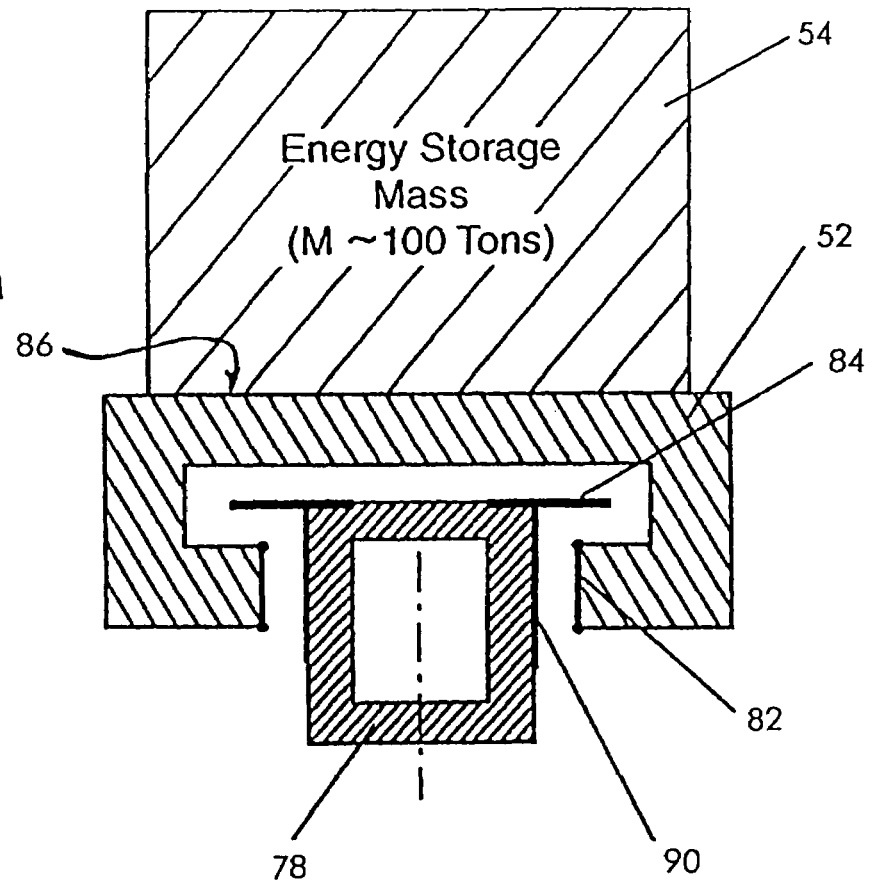
FIG. 9A shows an end view of an energy storage vehicle on a guideway beam with a storage mass, according to the system of the invention for electrical power storage and delivery.
Figure 9B:
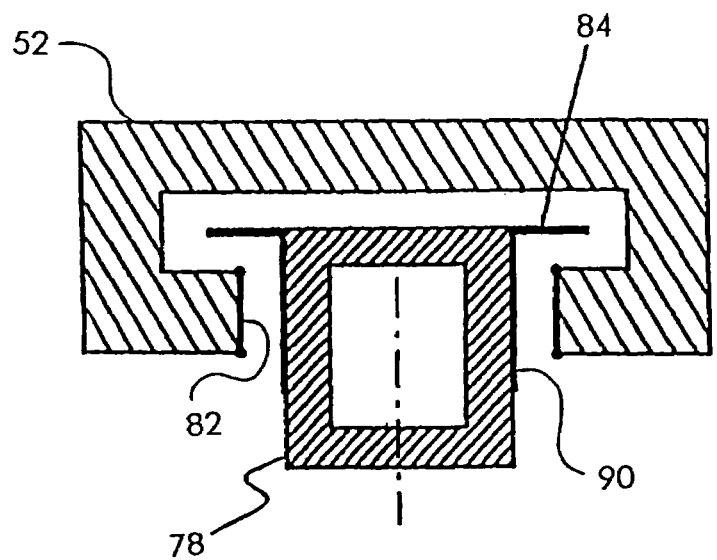
FIG. 9B shows an end view of an energy storage vehicle on a guideway beam with an energy storage vehicle without a storage mass, according to the system of the invention for electrical power storage and delivery.

FIGS. 9A and 9B show the baseline configuration for a vehicle 52 for use in the system of the invention for electrical power storage and delivery in its loaded and unloaded state. The vehicle has a flat upper surface 86 on which a heavy (about 100 ton) reinforced—concrete block 54 is quickly loaded and unloaded. The concrete block is held in place by a quick acting locking mechanism (e.g., pins or straps or bars) between iron plates on the bottom of the block and DC current windings on the top of the vehicle or by magnetic attractive forces. The vehicle for use in the system of the invention for electrical power storage and delivery is a simple structure of steel I-beams, and plates to which are attached a series of superconducting dipole magnets 82. Total vehicle length is short, typically in the range of 5 to 10 meters.

As is shown in FIGS. 9A and 9B, the storage masses 54 are simple reinforced large concrete blocks placed on the flat upper surface 86 of the vehicle the system of the invention for electrical power storage and delivery. Typical dimensions for a 100 ton storage mass are 3.5 meters in width, 2.5 meters high, and 4.5 meters in length.

Figure 10:
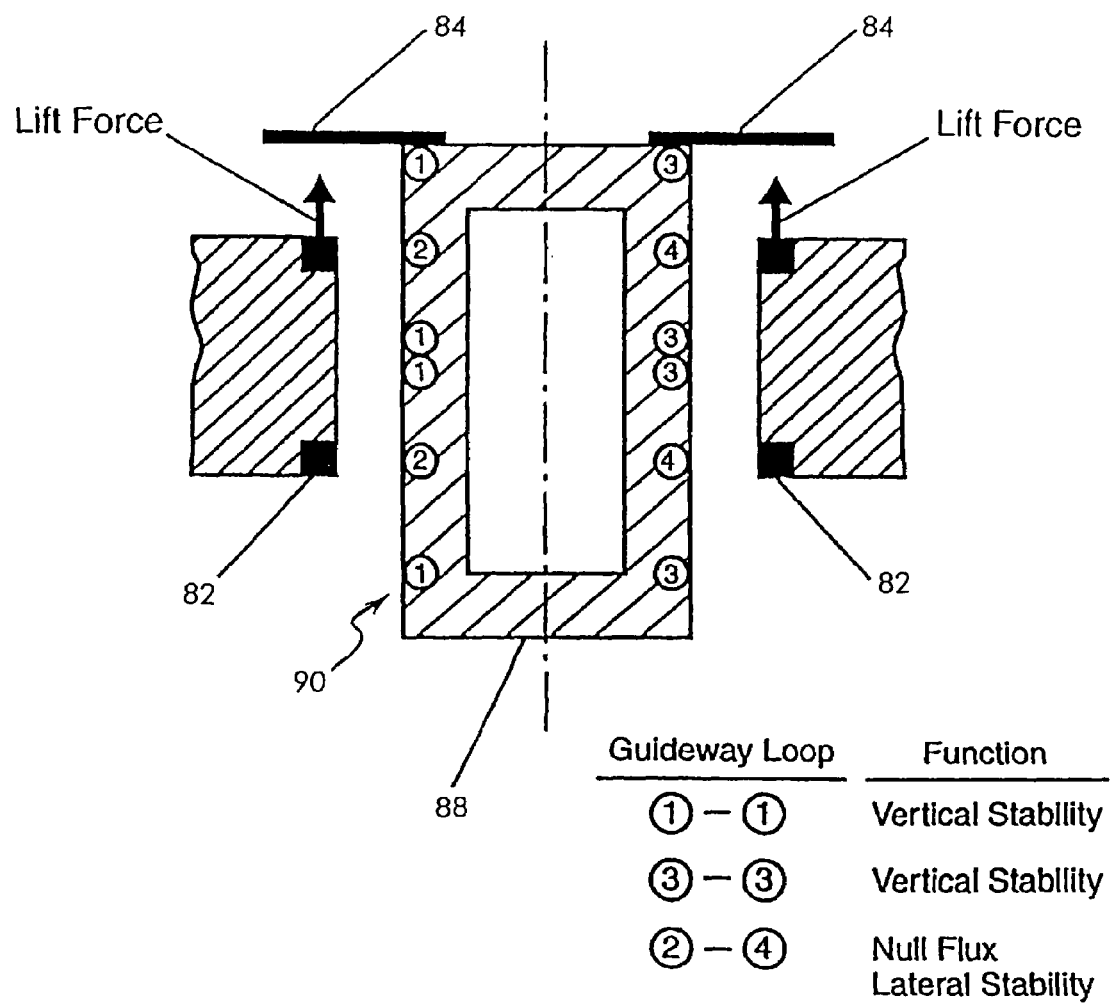
FIG. 10 illustrates the magnetic functions of a narrow beam guideway providing lift to an energy storage vehicle according to the system of the invention for electrical power storage and delivery.

The vehicle rides along a narrow beam guideway 88 (FIG. 10) consisting of a hollow concrete box beam to which a series of panels 90 is attached. Each panel contains a set of passive aluminum wire loops (1, 2, 3, 4) to provide passive vertical and lateral stability, along with propulsion windings that are connected to the external electric power grid. When the system of the invention for electrical power storage and delivery operates in the energy storage mode, net electric power flows into the set of propulsion windings, while when the system of the invention for electrical power storage and delivery operates in the power delivery mode, electric power flows out of the propulsion windings.

Iron lift plates 84 are typically attached to the narrow beam guideway 88. If present, they are positioned so that the magnetic attraction between them and the superconducting dipoles on the vehicle provide virtually all of the lift force needed to support the vehicle. By itself, this attractive suspension force is vertically unstable; however, the combination of the iron lift plates and the assembly of null flux aluminum loops in the side panels on the guideway beam has a net stability. That is, if an external force causes the vehicle to move upwards from its equilibrium suspension point, a net magnetic force develops to push the vehicle downwards towards its equilibrium point; conversely, if the vehicle moves downwards from its equilibrium point due to an external force, a net magnetic force develops to push the vehicle upwards to the equilibrium point. If the iron left plates are not used, the guideway aluminum loops by themselves provide the necessary vertical lift and stability forces, together with the lateral stability forces.

Figure 11:
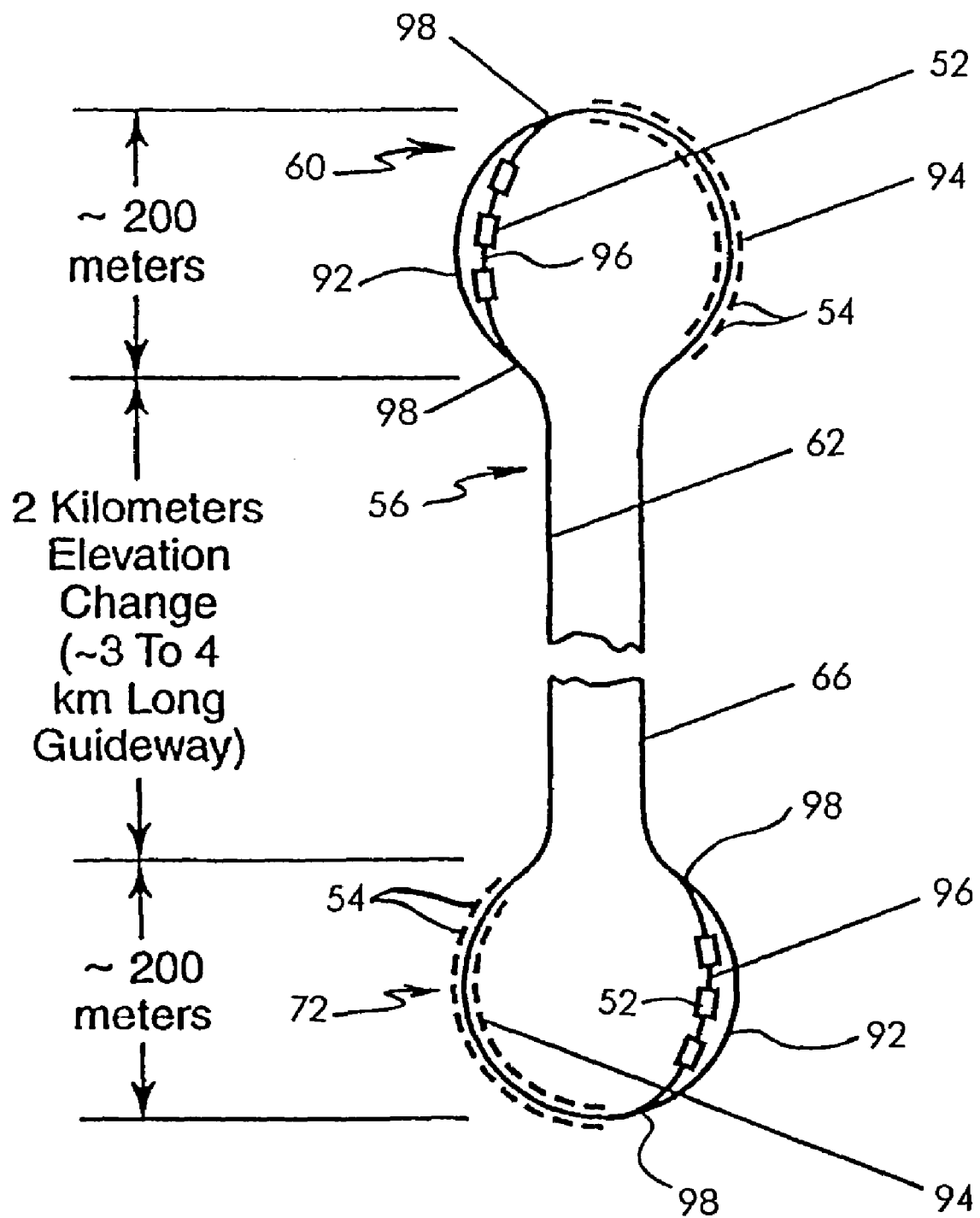
FIG. 11 shows the layout of the energy storage facility according to the system of the invention for electrical power storage and delivery.

FIG. 11 shows the layout of the energy storage facility according to the system of the invention for electrical power storage and delivery. The guideway 56 has end loops 92 at the upper and lower ends (60, 72) of the two way guideway. The end loops enable the vehicles to rapidly traverse the entire guideway, minimizing the number of vehicles needed to store or deliver a given amount of power. Storage masses 54 in the vehicle mass yard 94 are unloaded and loaded from locations along the end guideway loops, using rapid handling equipment.

For those times when the power demand is less than the maximum power capability, the vehicles not engaged in storing or delivering power will be stationed on sidings 96 at the upper and lower ends of the guideway. When needed to boost operating power level, vehicles will be quickly withdrawn over the guideway switches 98 from the two sidings to join those already operating on the guideway. The time required to start operating is less than a minute.

The amount of lift force provided by the iron plates is controlled by how many iron plates (and also how thick they are) are located on the guideway. On the section of the guideway shown in FIGS. 3A and 3B, where the vehicle transports the heavy storage mass (either up or down, depending on whether the system of the invention for electrical power storage and delivery is in the power storage or power generation mode), more iron plates are used, since the weight of the vehicle plus its storage mass will exceed 100 tons. Referring to FIGS. 3A and 3B, in the section of the guideway where the empty vehicle travels up or down, the number of iron plates is much less, since the empty vehicle weighs only about 10 tons.

The number of vehicles is determined by the maximum power rating of the facility for use with the system of the invention for electrical power storage and delivery (the greater the power capability desired, the more vehicles will be needed), and the time required for a vehicle to make a full traverse of the complete guideway circuit, including the time to unload and load as storage mass (the shorter the time, the fewer vehicles will be needed).

TABLE 1

Illustrative Power Inputs and Outputs
Basis: 100 Ton Net Mass Per Vehicle
60 Meter/Sec Speed (134 mph)

| Number of Vehicles on Guideway | Guideway Inclination, Degrees | | | | | |
|---|---|---|---|---|---|---|
| | 30 | | 45 | | 90 | |
| | Power (MW) | Spacing (Km) | Power (MW) | Spacing (Km) | Power (MW) | Spacing (Km) |
| 1 | 30 | 4 | 40 | 2.8 | 60 | 2 |
| 2 | 60 | 2 | 80 | 1.4 | 120 | 1 |
| 4 | 120 | 1 | 160 | 0.7 | 240 | 0.5 |
| 8 (2 connected vehicles) | 240 | 1 | 320 | 0.7 | 480 | 0.5 |
| 12 (3 connected vehicles) | 360 | 1 | 480 | 0.7 | 720 | 0.5 |

Table 1 above shows the power capability of a facility according to the system of the invention for electrical power storage and delivery based on the number of vehicles operating on the power section of the guideway (i.e., the section that handles the vehicles that carry 100 ton storage masses), and the angle of incline for the guideway. A net mass of 100 tons per vehicle (i.e., the weight of the storage mass) is assumed. Since the vehicles travel on both the up and down sections of the guideway, the net power demand related to the vehicle mass is essentially zero.

A vehicle velocity of 60 meters per second is assumed. This velocity corresponds to a magnet pitch of 1 meter and an AC power frequency of 60 Hertz. The steeper the guideway, the more power is generated per vehicle. This is a result of a faster rate of change in elevation when the guideway incline becomes steeper.

The facility according to the system of the invention for electrical power storage and delivery can store or deliver 480 MW(e) at an incline angle of 45 degrees if there are 12 vehicles operating on the power section of the guideway. Assuming that 3 vehicles are hooked together to form a consist, the corresponding distance between consists would then be 0.7 kilometer.

DESCRIPTION OF THE SYSTEM OF THE INVENTION FOR ELECTRICAL POWER STORAGE AND DELIVERY USING ANGLED ON-GRADE GUIDEWAYS

Description of a Baseline System

The analytical relationships that affect the choice of optimum speed for a facility for the system of the invention for electrical power storage and delivery are set forth below:

Length of Vehicle Magnet:

$v = f\lambda$;

f=frequency (i.e., 60 Hz);
v=speed, m/s;
$\lambda$=magnet pole pitch, meters
$\lambda/2 = v/2\,f$
$\lambda/2$ =length of one superconducting loop on vehicle, m
Ratio, Vehicle Kinetic Energy/Delivered Electrical Energy:

$R_1 = v^2/2\, g\Delta h_0$ $\Delta h_0$=change in elevation, meters
Height Change to Achieve Vehicle Operating Speed:

$$\Delta h_1 = \frac{v^2}{2g}$$

Ratio, Energy Lost to Air Drag/Delivered Electrical Energy:

$R^* = \frac{1}{2} C_D \rho_{AIR} A_F V^2 / m_g \sin\theta$ $C_D$=Drag coefficient;
$A_F$=Frontal Area, $m^2$;
M=Delivered mass, kg;
$\theta$=Angle to Horizontal The first decision point is whether the propulsion system should operate at an AC frequency of 60 Hertz, or at some other frequency. If the frequency of 60 Hertz is selected, it minimizes the cost of the equipment needed to handle the large blocks of power that come into the facility for the system of the invention for electrical power storage and delivery from the grid during the energy storage period, and that go out of the facility to the grid during the power delivery period. The 60 Hertz choice enables the facility to operate using simple transformers that step down the voltage from the grid to match that in the propulsion windings. The speed of the vehicles and pitch of its magnet are chosen to match the frequency and phase angle of the AC grid power. If the propulsion frequency is different from 60 Hertz, then frequency conversion equipment is needed to change the AC power frequency to that used to propel the vehicles (in the motor mode) and to change the frequency of the power delivered by the generator mode to match that in the external power grid. However, the use of an asynchronous DC/AC link between the maglev energy storage system and the electrical grid allows greater system flexibility, in that vehicle speed and inclination angle can vary along the guideway and that transients associated with vehicles entering and leaving the guideway are more readily handled. The choice of operating at 60 Hertz in synchronism with the external grid, or asynchronously with DC/AC conversion will depend on the particular conditions of the site and the external grid.

Figure 12:
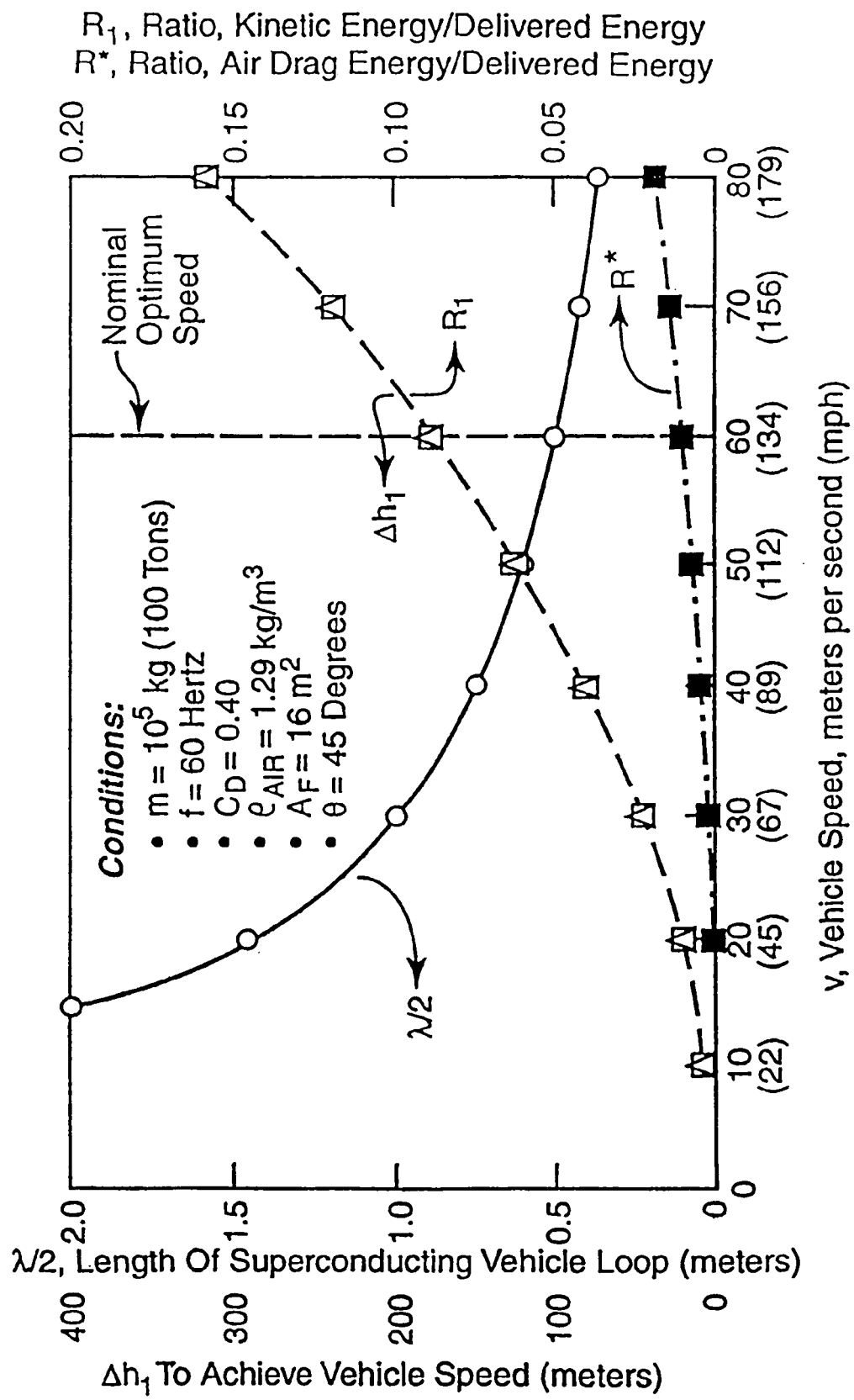
FIG. 12 is a chart showing the effect of vehicle speed on the performance of the system of the invention for electrical power storage and delivery.

FIG. 12 shows the effect of vehicle speed on the performance of the system of the invention for electrical power storage and delivery. Higher speeds decrease the magnet pitch length, as 1/V, if frequency is to be kept constant at 60 Hertz. Moreover, higher speeds increase the equivalent $\Delta h$ needed to achieve operating speed. If $\Delta h$ becomes comparable to the change in elevation for the guideway, the kinetic energy of the moving loaded vehicle becomes comparable to the electrical energy stored by the raising of the transported mass. In addition, the air drag losses increase as the square of vehicle speed. The optimum vehicle speed is chosen to be 60 meters per second. This speed corresponds to a magnet pitch of 1 meter, which is short enough for an efficient propulsion motor/generator, but long enough that there can be a substantial physical gap between the vehicles and the guideway. Moreover, 60 meters per second is slow enough that the value of Δh is relatively small, 180 meters, compared to the 2000 meters elevation change. In addition, the air drag losses are only about 1% of the energy stored and delivered by the vehicle. If an asynchronous AC/DC link to the external grid is used, the vehicle speed can be chosen independently of the magnet pitch.

Figure 13:
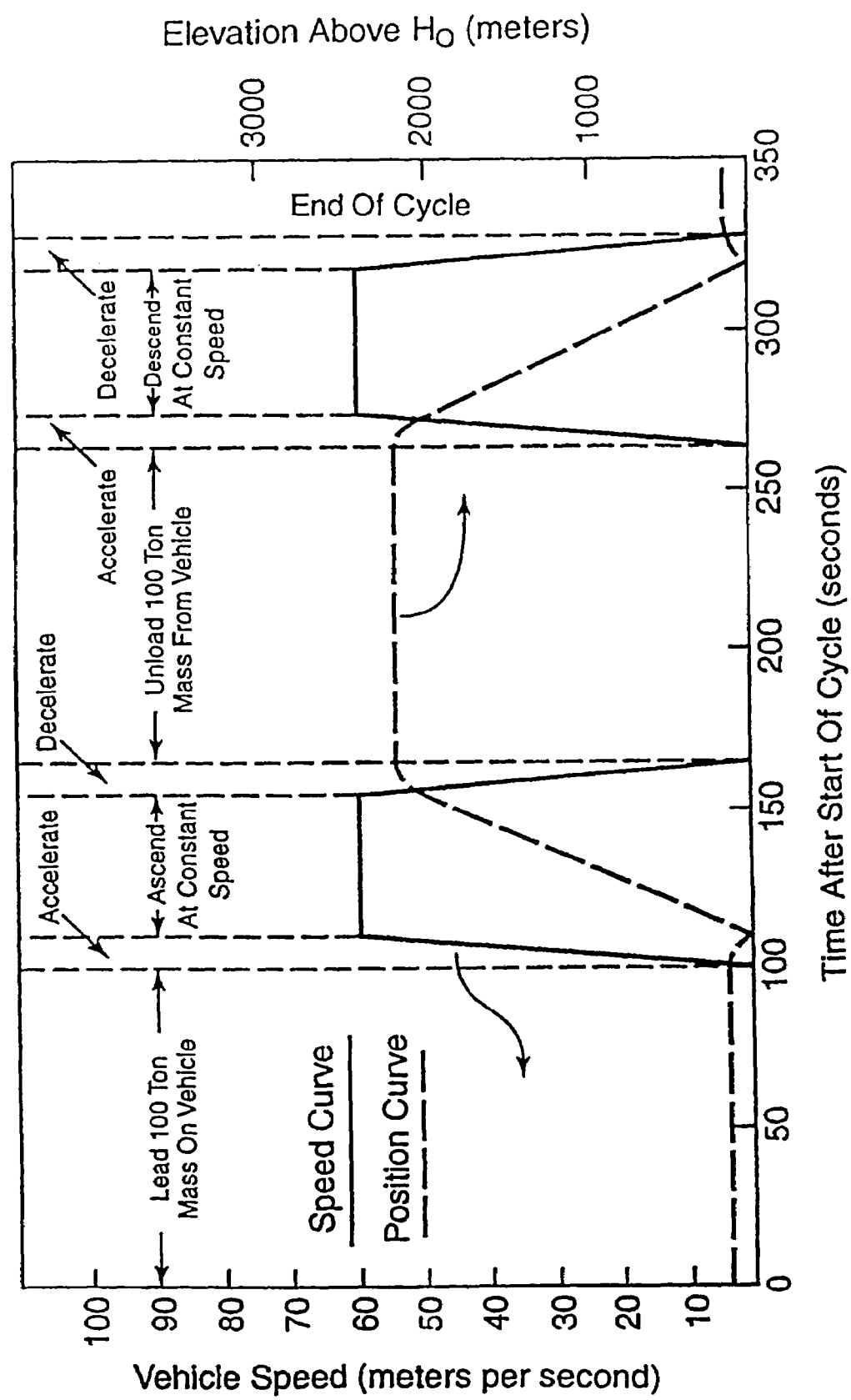
FIG. 13 is a chart showing the position and speed of the vehicle in the baseline power storage cycle according to the system of the invention for electrical power storage and delivery.

FIG. 13 shows the position and speed of the vehicle in the baseline power storage cycle. A time interval of 100 seconds is assumed for the unloading of the storage mass from the vehicle for the system of the invention for electrical power storage and delivery, and an equal interval of 100 seconds for the loading of the storage mass. As shown later, these time intervals appear quite conservative. It is very likely that the unloading and loading processes can be carried out in much shorter time.

The vehicle for use in the system of the invention for electrical power storage and delivery is stationary during the loading and unloading portions of the cycle. There are two short acceleration periods of 8.5 seconds each—the vehicle accelerates after the mass is unloaded and also after it is loaded—and two short deceleration periods, also of 8.5 seconds each.

TABLE 2

Number of Round Trips Per Hour vs. Vehicle Speed and Guideway Angle

| | Vehicle Speed (m/sec) | | | | | |
|---|---|---|---|---|---|---|
| | 60 | | 50 | | 40 | |
| Guideway Inclination (deg) | 45 | 30 | 45 | 30 | 45 | 30 |
| Unload and Load (sec) | 200 | 200 | 200 | 200 | 200 | 200 |
| Ascend 2000 Meters (sec) | 47.2 | 66.7 | 56.6 | 80 | 70.8 | 100 |
| Descend 2000 Meters (sec) | 47.2 | 66.7 | 56.6 | 80 | 70.8 | 100 |
| Accelerate and Decelerate 4 Times (sec) | 34 | 34 | 28 | 28 | 23 | 23 |
| Total (sec) | 328 | 367.4 | 341.2 | 388 | 365 | 423 |
| Round Trips per Hour | 11 | 9.8 | 10.6 | 9.3 | 9.9 | 8.5 |

Figure 14:
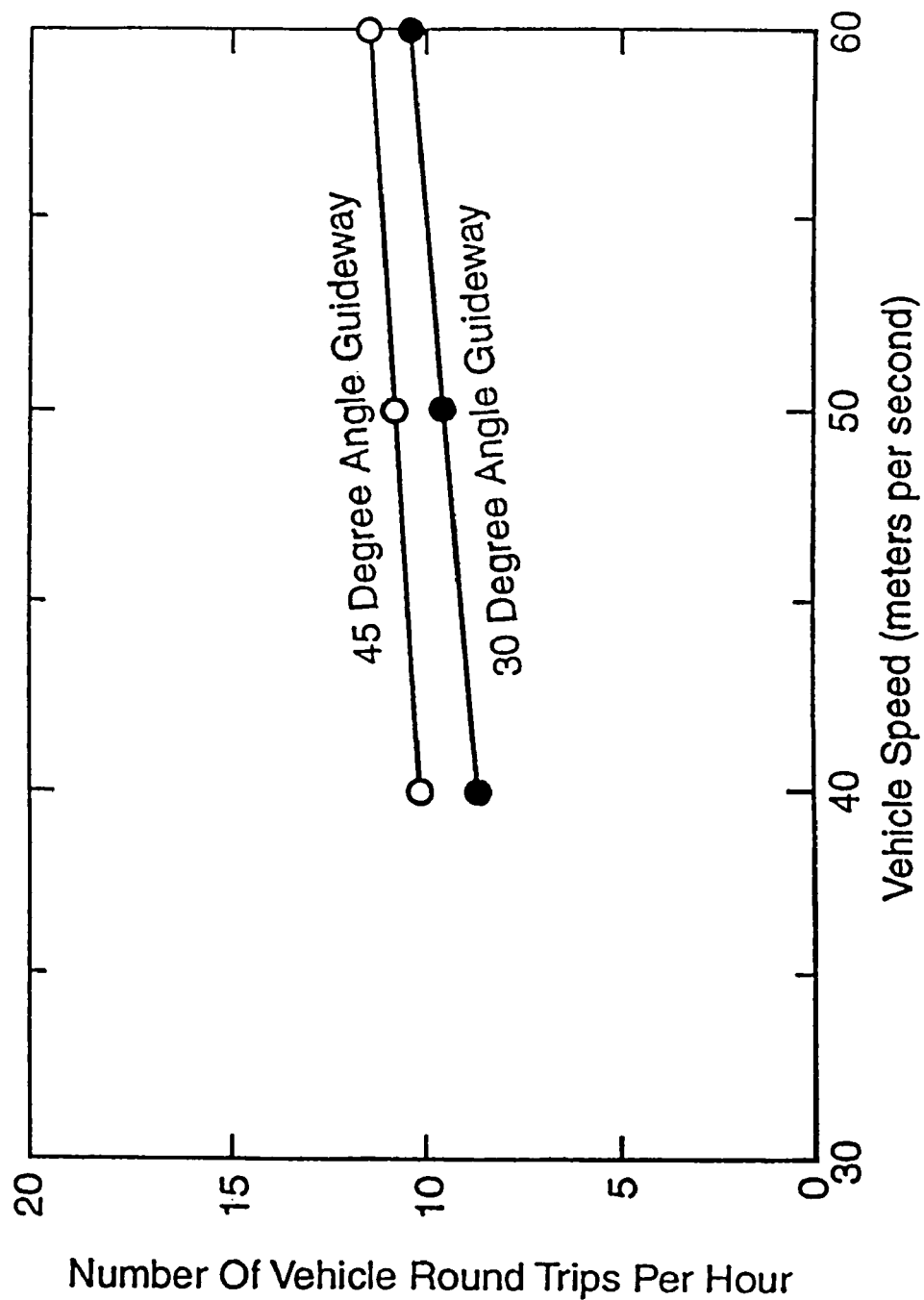
FIG. 14 is a chart illustrating the number of round trips per hour achievable for an energy storage vehicle as a function of vehicle speed and guideway angle.

Table 2 above shows the number of round trips carried out per hour by a vehicle, based on the time periods described above, as a function of vehicle speed. The number of round trips is also shown in FIG. 14.

With a load time of 100 seconds, an unload time of 100 seconds, and a 2 kilometer ascend/descend net distance for energy storage and power generation modes, at 60 meters per second, 10 round trips per hour can be carried out. The number of round trips is insensitive to the inclination angle of the guideway. This is a consequence of relatively long periods assumed for loading and unloading the vehicles, compared to the short acceleration and deceleration periods, and to the short travel time on the inclined guideway.

Figure 15:
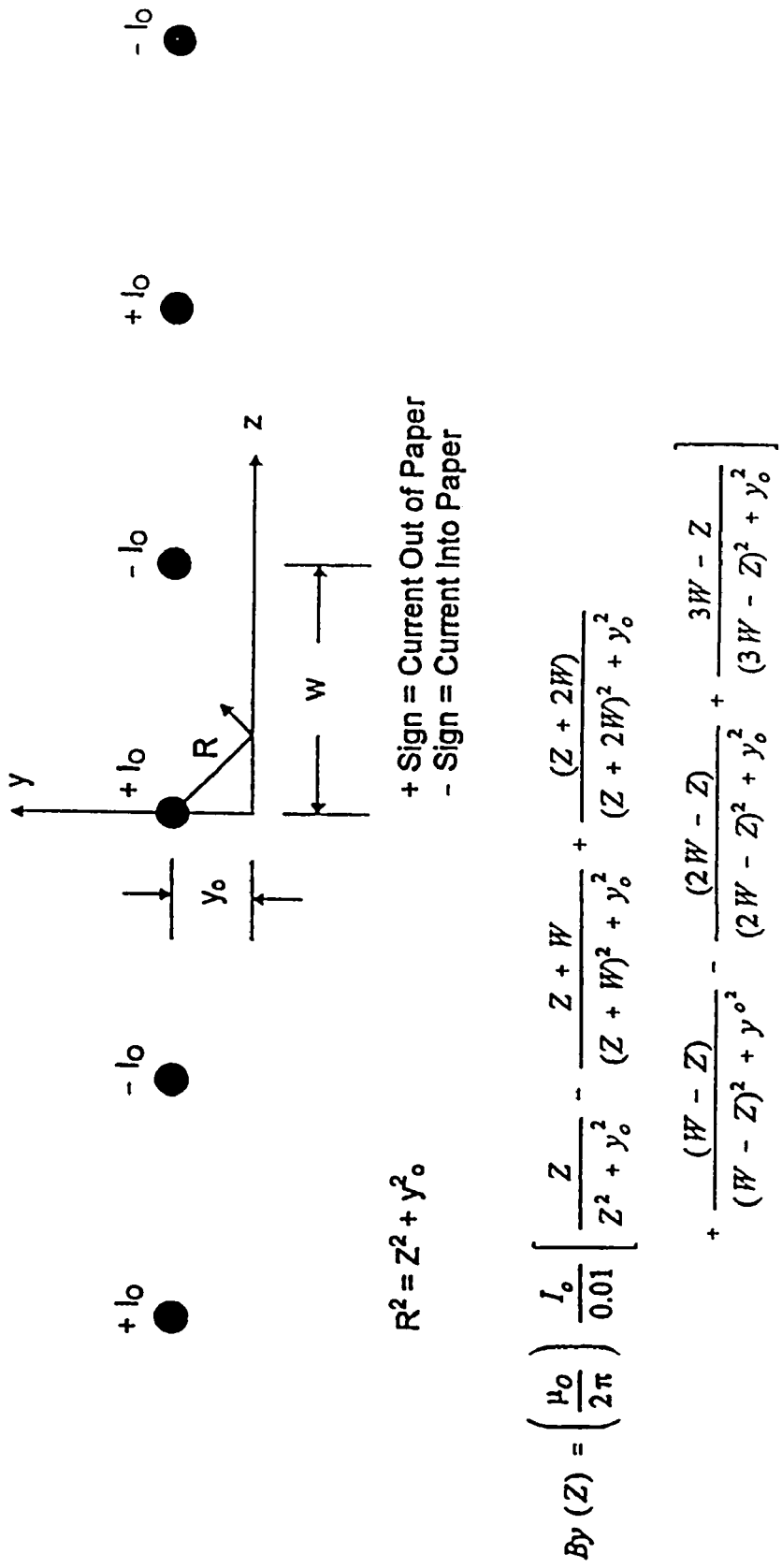
FIG. 15 illustrates the magnetic geometry and calculation of the magnetic propulsive forces and power for an energy storage vehicle according to the invention.

FIG. 15 shows the magnetic geometry used to calculate the magnetic propulsive forces and power for the vehicle, while the analytic relationships employed are set out below.

$$F_P(t) = 2B_y(t)I_G(t)l_P = 2(B_y)^* \sin wt (I_G)^* \sin(wt+\lambda)[l_P] \text{ Newtons}$$

The factor of 2 reflects the effective doubling of current in the propulsion winding cross-overs, with $w = 2\pi f$ radians per second;

f=60 Hertz;

λ=Phase angle between propulsion current and By magnetic field acting on propulsion winding;

$(B_y)^*$=Maximum magnetic field experienced by propulsion winding, Tesla;

$(I_G)^*$=Maximum current in guideway propulsion loop winding, amp turns;

$l_P$=Total length of propulsion windings acted on by magnetic field from vehicle magnets, meters;

The time averaged propulsion force resulting from the sine wave field and current is:

$$\overline{F}_P = (2)\left\{\frac{B_y^* I_G^* \int_0^{2\pi/w}[\sin wt]\sin wt\cos\lambda + \cos wt\sin\lambda\phi dt}{\int_0^{2\pi w}dt}\right\} l_P \text{ Newtons}$$

$$= (2)\frac{B_y^* I_G^*}{2}\cos\lambda(l_P) = B_y^* I_G^*\cos\lambda(l_P)$$

The average propulsion force equals the force required to keep the loaded energy storage vehicle moving up the inclined guideway at a velocity V and angle θ.

$$\overline{F}_P = (M_v + M_{mass})g \sin\theta = M_{TOT} g \sin\theta$$

Combining the two equations, the peak guideway propulsion current is given by:

$$I^*_G = M_{TOT} g \sin\theta / B_y^* \cos\lambda(l_P) \text{ amp turns}$$

with the rms value of $I_G$ being $(I_G)_{RMS} = 0.707 I_G^*$

The total length of the propulsion winding is given by $$l_P = N_M l_M \text{ meters}$$

where $N_M$=number of superconducting magnet loops on the vehicle (1 loop per polarity –2 loops for a pair of + and – polarity) and $l_M$=length of propulsion winding in the loop As an example, for $l_M$=1 meter, and $N_M$=20 (5 pairs superconducting loops on each side of the vehicle), $l_P$=20 meters.

The actual system and method for storage and generation of electrical energy will have a three phase propulsion winding, with each phase carrying one third of the total current required to propel the vehicle. Accordingly, $$(I_G)^*_{3\phi} = \frac{1}{3} I_G^*$$

and $$[(I_G)_{RMS}]_{3\phi} = \frac{1}{3}(I_G)_{RMS}$$

Per phase, the $I^2R$ losses in the propulsion windings are then:

$$(I_G^2 R)_{3\phi} = \left[\left(\frac{I_G}{3}\right)Rms\right]^2 \frac{\rho_{Al}}{A_{Al}}\left[1 + \frac{W_P}{l_P}\right](l_P)\left(\frac{l_{EP}}{l_P}\right)$$

Where $\rho_{A1}$=Resistivity of aluminum conductor=$2.8 \times 10^{-6} \Omega$ cm;

$A_{A1}$=Cross sectional area of aluminum conductor, cm²;

$W_P/l_P$=Ratio of propulsion loop width/length [$W_P/l_P$=0.5];

$l_{EP}/l_P$=Ratio of length of energized propulsion winding/length of propulsion winding under vehicle.

The total $I^2R$ power in the propulsion winding is:

$$P_{TOT} = 3P(I^2R)_{3\phi} = 3[(I_G^2 R)_{3\phi}]$$

These analytic relationships are derived based on the magnetic field distributions for an infinitely long bifilar (i.e., parallel wire) electrical circuit, so that the results are somewhat approximate, because they do not include end effects from the ends of the magnet loops. However, they are accurate enough for the purposes of describing the system of the invention for electrical power storage and delivery and scoping out its overall performance capabilities.

Figure 16:
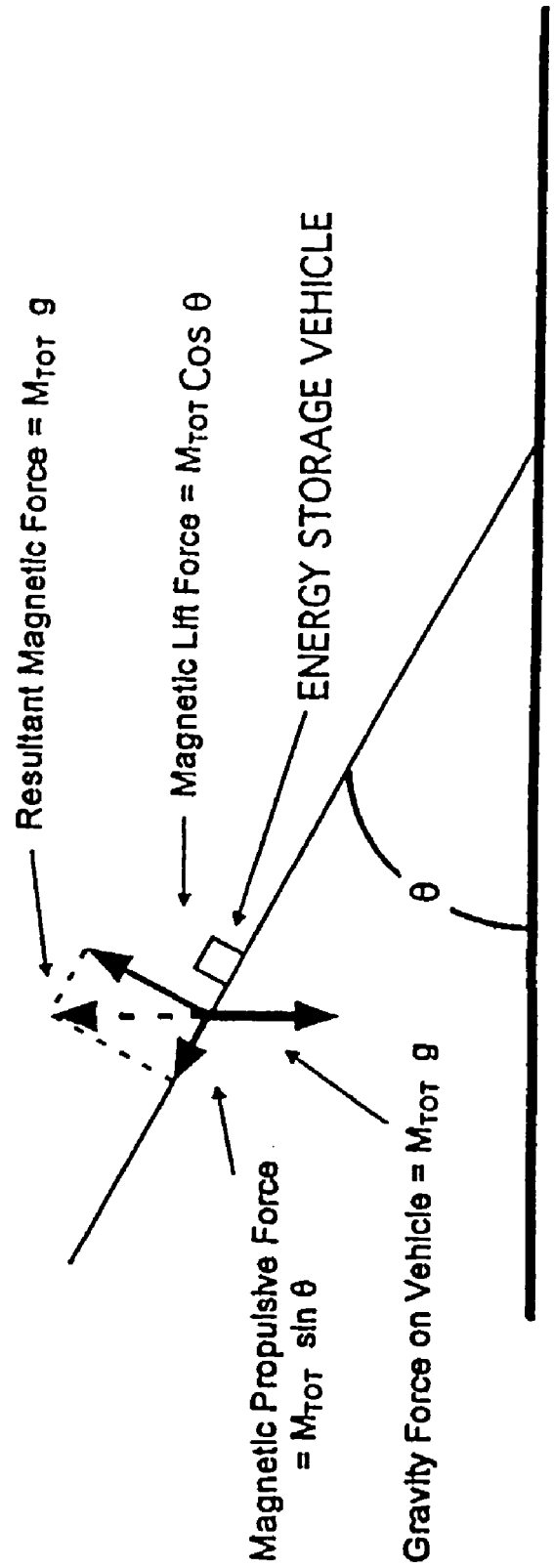
FIG. 16 is an illustration of vector addition of magnetic propulsion and magnetic lift forces for an energy storage vehicle according to the invention.

FIG. 16 illustrates the vector addition of the lift and propulsion forces in the guideway for the system of the invention for electrical power storage and delivery. The propulsion and magnetic lift forces needed are set out in table 3 below.

TABLE 3

Vector Addition of Magnetic Propulsion and Magnetic Lift Forces

| | Loaded Vehicle [110 Metric Tons] | | | Unloaded Vehicle [10 Metric Tons] | | |
|---|---|---|---|---|---|---|
| | Guideway Inclination ($\theta$, deg) | | | | | |
| | 30 | 45 | 90 | 30 | 45 | 90 |
| Magnetic Propulsive Force, Newtons | $5.4 \times 10^5$ | $7.62 \times 10^5$ | $1.08 \times 10^6$ | $4.9 \times 10^4$ | $6.93 \times 10^4$ | $9.8 \times 10^4$ |
| Magnetic Lift Force, Newtons | $9.4 \times 10^5$ | $7.62 \times 10^5$ | 0 | $8.5 \times 10^4$ | $6.93 \times 10^4$ | 0 |
| Total Gravity Force, Newtons | $1.08 \times 10^6$ | | | $9.8 \times 10^4$ | | |

For a vertical shaft system for electrical power storage and delivery ($\theta=90$ degrees) the lift and propulsion forces are the same, since the gravity vector acts downwards along the shaft. For inclined guideways, the iron lift plate magnetic vector and the magnetic propulsion vector add together to counter the vertically downwards gravity vector acting on the vehicle.

TABLE 4

Numerical Values for By Components as a Function of $Y_0$ and Z
Basis: W = 50 Centimeters

| | $Y_0$ = 15 cm (5.9 Inches) | | | $Y_0$ = 18 cm (7.1 Inches) | | |
|---|---|---|---|---|---|---|
| Term | Z = 8 | Z = 16 | Z = 25 | Z = 8 | Z = 16 | Z = 25 |
| $Z/Z^2 + Y_0^2$ | +0.0277 | +0.0333 | 0.0294 | +0.0206 | +0.0276 | +0.0263 |
| $-(Z + W)/(Z + W)^2 + Y_0^2$ | -0.162 | -0.0144 | -0.0128 | -0.0157 | -0.0141 | -0.0126 |
| $+(Z + 2W)/(Z + 2W)^2 + Y_0^2$ | +0.0091 | +0.0085 | +0.0079 | +0.0090 | +0.0084 | +0.0078 |
| $+(W - Z)/(W - Z)^2 + Y_0^2$ | +0.0211 | +0.0246 | +0.0294 | +0.0201 | +0.0230 | +0.0263 |
| $+(2W - Z)/(2W - Z)^2 + Y_0^2$ | -0.0106 | -0.0115 | -0.0128 | -0.0105 | -0.0114 | -0.0126 |
| $+(3W - Z)/(3W - Z)^2 + Y_0^2$ | +0.0070 | +0.0074 | +0.0079 | +0.0069 | +0.0073 | +0.0078 |
| SUM | +0.0381 | +0.0479 | +0.0490 | +0.0304 | +0.0408 | +0.0430 |

Figure 17:
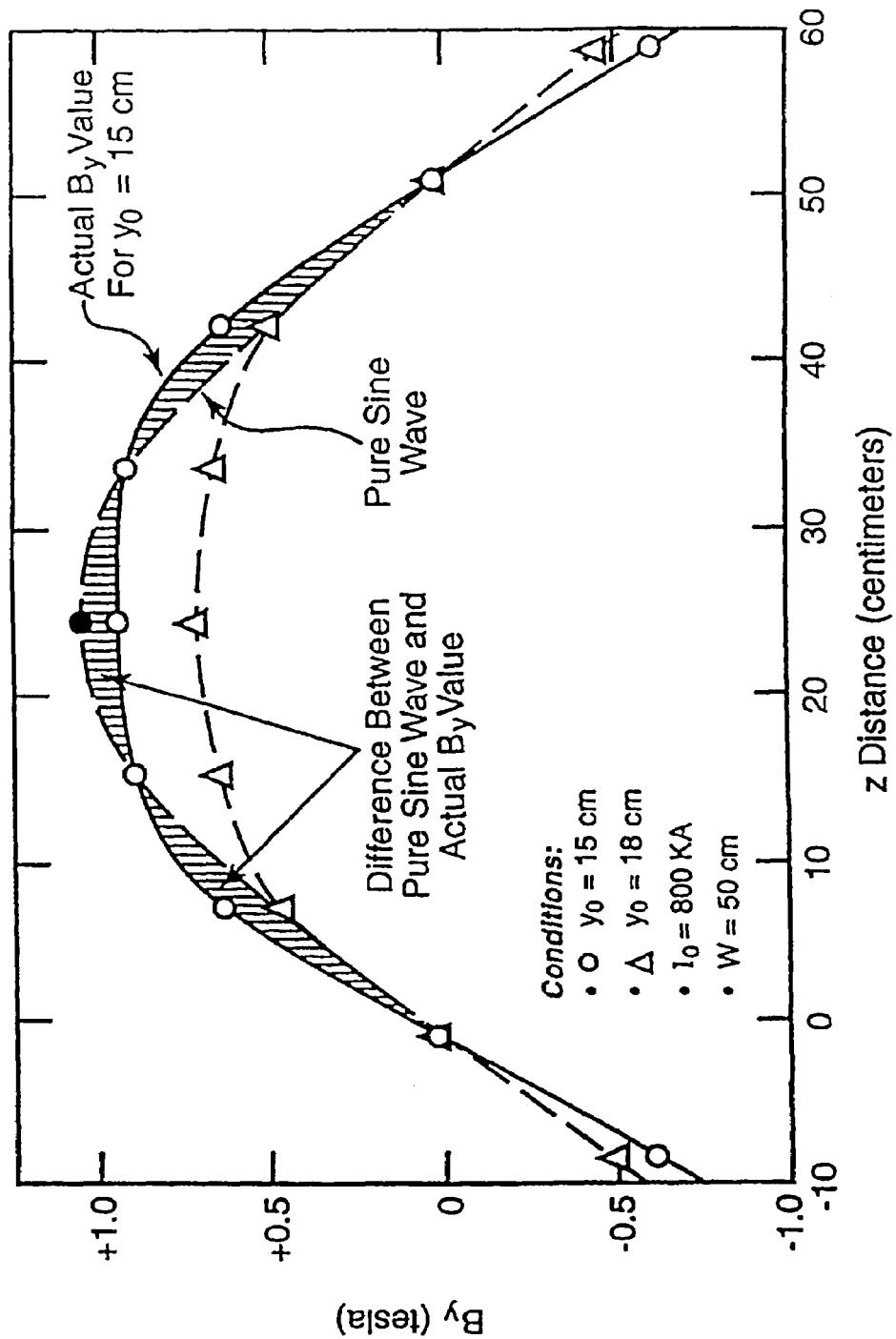
FIG. 17 is a graph illustrating the values of By as a function of z and $y_0$ positions for an energy storage vehicle propulsion system.

Table 4 above and FIG. 17 show how the magnitude of the magnetic field By component (i.e., the component normal to the plane of the superconducting dipole loop on the vehicle) varies with distance z along the vehicle and separation $y_o$ between the plane of the superconducting vehicle loop and the guideway propulsion loop.

Note that By=0 at z=0 (directly under one superconductor) and z=50 centimeters (directly under the adjacent superconductor), and is a maximum at By-25 centimeters. The 50 centimeter distance between superconductors corresponds to a magnet pitch of 100 centimeters (=1 meter), the value decided on earlier. The magnitude of By shown in FIG. 17 repeats every 50 centimeters, but with an opposite sign.

Also note that By is almost a perfect sine wave over the interval z=0 to z=50 centimeters. (The deviations are shown as shaded areas.) With slight changes in placement of the superconducting cables, and/or local placement of iron flux guides, a perfect 60 Hertz sine wave could be achieved. This is important in terms of matching the frequency and phase of the propulsion power input/output to that of the external power grid.

Also shown is the effect of increasing the vertical separation, $y_0$, between the plane of the superconducting guideway loop and the plane of the superconducting magnet. The magnitude of the By component decreases with increasing $y_0$, but the shape continues to be close to that of a sine wave.

Figure 18:
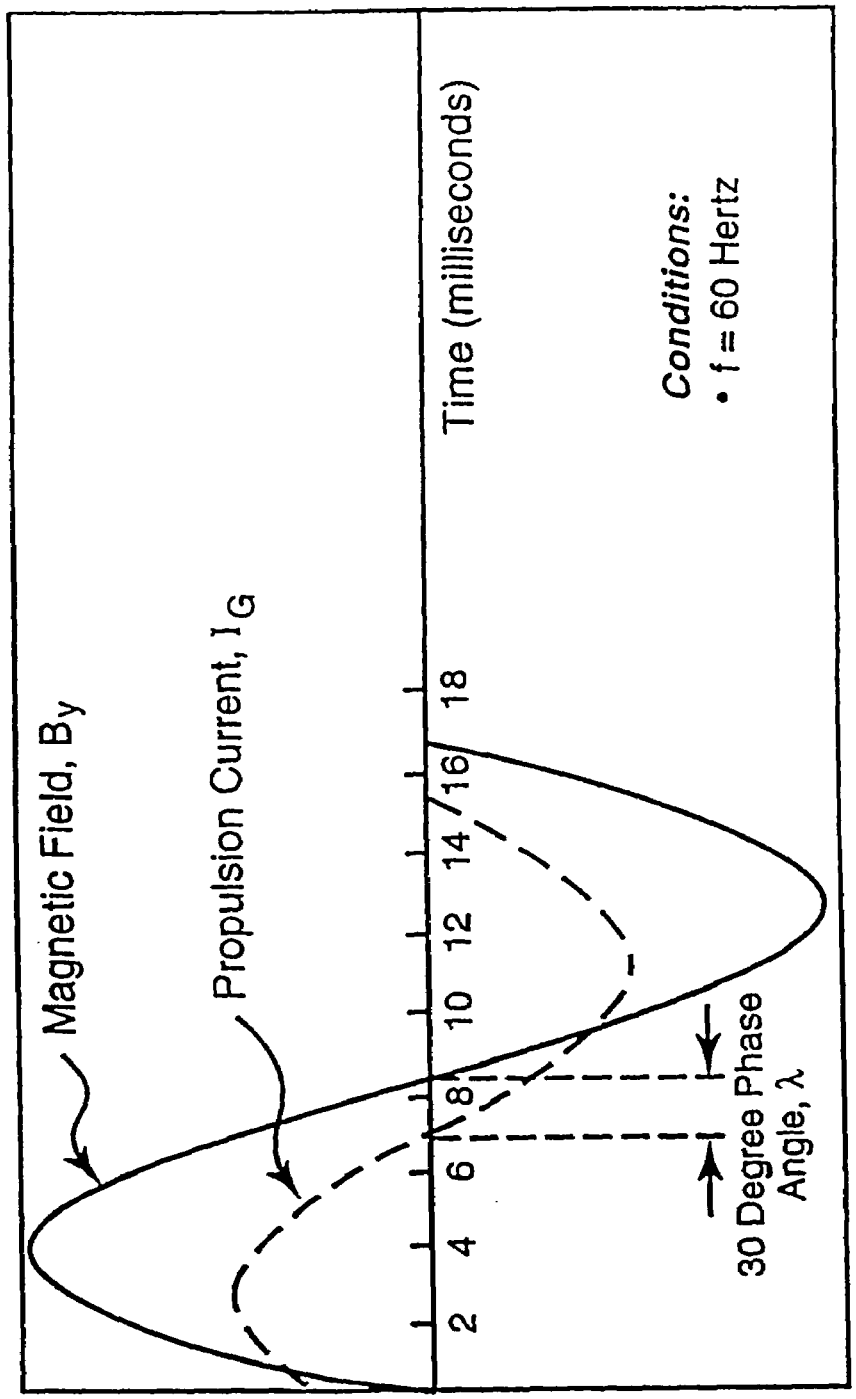
FIG. 18 is a graph illustrating guideway propulsion current and the magnetic field from energy storage vehicle loops as a function of time.

FIG. 18 illustrates the phase angle difference between the propulsion current and the By magnetic field component. With a phase angle of zero degrees, the propulsion force is at its maximum possible value as phase angle increases, propulsion force decreases. By operating at a substantial non-zero value for the phase angle, one ensures that the propulsion system can automatically adjust to, and compensate for, variations in wind force, drag coefficient, and the like, without affecting the synchronicity and constant frequency nature of the propulsion system for the system of the invention for electrical power storage and delivery.

TABLE 5

Numerical Values of Propulsive Current as a Function of Number of Magnet Pairs
Basis: 110 Tons Total Vehicle Mass (100 + 10 = 110 Tons)
45 Degrees Angle Guideway
7 Inch Vertical Separation
30 Degree Phase Angle (λ)
1 Meter Winding Length (lm)

| Number of Magnet Pairs (Both Sides) | Total Length of Magnets Along Each Side (Meters) | $I_G$* (Amp Turns) | |
|---|---|---|---|
| | | 800 KA Magnet | 600 KA Magnet |
| 12 | 6 | 53,000 | 71,000 |
| 10 | 5 | 64,000 | 85,000 |
| 8 | 4 | 80,000 | 107,000 |
| 6 | 3 | 107,000 | 142,000 |

Note:
For a three phase propulsion winding, $(I_G^*)_{3P} = 1/3\, I_G^*$

Table 5 above shows the magnitude of the current in the guideway propulsion loops needed to propel a loaded vehicle uphill, as a function of the number of superconducting magnet pairs on the vehicle (one magnet pair corresponds to a full pitch of one meter, which has two loops of alternating polarity) and the level of current in the superconducting magnets. Note that the total of 10 magnet pairs for the vehicle corresponds to having 5 magnet pairs on each side of the vehicle.

The values of guideway loop current shown in Table 5 correspond to having a connected set of guideway single phase loops with the loops on the left side of the vehicle in series with the loops on the right side. All loops carry the same single phase current.

Figure 19:
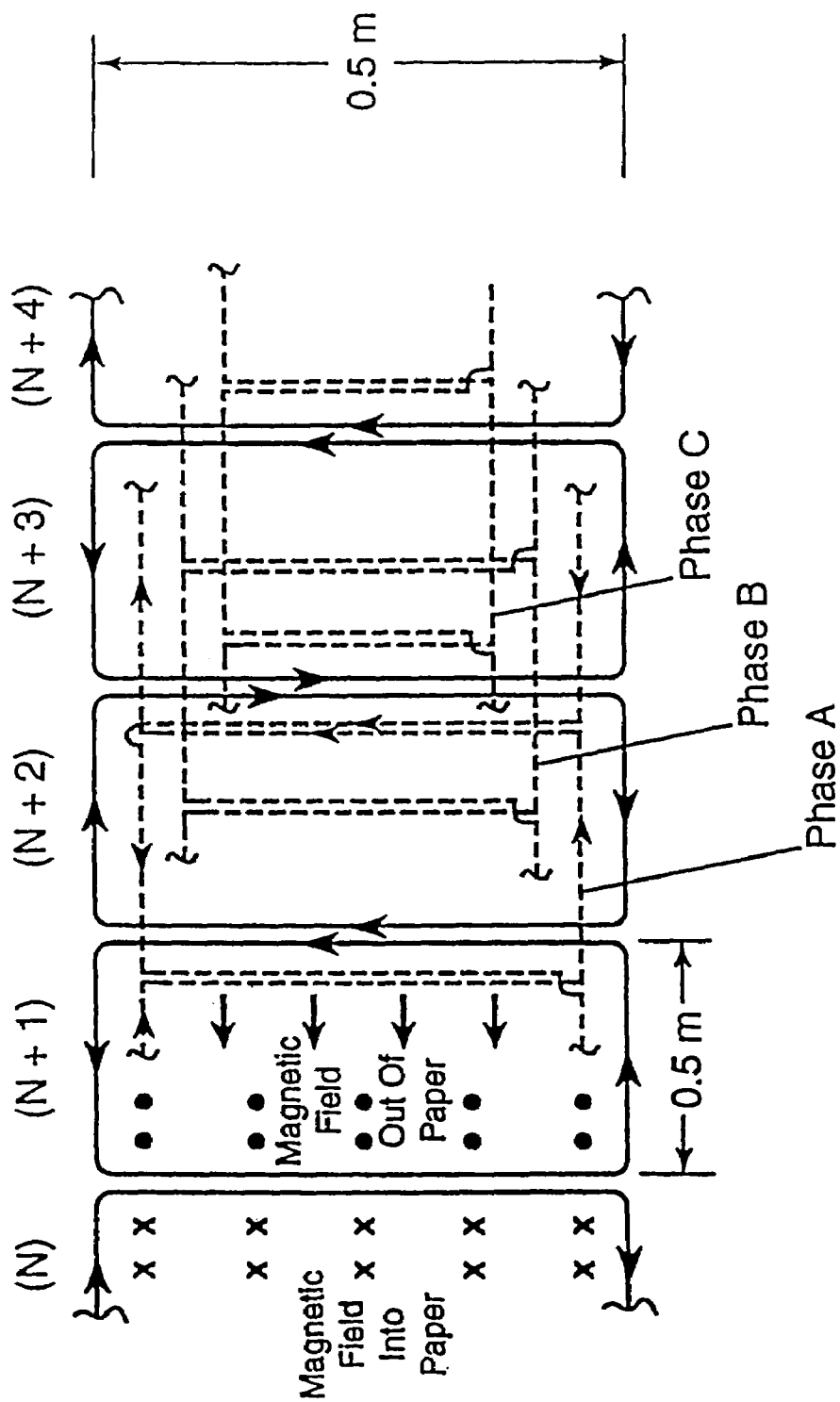
FIG. 19 is a schematic diagram illustrating the geometry of three phase propulsive windings for the system of the invention for electrical power storage and delivery.

In practice, the electrical power grid operates on a three phase current arrangement. Accordingly, a three phase propulsion current arrangement is required for the system of the invention for electrical power storage and delivery. FIG. 19 shows this arrangement of superconducting loops on an energy storage vehicle, in which the three separated propulsion windings each carry one phase. In FIG. 19, phases A, B and C are shown as having different widths for clarity of presentation. They actually will have essentially the same widths. The currents in the Phase A, B and C windings are not in phase, but are timed to give propulsion forces in the left direction. The physical separation between the three windings corresponds to an electrical separation of 120 degrees, with each winding operating at the same phase angle between the magnetic field By from the superconducting magnet and the propulsion current. Each of the three windings carries ⅓ of the total current shown in Table 5 for a given combination of the number of superconducting magnet pairs and the current in the magnets.

TABLE 6

$I^2R$ Losses in Propulsion Windings as a Function of the Number of Magnet Pairs
Basis: Ac = 39 cm² [2" × 3" Cross Section],
1 Meter Winding Length
$w_P/l_P = 0.5$, θ = 45 Degrees, 110 Ton Vehicle Mass
900 KA Magnet Current,
30 Degree Phase Angle, 7 Inch Separation

| Parameters | $l_{EP}/l_P =$ | 8 | | 10 | | 12 | |
|---|---|---|---|---|---|---|---|
| | | 2 | 4 | 2 | 4 | 2 | 4 |
| $I_G$*, KA | | 80 | → | 64 | → | 53 | → |
| $(I_G)_{RMS}$, KA | | 56.6 | → | 45 | → | 37.5 | → |
| $[(I_G)_{RMS}]_{3\theta}$, KA | | 18.8 | → | 15 | → | 12.5 | → |
| $l_P$, Meters | | 16 | → | 20 | → | 24 | → |
| $P(I^2R)_{3\theta}$, KW | | 122 | 244 | 97 | 194 | 81 | 162 |
| $P_{TOT}$, KW | | 366 | 732 | 291 | 582 | 242 | 448 |

The corresponding $I^2R$ losses in the propulsion windings are shown in Table 6 above, as a function of the total number of magnet pairs on the vehicle, and the length of the guideway block that is energized at any given time. Two values of block length energization are shown, with $l_{EP}/l_P$ values of 2 and 4 ($l_{EP}/l_P$ block energization length/vehicle length).

The $I^2R$ losses are all well below 1 megawatt. These are small compared to the 40 megawatt power input/output levels for the loaded vehicle, so that the propulsion systems is very efficient. There clearly is a strong incentive to have a short energization block length, i.e., $l_{EP}/l_P=2$, rather than a longer one. The $I^2R$ losses decrease as the number of magnet pairs, and consequently LP, increase, because the effect of greater winding length is offset by the smaller current level needed in the propulsion windings. With 10 magnet pairs and $l_{EP}/l_P=2$, the $I^2R$ propulsion loss for a loaded vehicle is only about 300 kilowatts—less than 1% of the 40 MW power input/output.

The $I^2R$ propulsion losses associated with propelling the unloaded vehicle can be neglected. The propulsion current for the unloaded vehicle is a factor of 10 lower than that for the loaded vehicles, resulting in an $I^2R$ loss that is 100 times lower. The much lower propulsion current is due to the mass of the unloaded vehicle being only about ¹⁄₁₀th that of the loaded vehicle.

An important feature of the system of the invention for electrical power storage and delivery is the unique propulsion switch architecture. With a short energized block length and three phase propulsion windings, one would need many hundreds of electronic switches to channel current into and out of the propulsion windings that were individually connected to the AC power grid.

Figure 20:
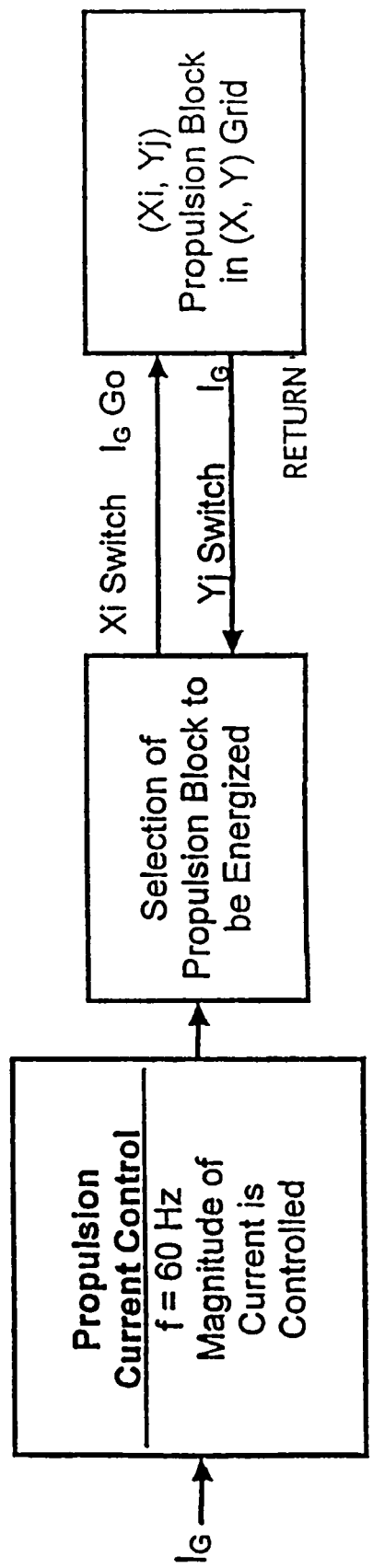
FIG. 20 is a flow chart illustrating the switching architecture for energizing successive propulsion windings along a guideway for the system of the invention for electrical power storage and delivery.
Figure 21:
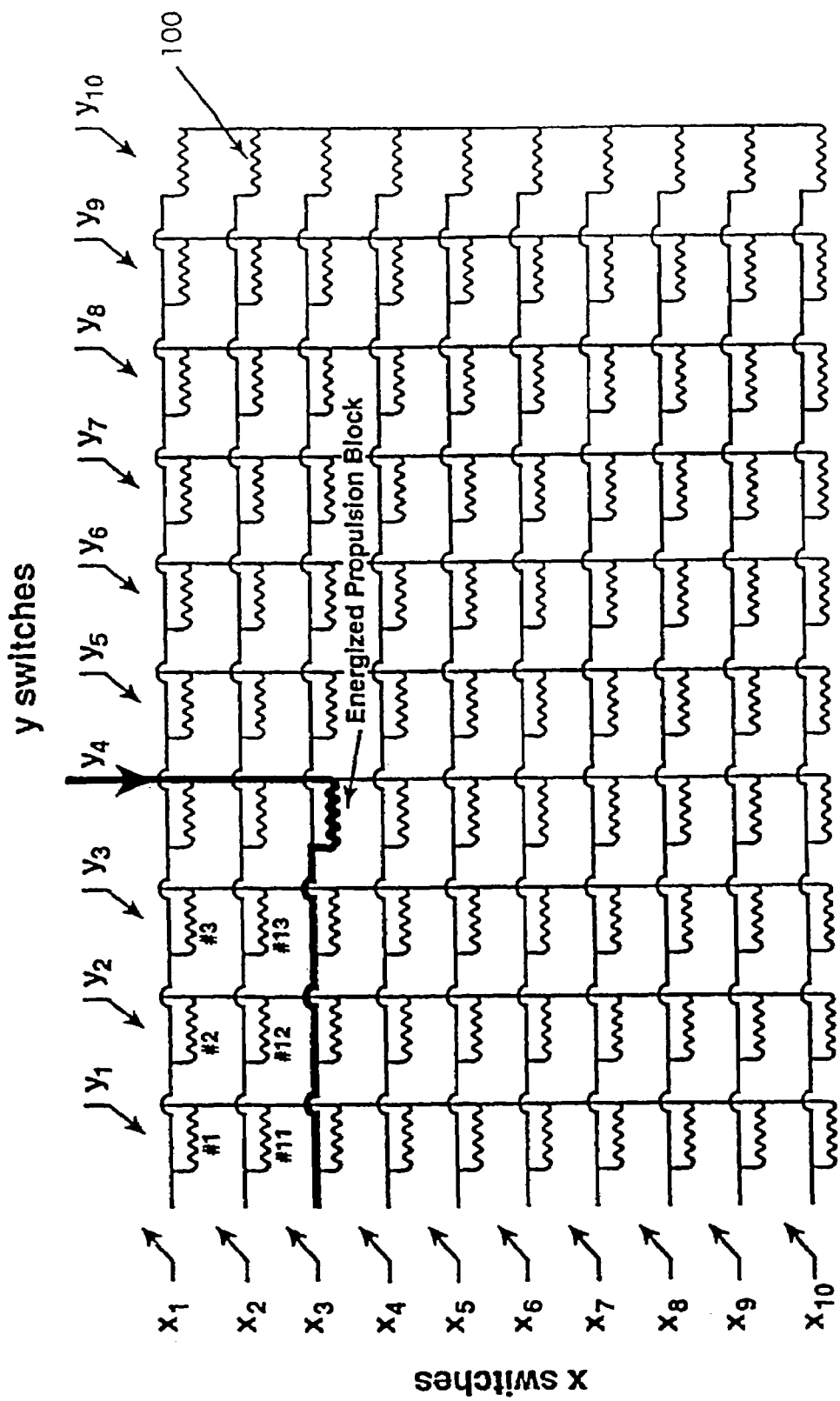
FIG. 21 is a schematic diagram illustrating the (x, y) geometry for energizing guideway propulsion blocks for the system of the invention for electrical power storage and delivery.

Instead, a multi-dimensional switch architecture is used. In the two dimensional configuration, each block is connected to the propulsion current control (FIG. 20) by two switch lines ($x_i$, $y_j$). In FIG. 20, one phase is shown; the other two phases are similar. As shown in FIG. 21, illustrating a grid of 100 propulsion blocks 100, 20 switches (10 $x_i$ and 10 $y_j$ switches) are sufficient to select any individual block in the grid. Generalizing, the total number of switches is switch#=2(# of blocks)$^{1/2}$ Thus, a grid of 900 blocks would require only 60 switches.

Figure 22:
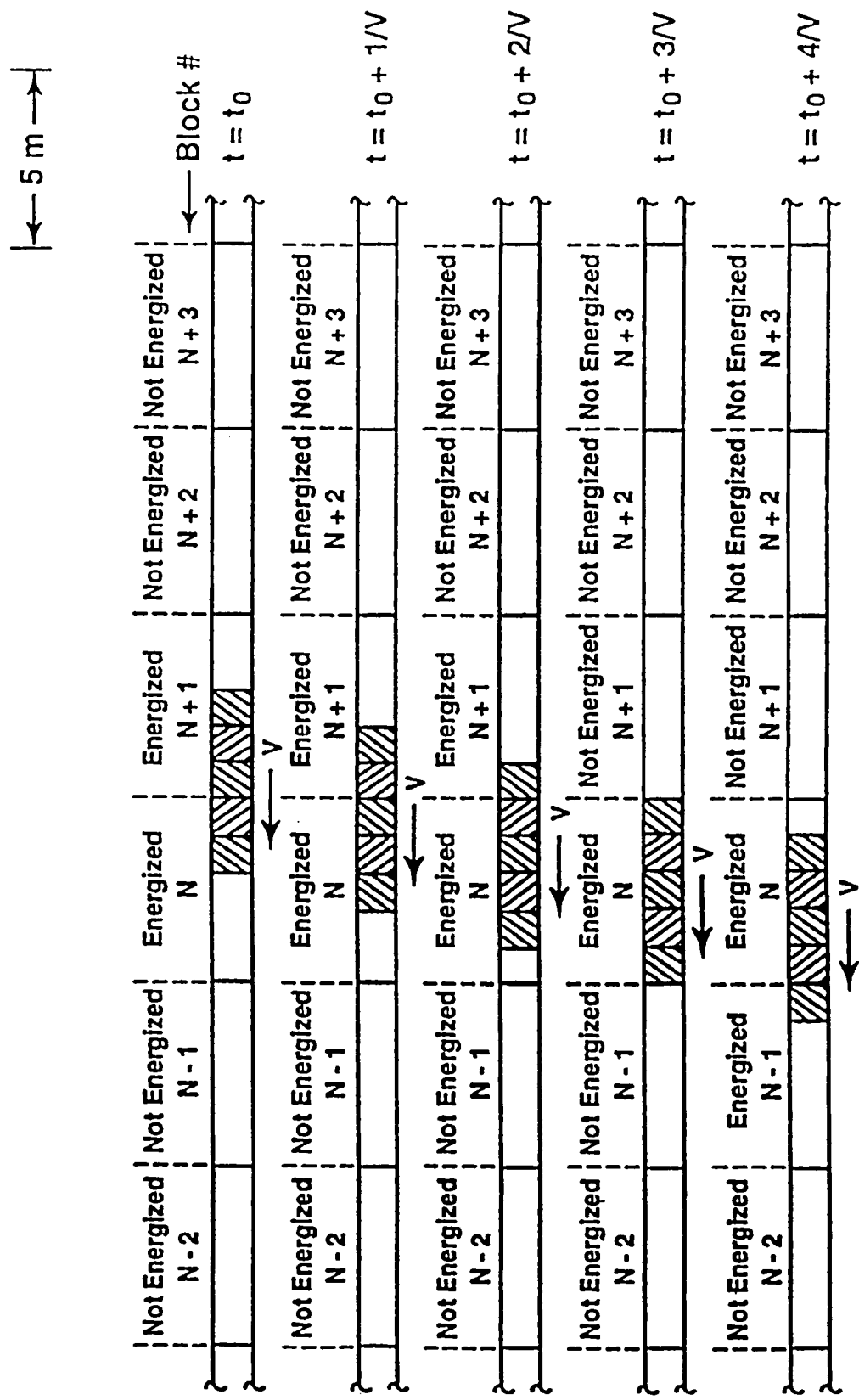
FIG. 22 is a schematic diagram illustrating the sequence for energizing propulsion blocks along a guideway for the system of the invention for electrical power storage and delivery.

FIG. 22 shows how the energized blocks would operate in the case where two sequential blocks were energized to propel the vehicle, in an example such as where there are five magnet pairs per vehicle per side (5 meters total length), the propulsion block length is 5 meters, and a maximum of two blocks are energized. Energization is shown for one phase only. When the vehicle was traversing the Nth and N+1 propulsion blocks, both would be energized. When the vehicle had advanced to the point where it was on just the Nth block, only that block would be energized. As the vehicle moved further, it would be on both the N−1 and Nth block, and both would then be energized.

TABLE 7

Number of Switches
Basis: Two kilometer elevation change
(2.83 km total upwards length)
θ = 45 Degrees
Propulsion loops on the two sides of vehicle connected
together (X, Y) switch geometry

| Parameters | $l_{EP}/l_P$ = | Number of Magnet Pairs on Vehicle | | | | | |
|---|---|---|---|---|---|---|---|
| | | 8 | | 10 | | 12 | |
| | | 2 | 4 | 2 | 4 | 2 | 4 |
| # of Propulsion blocks in 2.83 km up length, per phase | | 708 | 354 | 566 | 283 | 472 | |
| # of switches per phase in 2.83 km | | 54 | 27 | 48 | 24 | 44 | 22 |
| Total # of Switches for 3 phases in 2.83 km | | 162 | 81 | 144 | 72 | 132 | 66 |
| Total # of switches for 3 phases in 5.66 km (up & down sections) | | 324 | 162 | 288 | 144 | 264 | 132 |

Table 7 shows the total number of switches required for the 2.83 kilometer long power input/output section of the guideway for the system of the invention for electrical power storage and delivery. For all three phases of the propulsion windings, only 72 switches would be required, assuming $l_{EP}/l_P=4$ and 10 magnet pairs on the vehicle.

This is a very reasonable number of switches. If the energized block length were cut in half to $l_{EP}/l_P=2$, the number of switches would be doubled to 144, a still very reasonable number.

The total number of switches for the up and down sections of the two way guideway would be twice that for just the power input/output section, assuming that the energized block length were the same for both sections. In fact, since the propulsion current in the return section is about 1/10th of that in the power input/output section, the energized block length can be much greater, which would reduce the total number of switches to well below 100.

The number of switches can be further reduced by going to a three dimensional switch architecture, as illustrated in FIGS. 23 and 24, comparing the (x, y, z) switch geometry with (x, y) switch geometry. In FIG. 23, the connection to block 22 is made through switches (x2, y2). In FIG. 24, the third digit in location number refers to z planes which are stabilized vertically in representation. Cables run vertically from each x, y location to their corresponding location in the z planes. That is, 211 is connected to 212, 213, 214, etc. Each z plane has its own set of y111, y211, y311, etc. switches. The block at 215, for example is energized by switches x2 and y15. Using this connection pattern, 1000 blocks could be individually selected with only $(1000)^{1/3}(3)=30$ switches.

A summary of the differences between the (x, y, z) switch geometry with (x, y) switch geometry is given in Table 8 below.

TABLE 8

| | (x, y) Geometry | (x, y, z) Geometry |
|---|---|---|
| Number of Superconducting Magnet Pairs/Vehicle | 10 | 10 |
| $l_{EP}/l_P$ | 2 | 2 |
| Switches per phase (up section) | 48 | 27 |
| Switches for 3 Φ | 144 | 81 |
| Total Number of Switches (up and down sections) | 288 | 162 |

The total number of switches for this three dimensional architecture is given by the formula:

# of switches=3 (# of blocks)$^{1/3}$

Thus, for a grid of 1000 blocks, only 30 switches would be required. The choice of the particular architecture used will depend on a number of detailed factors, which in turn will depend on the particular system being considered.

Figure 25:
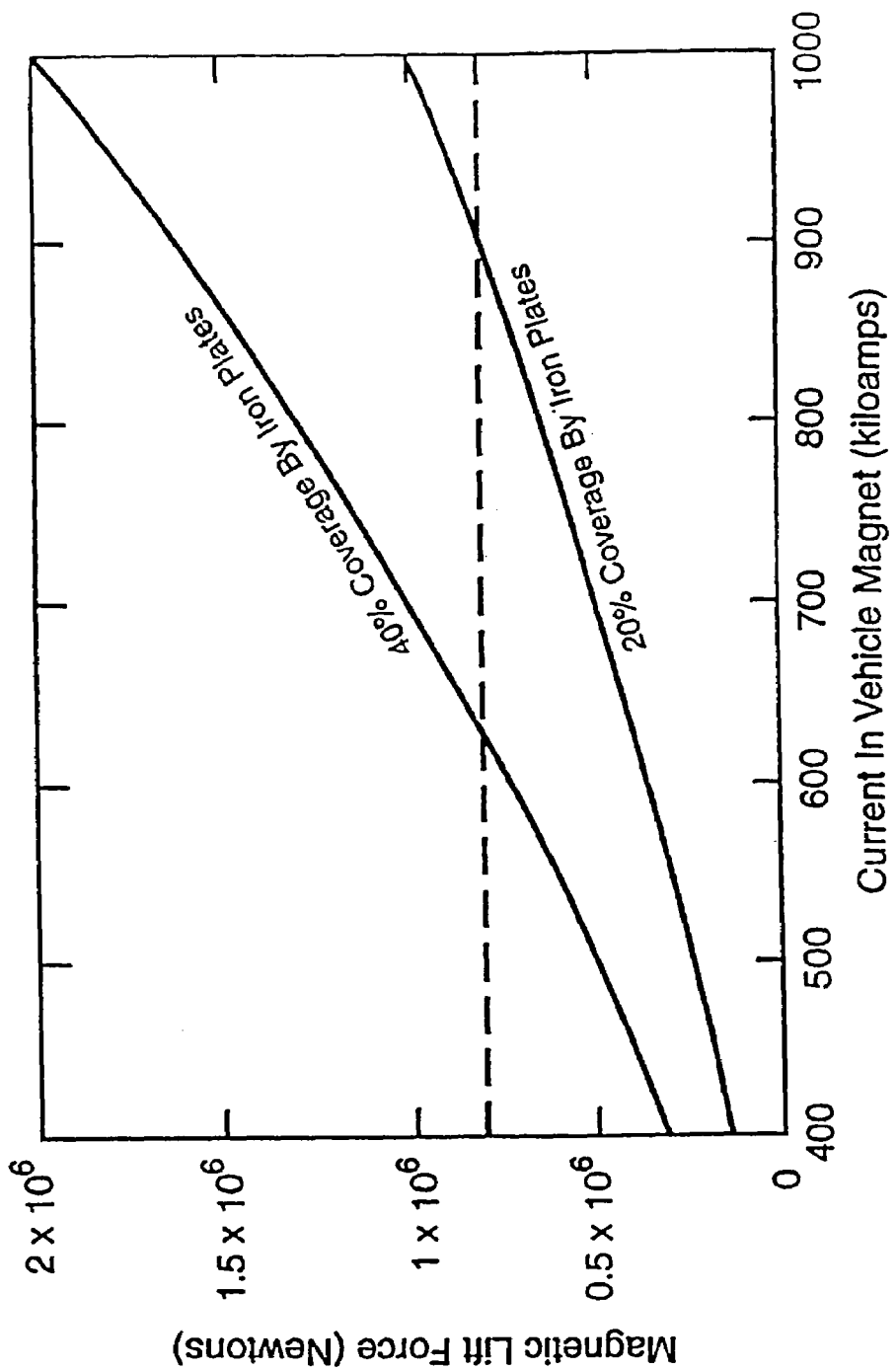
FIG. 25 is a graph illustrating the magnetic lift force from iron plates in a guideway beam for the system of the invention for electrical power storage and delivery, as a function of vehicle magnet current and fractional coverage of iron plates.

FIG. 25 shows the magnetic lift force provided by the iron lift plates as a function of the current in the superconducting magnets and the fractional longitudinal coverage of the guideway beam by the iron plates. For ten magnet pairs (1 meter width/pair), a total vehicle and storage mass weight of 110 tons (i.e., on the power input/output section of the track), a 20 centimeter (8 inch) separation between the superconducting magnet conductor and the iron plate, and a 45 degree guideway inclination, with the forces calculated by their magnetic image relationship, only about 25% of the guideway needs iron plate coverage. However, these calculations are idealized, in that: 1) the vehicle superconductor element is assumed to be an infinite wire of constant current direction, rather than on assembly of finite length conductors of alternating current direction, and 2) that the attractive force between the superconductor and the iron plates is a pure image force with no allowance for edge effects due to the finite width of the iron plate, and no permeability saturation effects. However, there appears to be a large lift force margin, so that full coverage by the iron plates will not be required, even when the above force correction effects are taken into account. With regard to the return section of the guideway where the unloaded vehicle only weighs about 10 tons, the required fractional coverage by iron plates will be very small, probably less than 10 percent.

Figures 26A, 26B, 26C:
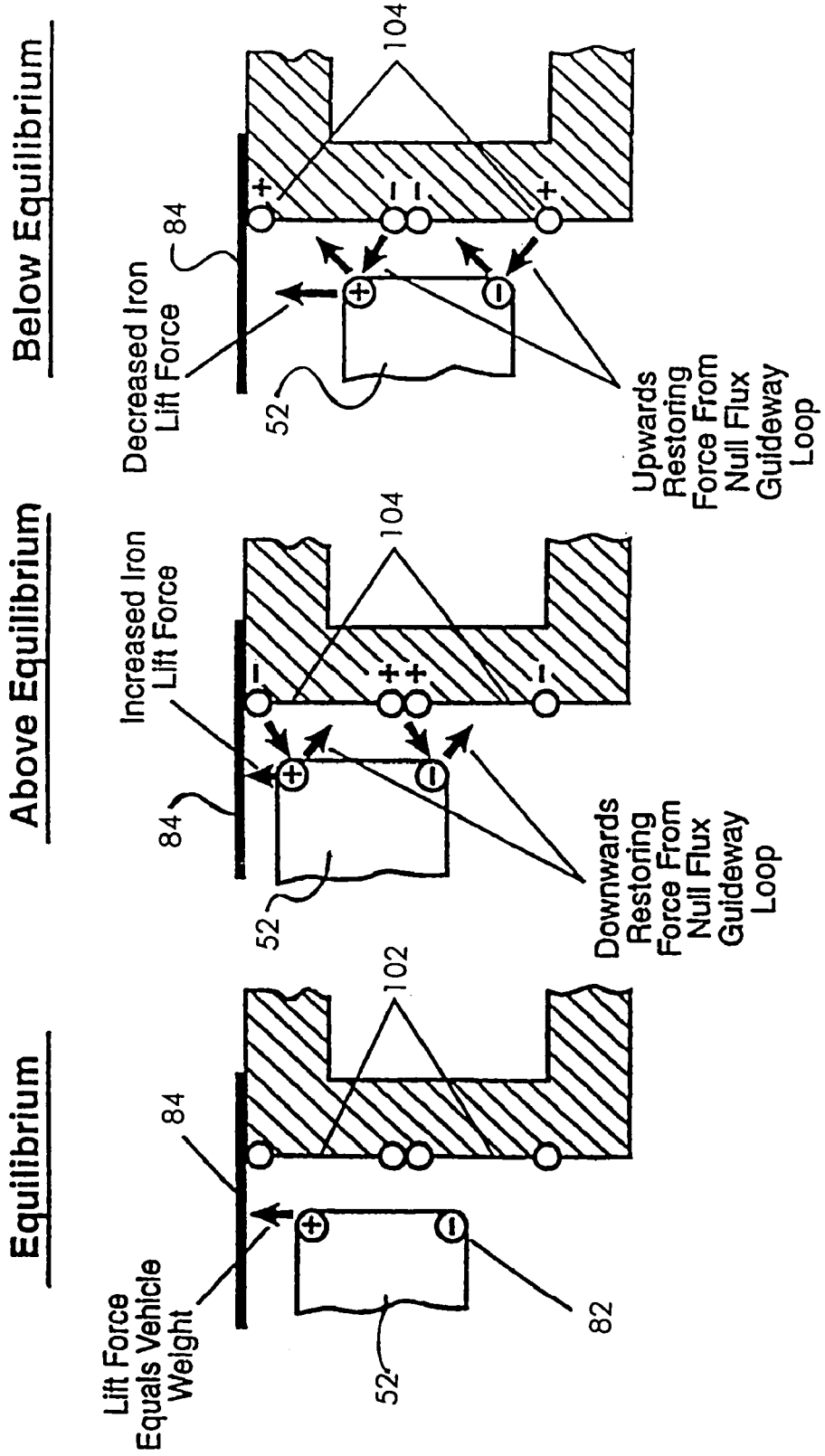
FIGS. 26A, B and C illustrate the guideway loop panel layout for vertical stability of the energy storage vehicle of the invention, at vertical equilibrium, above vertical equilibrium, and below vertical equilibrium.

FIGS. 26A–C, showing vehicle vertical position, and 27A–C, showing vehicle lateral position, show the guideway loop arrangement for vertical and lateral stability of the vehicle for the system of the invention for electrical power storage and delivery. These figure of 8 (FIGS. 26A–C) and cross connected dipole (FIGS. 27A–C) null flux loop circuits 102 are similar to those used for the passenger/freight application. Vertical and lateral stability is provided automatically and passively by induced non-zero currents 104 in the null flux loops if the vehicle moves upwards or downwards, left or right of its equilibrium suspension point. When at its equilibrium point, there are no induced currents in the null flux loops (the vehicle weight is balanced by the iron lift forces), and there are no $I^2R$ losses in the stability loops. $I^2R$ losses are generated if the vehicle departs from its equilibrium point, but these are small compared to those in the propulsion windings.

Figure 28:
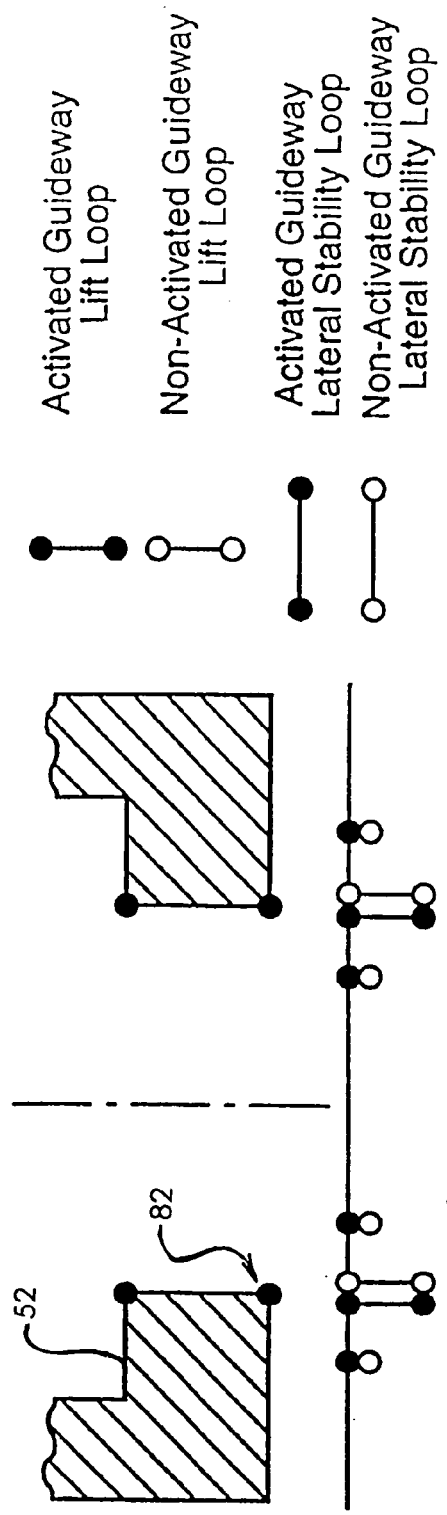
FIG. 28 is a cross-sectional schematic diagram of a guideway arrangement for switching energy storage vehicles to a siding when not in use for storage or generation of electric power.
Figure 29:
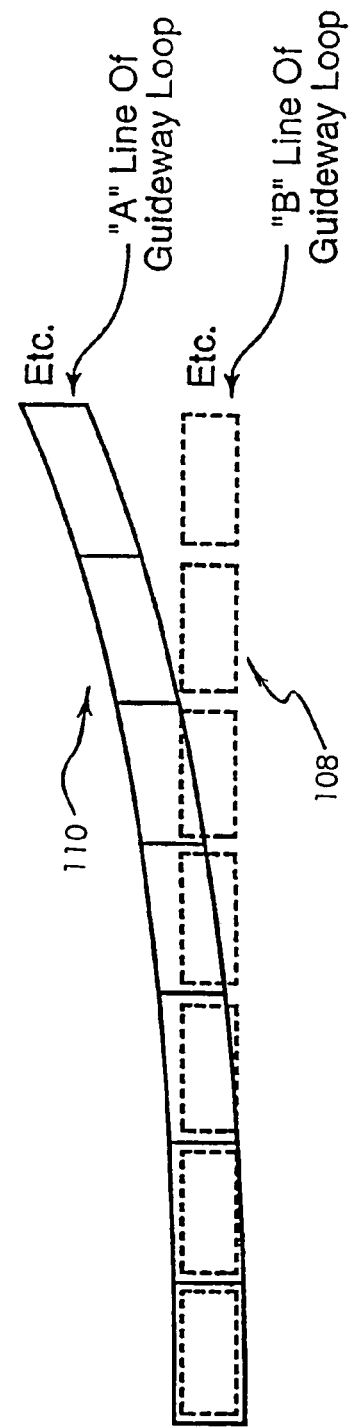
FIG. 29 is a top view of the guideway arrangement of FIG. 28 for switching energy storage vehicles to a siding when not in use for storage or generation of electric power.

FIGS. 28 and 29 show the switching guideway 106 loop arrangement used to switch vehicles from the main guideway 108 onto a siding 110 if they are not needed to store or generate electric power for the external grid. Referring to FIG. 29, the vehicle will follow whichever line of the guideway loops, "A" or "B", is activated. When needed, the stationary vehicles would be switched off the siding and onto the main guideway. The switching step would be carried out when the vehicle was unloaded, on a planar section of guideway, not a narrow beam section. The switch section has two overlapping lines of loops, one of which continues along the main guideway (which the transitions back to a narrow beam configuration) with the second leading to the siding. If the vehicle is to continue along the main guideway, electronic switches activate the first line of loops and open circuits the second line; if the vehicle is to go onto the siding) another set of electronic switches activates the second line of loops and open circuits on the first line. The switch section is planar, with no projecting structure to obstruct vehicle movement to either line of loops. The lift and stability forces are provided by passive aluminum loops on the guideway. There are no iron lift plates.

Mechanical switching, in which the desired line of guideway loops is brought into position, while the non-operating line of guideway loops is shunted aside, can also be used in place of electronic switching, if desired.

DESCRIPTION OF THE SYSTEM OF THE INVENTION FOR ELECTRICAL POWER STORAGE AND DELIVERY USING VERTICAL SHAFT GUIDEWAYS

The main differences between the system of the invention for electrical power storage and delivery operating on an angled guideway and a vertical shaft guideway are:

1) In the vehicle shaft guideway, all of the lift force on the vehicle must be supplied by the propulsion winding. Iron lift plates cannot be used to provide a partial lift force, as in the angled guideway.
2) The narrow beam type guideway cannot be used to move the vehicle vertically in the shaft guideway. Instead, guideway panels on end side of the shaft have to be used to move the vehicle vertically, and to stabilize it laterally.
3) Unloading and loading of the vehicle is done at one point at the top and one point at the bottom of the vertical shaft, rather than at a succession of points along the guideway, as was done with the angled guideway.

Figures 30A, 30B:
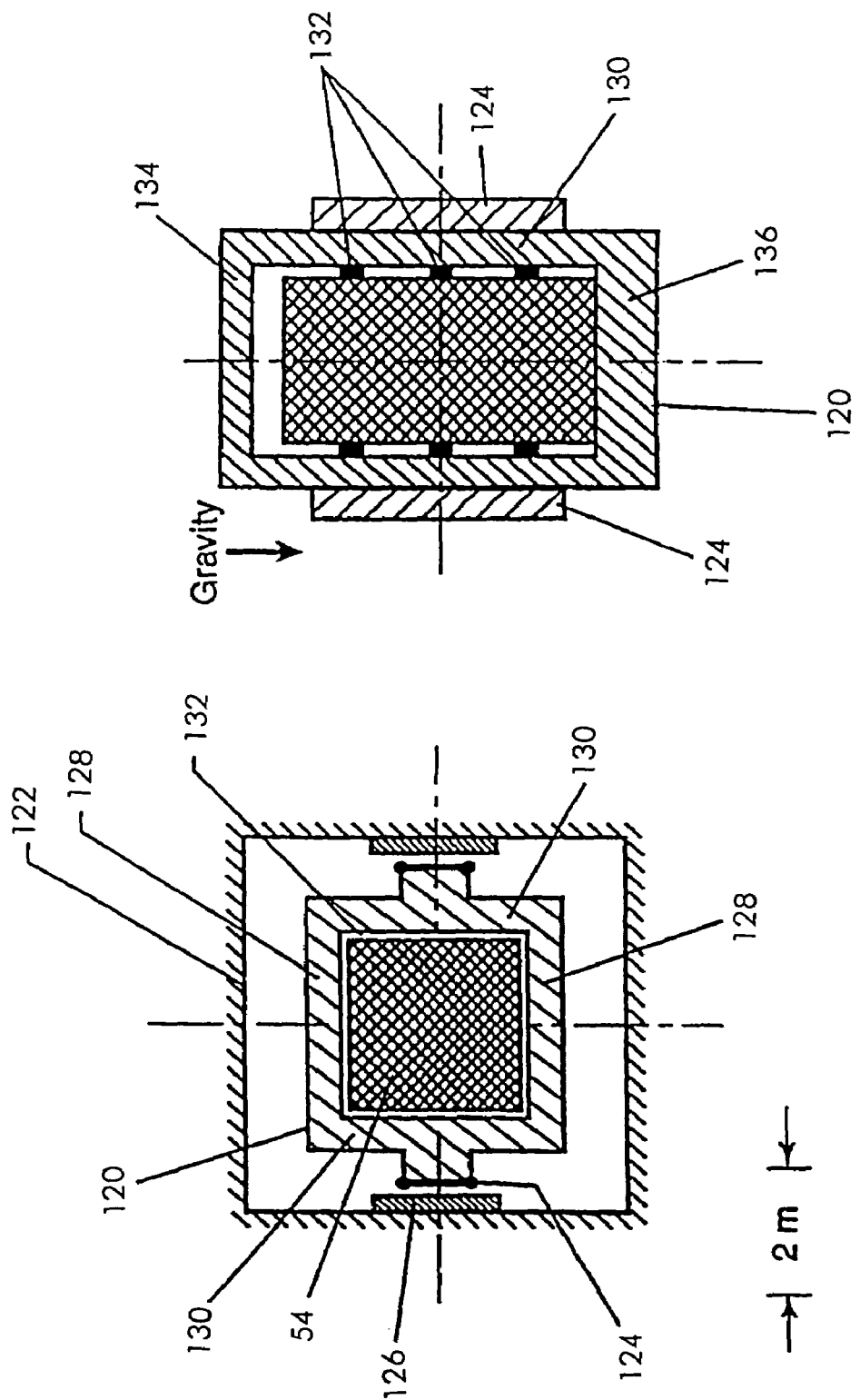
FIG. 30A is a top cross-sectional view of an underground shaft with an energy storage vehicle and guideway panels in a vertical shaft for the system of the invention for electrical power storage and delivery.
FIG. 30B is a side cross-sectional view of the underground shaft with an energy storage vehicle and guideway panels in a vertical shaft as shown in FIG. 30A.

FIGS. 30A and B show the layout of an energy storage vehicle 120 according to the system of the invention for electrical power storage and delivery using a vertical shaft guideway 122. Each side of the vehicle has a line of superconducting dipole loops 124 that interact with a line of guideway loop panels 126 on the sides of the vertical shaft. The vehicle typically has open sides 128 and closed sides 130. As is explained further below, a gap 132 is provided between the vehicle structure and the storage mass. The superconducting dipole loops are the same as those for a vehicle operating on an inclined narrow beam guideway, except that instead of being located on the opposite sides of a narrow beam, they are located on the opposite sides of the vertical guideway.

As is illustrated in FIG. 30B, the 100 ton storage mass is held in place inside the vehicle according to the system of the invention for electrical power storage and delivery, which is constructed of I-beams as an open cage, by a set of retractable supports 132 positioned on the I-beams of the vehicle. The vehicle has a top 134 and a bottom 136, and the weight of the storage mass is supported by the bottom of the vehicle cage.

TABLE 9

Numerical Values of Propulsion Current and $I^2R$ Losses as a Function of Number of Magnet Pairs on an Energy Storage Vehicle in a Vertical Shaft Guideway

| | $N_m$ (Number of Magnet Pairs) | | | | | |
|---|---|---|---|---|---|---|
| | 8 | | 10 | | 12 | |
| Parameters | 2 | 4 | 2 | 4 | 2 | 4 |
| $I_G^*$, KA | 113 | → | 90 | → | 75 | → |
| $(I_G)_{RMS}$, KA | 80 | → | 64 | → | 53 | → |
| $[(I_G)_{RMS}]_{3\theta}$, KA | 26.7 | → | 31 | → | 18 | → |
| $l_P$, Meters | 16 | → | 20 | → | 24 | → |
| $P(I^2R)_{3\phi}$, KW | 244 | 488 | 194 | 388 | 162 | 324 |
| $P_{TOT}$, KW | 732 | 1464 | 582 | 1164 | 484 | 896 |

Table 9 above shows the $I^2R$ losses in the propulsion windings for a vertical shaft system according to the invention for electrical power storage and delivery as a function of the number of magnet pairs on the vehicle, and the length of the energized sections of propulsion windings on the guideway. These $I^2R$ losses are twice those for a vehicle according to the system of the invention for electrical power storage and delivery traveling on a narrow beam guideway at an incline angle of 45 degrees (Table 6) because 100% of the vehicle weight in a vertical shaft guideway is supported by the propulsion winding rather than 70.7% of it, as is the case for a 45 degree guideway with iron lift plates.

Figure 31:
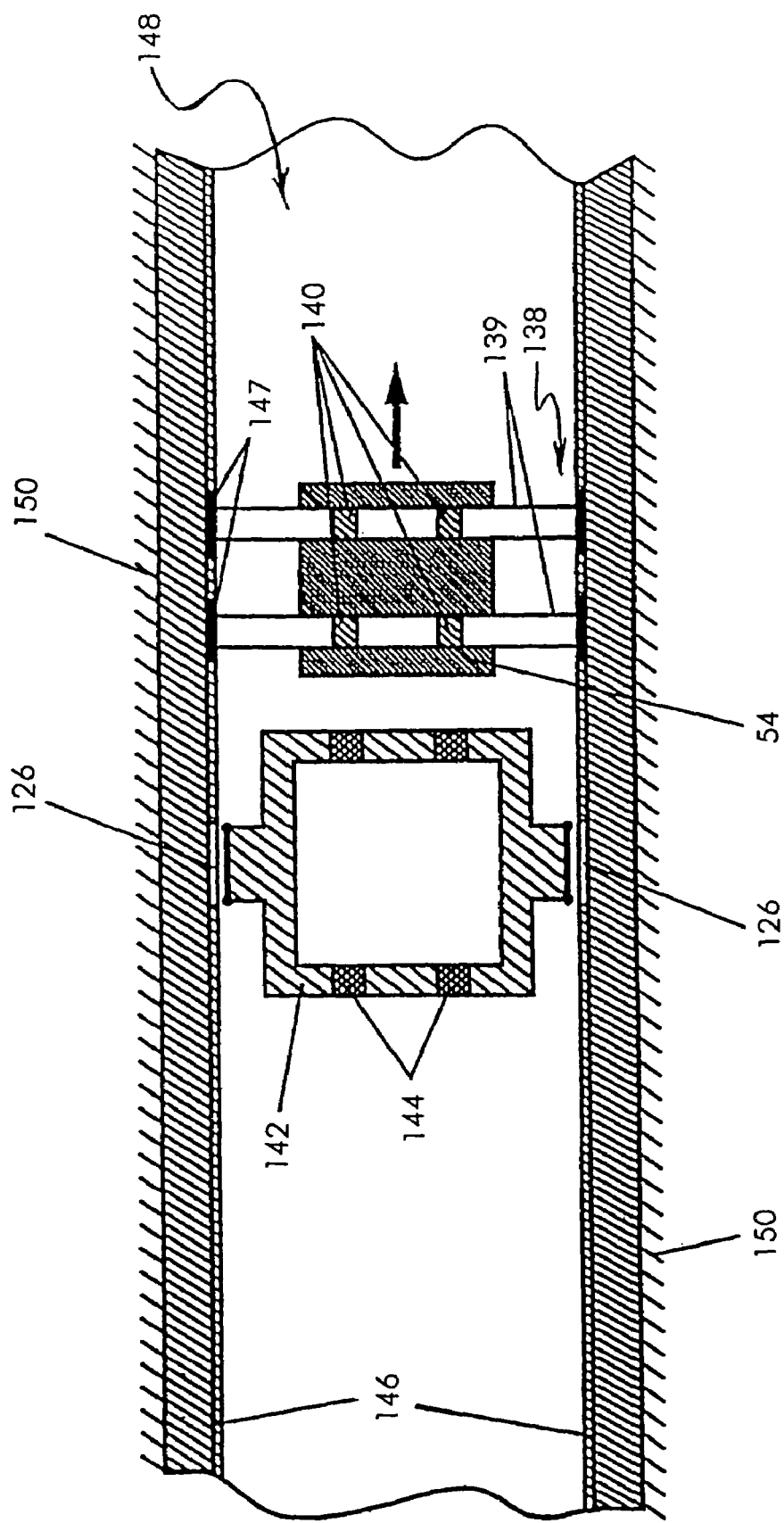
FIG. 31 is a schematic diagram of unloading and loading equipment for storage masses using a vertical guideway in the system of the invention for electrical power storage and delivery.

Storage masses 54 are unloaded and loaded from the vehicle 120 using an overhead trolley 138 of the type shown in FIG. 31. As with the storage masses for the angled guideway, the overhead trolley has arms 139 with extendable struts 140 that fasten to the reinforced concrete storage block 54, and lift it up off the base of the vehicle 120, and move it laterally to the side. The I-beams 142 at the top of the vehicle cage have retractable sections 144 that can swing aside to allow the storage mass to move laterally out of the cage.

Figure 32:
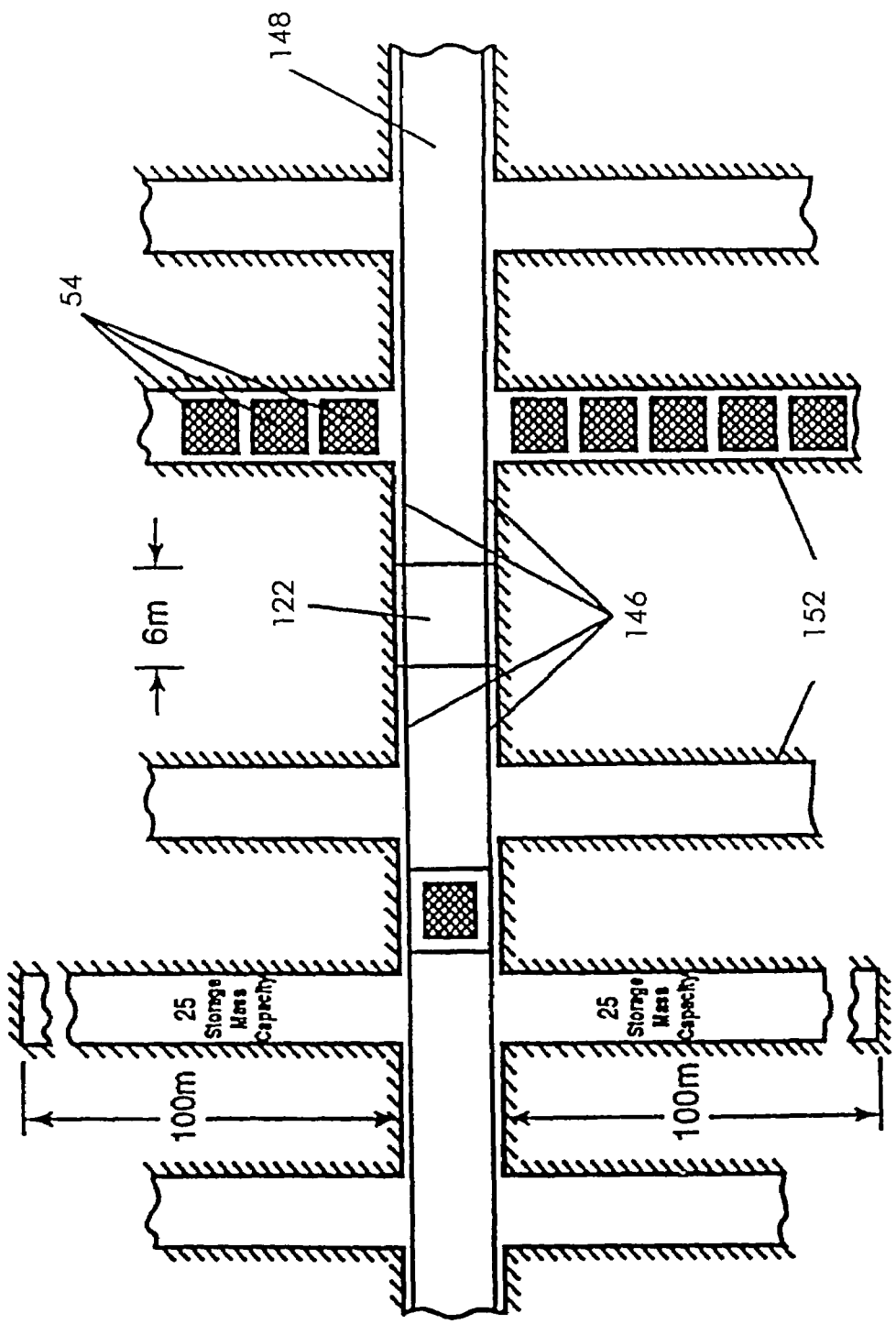
FIG. 32 is a schematic diagram illustrating the storage field geometry and dimensions for a vertical shaft guideway in the system of the invention for electrical power storage and delivery.

The overhead trolley moves the storage masses on a track 146 for the wheels 147 of the trolley along a long transfer tunnel 148 in the rock wall 150 to the left or right of the loading/unloading point, as shown in FIG. 32. The two transfer tunnels have a number of side tunnels 152 where the 100 ton masses are stored while not being moved up or down the vertical shaft guideway.

During the power generation phase, loaded vehicles according to the system of the invention for electrical power storage and delivery travel down vertical shaft #1 converting gravitational potential energy into electric power. When the vehicle reaches the unload/load point in the shaft, the 100 ton storage mass is unloaded from the vehicle by the trolley, which transfers the storage mass to a suitable point in one of the side tunnels.

The unloaded vehicle then drops below the unload/load point, and moves sideways to vertical shaft #2, where it travels upwards to the surface unload/load point. There, a new 100 ton storage mass is loaded onto the vehicle, which then transfers back to vertical shaft #1. The vehicle then travels downwards, generating further power.

The process reverses when the system of the invention for electrical power storage and delivery takes electrical energy from the grid and stores it as gravitational potential energy of the 100 ton masses. The 100 ton mass is then loaded onto a vehicle at the bottom of vertical shaft #1, and the loaded vehicle lifted up to the surface unload/load point using electrical power drawn from the power grid. The 100 ton mass is then lifted off the vehicle and stored in a yard at the surface. The unloaded vehicle then moves laterally to vertical shaft #2, in which it travels downwards to the bottom of the shaft. It then moves laterally to the unload/load point at the bottom of shaft #1, where it picks up a new 100 ton storage mass, and ascends to the surface again.

EXAMPLE

Figure 33:
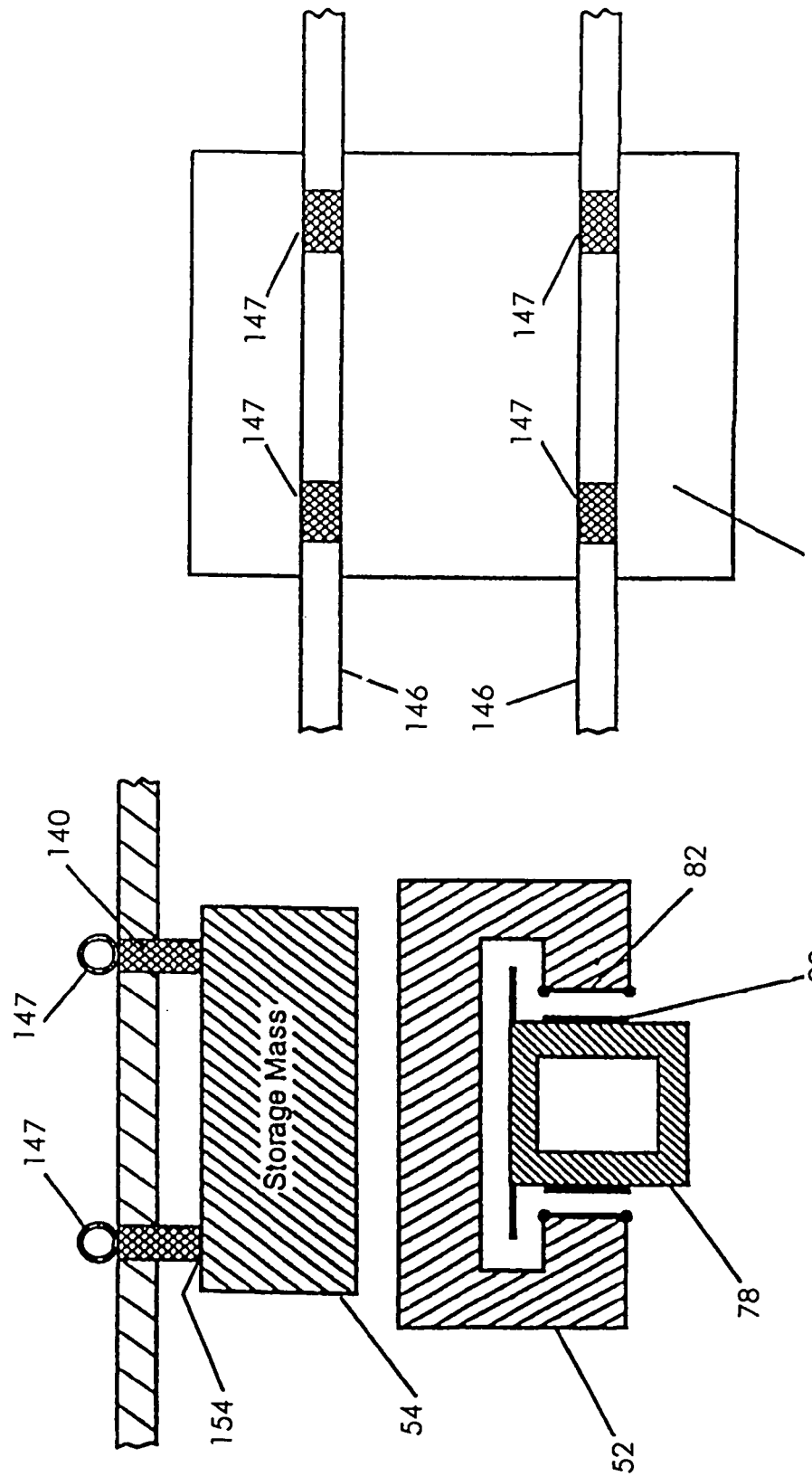
FIG. 33A is an end view illustrating the process of lifting a storage mass from an energy storage vehicle according to the system of the invention for electrical power storage and delivery.
FIG. 33B is a top view illustrating the process for lifting a storage mass from an energy storage vehicle according to the system of the invention for electrical power storage and delivery.

System Parameters for Vertical Shaft Guideway 2 kilometer elevation change
100 ton storage mass
0.5 MWH stored per unit 100 ton mass
90 degree inclination for guideway
Below surface
>90% energy storage efficiency (output/input)
10 ton vehicle weight (unloaded)
110 ton vehicle weight (loaded)
60 meter/sec (134 mph) vehicle velocity
10 round trips per hour for vehicle
100 seconds to load or unload vehicles
Dipole loop magnets along each side of vehicle
1 meter magnet pitch (distance between loops of same polarity)
10 magnet pairs per vehicle (5 on each side)
0.5 meter loop width
Vertical shaft guideway
Figure of 8 null flux guideway loops provide lateral stability
Dipole null flux guideway loops provide stability normal to superconducting dipole loops
60 hertz, three phase propulsion winding acts as motor to propel loaded vehicle goes down the shaft, to return electric power to grade The example above summarizes the baseline system parameters for the vertical shaft guideway configuration. The angled guideway and vertical shaft guideway configuration can be developed in parallel so that systems can be implemented at a wide range of locations, both in flat terrain, and in terrain with substantial elevation changes. The vehicle magnets and guideway panels are very similar. The vehicle configurations are different, but this would not pose any problem Loading and Unloading FIGS. 33A and 33B show an illustration of equipment that could be used to load and unload storage masses from the vehicles. It consists of two overhead beams 146 with four extendable struts 140 that lock onto fastening means 154 such as projections or keyways at attachment points in the upper surface of the block. Alternatively, the struts could contain electromagnets that when energized, attract and stick to iron plates on top of the block, enabling it to be lifted.

Figure 34:
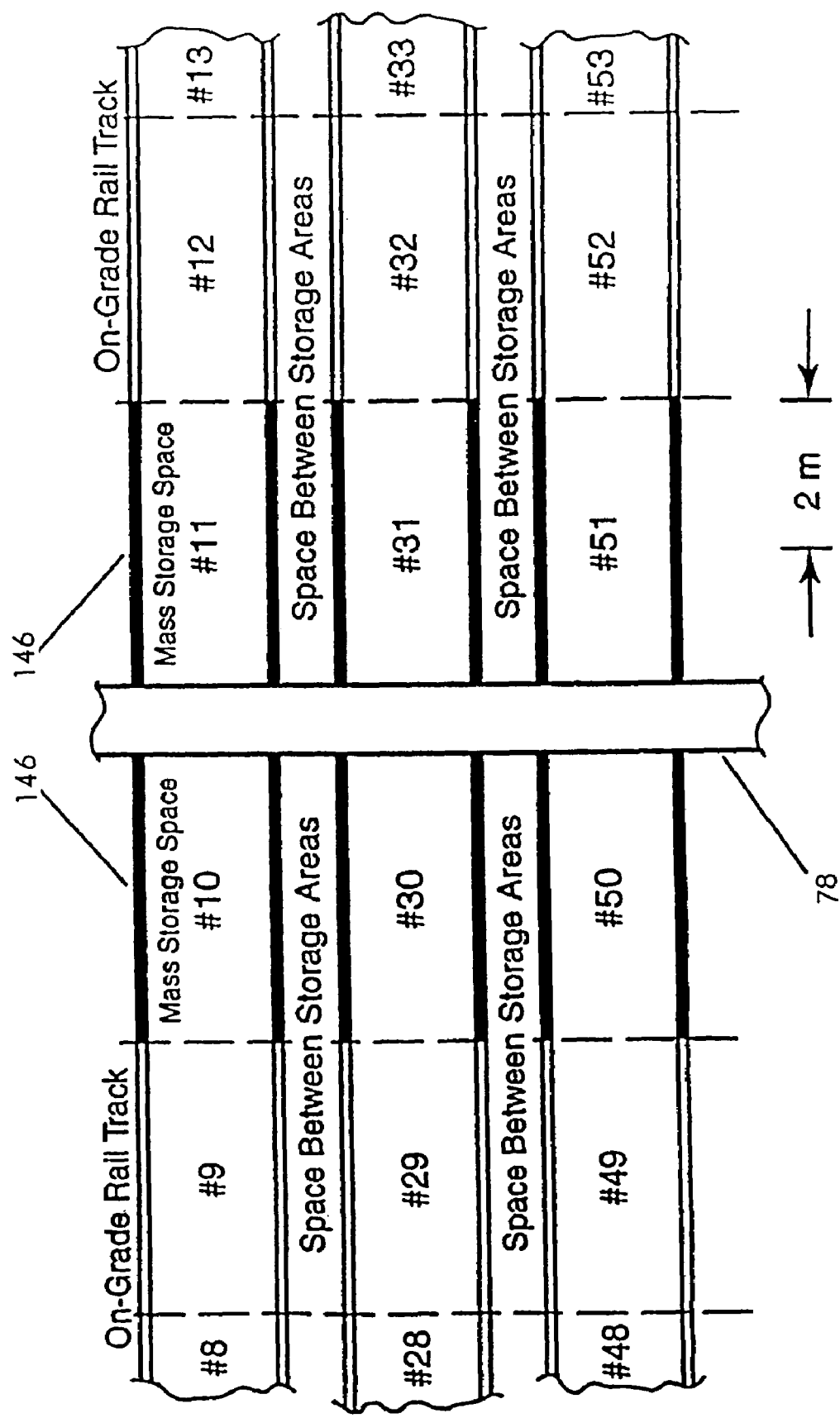
FIG. 34 is a schematic diagram illustrating the transfer of storage masses from an unload/loading beam to an on-grade rail support system.

Referring to FIG. 34, when the block is being unloaded, the struts extend downwards and lock onto the block, and then lift it off the upper surface of the vehicle. The vehicle then moves out, continuing along the guideway. At the same time, the block moves sideways along the overhead beam, supported by wheels that ride on the beam.

The sequence is reversed during the block loading process. The block is moved into position, the vehicle moves in under it, and the block is lowered onto the vehicle and locked into place. The vehicle then moves on. The up and down distance for the block unload/load process is only a few inches. Other methods of unloading storage blocks are possible, including wheeled transfer carts. One promising alternative is the use of a rollway, in which the block would be pushed or pulled off a flat plane of rollers on top of the vehicle to a corresponding flat plane of rollers on the lateral storage track.

Figure 35:
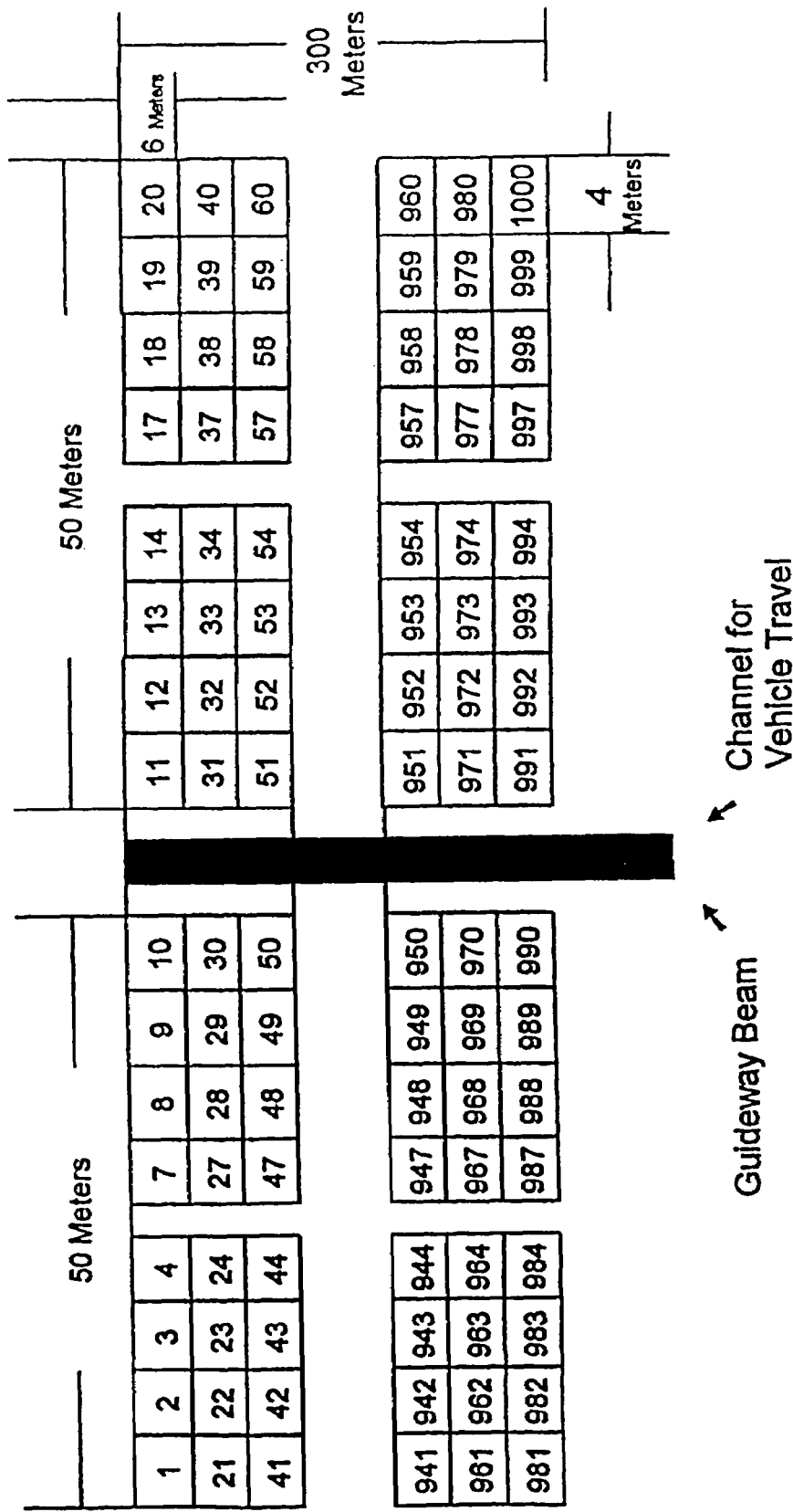
FIG. 35 is a schematic diagram of an illustrative storage field geometry and dimensions according to the system of the invention for electrical power storage and delivery.

FIG. 35 shows an illustrative layout for the mass storage yard, based on a 100 meter wide by 300 meter wide storage area. A typical storage mass has dimensions of about 3.5 meters in width, about 2.5 meters in height, and about 4.5 meters in length. With about 1.5 meters between adjacent masses, along the width and length, a 7 acre yard could store 1000 masses, equivalent to 500 MWH of electrical energy. Additional storage could be easily supplied by increasing the width and/or length of the yard.

The storage masses would be laid out in rows of 20 (10 on each side of the guideway), with approximately 1 meter spacing between masses.

Figure 36:
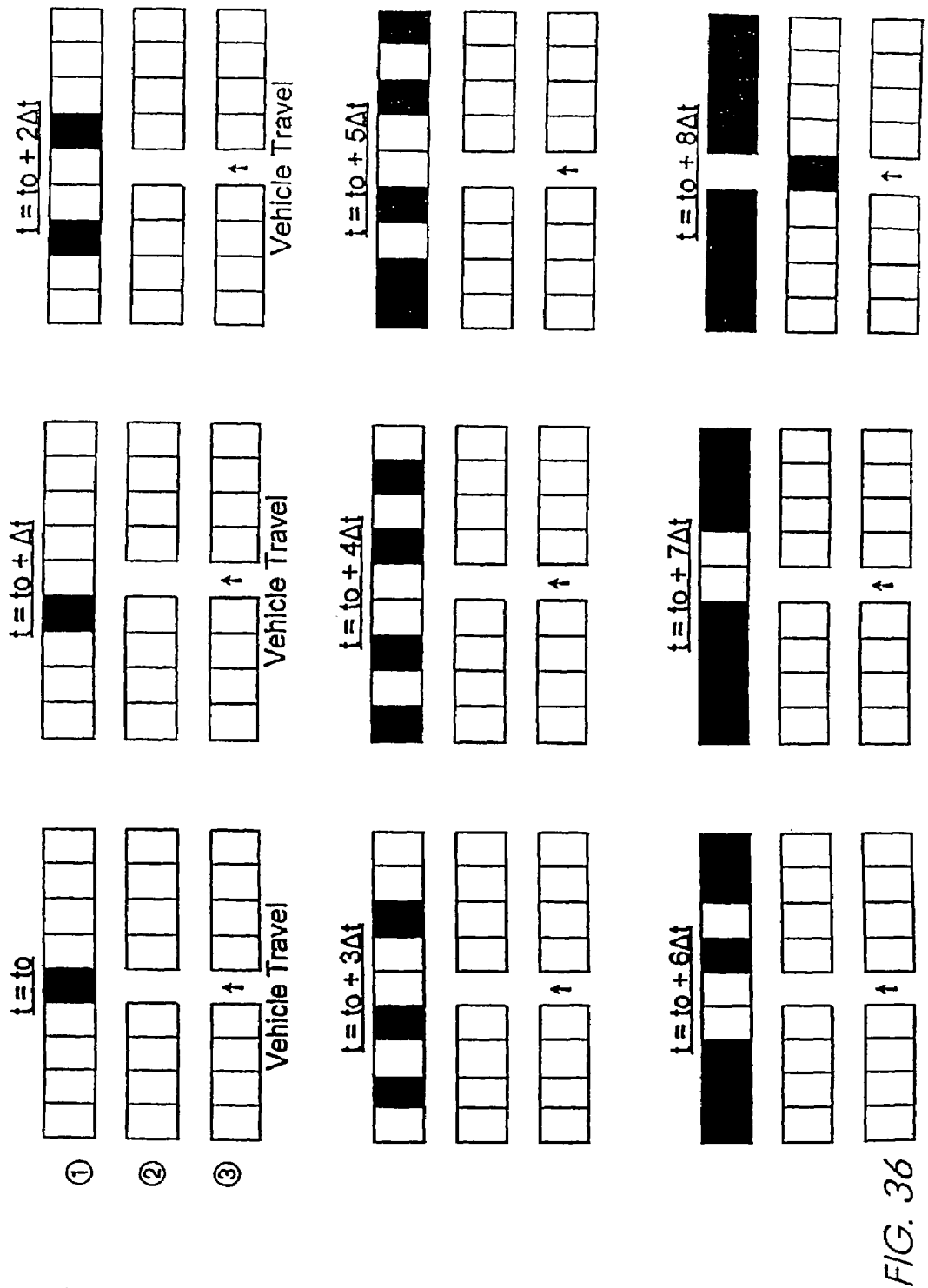
FIG. 36 is a schematic diagram showing an illustrative unloading pattern for storage masses according to the system of the invention for electrical power storage and delivery.

FIG. 36 shows an illustrative loading pattern for the storage masses. As successive vehicles moved up to a given row, they would unload their storage masses and then move out to return to the base of a guideway to pick up additional masses to be transported uphill. The unloaded masses would alternately move right and left along the row, to be stored there until they were needed for electrical generation, when they would be moved back along the row to be loaded onto vehicles.

The pattern shown in FIG. 36 corresponds to the case where the unload time on a vehicle is shorter than the time internal between arriving vehicles. If the unload time is longer than the interval between vehicles, more than one row would be engaged in unloading vehicles at the same time. The vehicles would then move in coordinated blocks of several rows, with the number of rows determined by the ratio of unload time to the time interval between arriving vehicles.

The load pattern for the system of the invention for electrical power storage and delivery would be similar to the unload pattern, except that the storage masses would move inward along the rows towards the guideway rather than outward.

EXAMPLE

System Parameters for Baseline Vehicle/Guideway Configuration 2 kilometer elevation change;
100 ton storage mass;
0.5 MWH stored per unit 100 ton mass;
45 degree angle of inclination for guideway (nominal);
Either above surface or below surface (tunnel) guideway;
>90% energy storage efficiency (output/input);
10 ton vehicle weight (unloaded);
110 ton vehicle weight (loaded);
60 meter/sec (134 mph) vehicle velocity;
10 round trips per hour for vehicle;
100 seconds to load or unload vehicle;
Dipole loop magnets along each side of vehicle;
1 meter magnet pitch (distance between loops having same polarity);
10 magnet pairs per vehicle (5 on each side);
0.5 meter loop width;
Narrow beam guideway;

Iron plates above vehicle dipole loops provide vehicle lift force;

Figure of 8 null flux guideway loops provide vertical stability; and

Dipole null flux guideway loops provide lateral stability.

A 60 hertz, three phase propulsion winding acts as motor to propel loaded vehicle up grade to store energy, and as generator when loaded vehicle goes down grade, to return electric power to grade.

One facility for the system of the invention for electrical power storage and delivery could deliver, if desired, 1000 MW(e), or more, of output power; or 1000 MWH, or more, of stored electric energy.

The facility for the system of the invention for electrical power storage and delivery could come on line in less than one minute, and can be used as spinning reserve.

The system of the invention for electrical power storage and delivery has minimum environmental impact: i.e., producing no pollution (gases, $CO_2$, or thermal); producing no significant noise; requiring a small land foot print for an above surface facility (40 acres for 1000 MWH); and requiring no land foot point for sub-surface facility.

The principal parameters for a baseline system utilizing an inclined guideway are given in the example above. The values are illustrative and could be somewhat different for an actual application, depending on terrain, required storage capacity, and the like However, it appears simple to adjust the parameters to whatever conditions exist in the actual application.

The input/output voltage of the propulsion windings for the system of the invention for electrical power storage and delivery is determined by the number of turns in the guideway propulsion loops. At 60 meters per second and 7 inch separation, the 5 magnet pairs on each side of the vehicle will generate 500 volts rms in each phase of the three phase windings, per turn of winding. Depending on the desired voltage level for the transformers that connect the system of the invention for electrical power storage and delivery to the grid, the number of turns in the propulsion winding will be determined. At 12 KV, for example, the propulsion winding would require 12,000/500 or 24 turns, if the windings on the sides of the vehicle were connected in parallel, or 12 turns if connected in series.

The blocks can be rapidly moved onto or off from the vehicle using an overhead trolley-wheel system as illustrated in FIGS. 33A and 33B, or on rollways, and can be stored on pads located adjacent to the maglev guideway at its high and low altitude points. A 100 meter×600 meter long (6 acres) storage facility could handle and deliver 2000 storage masses, equivalent to 1000 MWH of electrical energy at an elevation change of 2 kilometers (6000 feet). Overall energy efficiency, output electrical energy/input electrical energy, would be well above 90%—much higher than any other electrical storage technology.

For a mass unload time of 100 seconds and a mass load time also of 100 seconds (both steps are necessary during a vehicle round trip, whether the system of the invention for electrical power storage and delivery is operating in the power storage or power delivery mode) a given vehicle for the system of the invention for electrical power storage and delivery could make 10 round trips per hour. This is quite conservative, since the 100 second intervals could probably be reduced to about 30 seconds, considering the simplicity of the transfer process, and the fact that the block only has to be lifted by a few inches to enable the vehicle to move forward for the return half of its round trip. The total number of round trips per hour would then approach 20.

The small land footprint and absence of environmental problems, together with its low storage cost, make the system of the invention for electrical power storage and delivery very attractive for peaking power and spinning reserve applications. In the near term, buying excess baseload night-time power at $50 per MWH (5 cents/KWH), storing it in the system, and selling it at $200 per MWH for peaking power, a price that corresponds to typical peaking power cost in California, would yield a return on the total capital investment (ROD in the system of the invention for electrical power storage and delivery of approximately 67 percent per year, assuming that it delivered power for 1500 hours annually. Such a rate of return would make the system of the invention for electrical power storage and delivery a very attractive investment proposition. A 500 MW(e) unit delivering power for 4 hours daily would produce net revenues (sales—cost of purchased power—O&M costs) of 100 million dollars per year on a total capital investment of 150 million dollars.

A second, very attractive feature is the completely non-polluting environmentally benign nature of the system of the invention for electrical power storage and delivery. This feature, and its ability to substitute for peaking plants that burn fossil fuels and produce pollution, should make it possible to obtain permits and site approval very quickly and easily. Furthermore, since the maglev guideway would not carry passengers, safety certification would be considerably easier.

Facilities for the system of the invention for electrical power storage and delivery could be erected in a short time, e.g., 3 years or less, to meet increasing peak power demands. The total land use for a 2000 MWH facility, including a dual 3 km long guideway, is only about 20 acres. Most facilities would be sited in remote areas and would not impact the environment. At the design speed of 130 mph, the vehicles would be virtually silent, with aerodynamic noise below ambient levels.

The system of the invention for electrical power storage and delivery is very attractive for near term peaking power needs. It is even more attractive for low cost energy storage used in conjunction with solar and wind power generation. The electric output from solar and wind power sources is inherently variable and nonpredictable. Combined with the system of the invention for electrical power storage and delivery, however, solar and wind sources can deliver steady, reliable power that meets variations in load demand.

The cost of steady power from solar electrical generation in combination with the system of the invention for electrical power storage and delivery is competitive with the cost of new combined cycle natural gas power plants, and is expected to be increasingly competitive as demand for oil and gas grows and reserves are depleted, and their cost rises.

Wind power capacity is increasing very rapidly in this country, and by the end of the decade, it could easily reach 10% of US capacity, especially if there were a low cost energy storage system available to it. The present invention, when used in combination with wind power generation of electricity, allows even greater reliance to be placed on normally unpredictable wind power, since power can be supplied to the grid even when the wind was not blowing.

An attractive spin-off of the system of the invention for electrical power storage and delivery is the demonstration of a practical maglev mining capability. The about 100 ton mass lifting capability of the system of the invention for electrical power storage and delivery substantially exceeds the lifting capability required for mining, which is probably 20 to 30 tons at a maximum.

Figure 37:
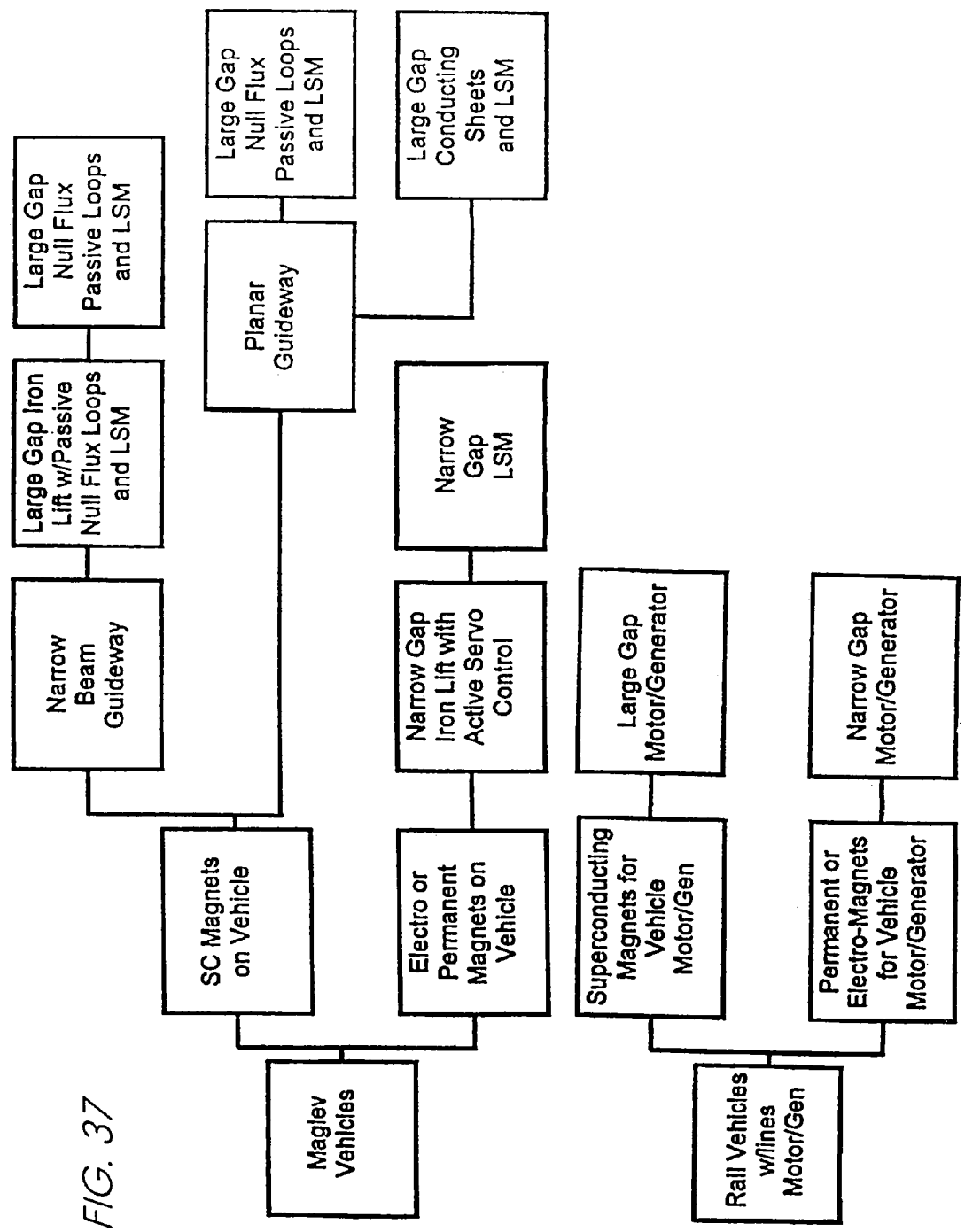
FIG. 37 is a flow chart illustrating different alternate embodiments for storing and delivering electrical energy according to the system of the invention for electrical power storage and delivery.

There are a number of different alternate embodiments that can store and deliver electrical energy. As is illustrated in FIG. 37, storage and delivery of stored electrical energy can be accomplished by superconducting maglev vehicles via (1) the narrow beam configuration for inclined guideways, and its derivative configuration for vertical shaft guideways, and (2) a planar configuration for inclined guideways. Embodiments for the system of the invention for electrical power storage and delivery in which electromagnets or permanent magnets are used in conjunction with iron lift plates are also possible (FIG. 37). However, expensive fast response servo control of the magnetic lift force would be required on each vehicle. In addition, the lift force is substantially weaker than that with superconducting magnets, and the suspension gap would be much smaller—e.g., a quarter of an inch compared to about 6 inches with superconducting magnets. The much greater precision required for such smaller gap suspensions would greatly increase guideway cost relative to that for superconducting maglev.

Systems according to the invention for electrical power storage and delivery can also be designed to use steel wheel on rail suspensions for the vehicle, with electromagnetic propulsion, as indicated in FIG. 37. The method of propulsion can use either superconducting magnets permanent or electromagnets on the vehicle.

The use of steel wheel on rail suspensions for an energy storage vehicle, while technically feasible appears to have significant limitations:

1) Operating speed of 60 mph (134 mph) would be hard to achieve.
2) The vehicles would need elaborate, heavy secondary suspensions.
3) The rails and wheels would require frequent maintenance and repair, due to the heavy usage.

Figure 38:
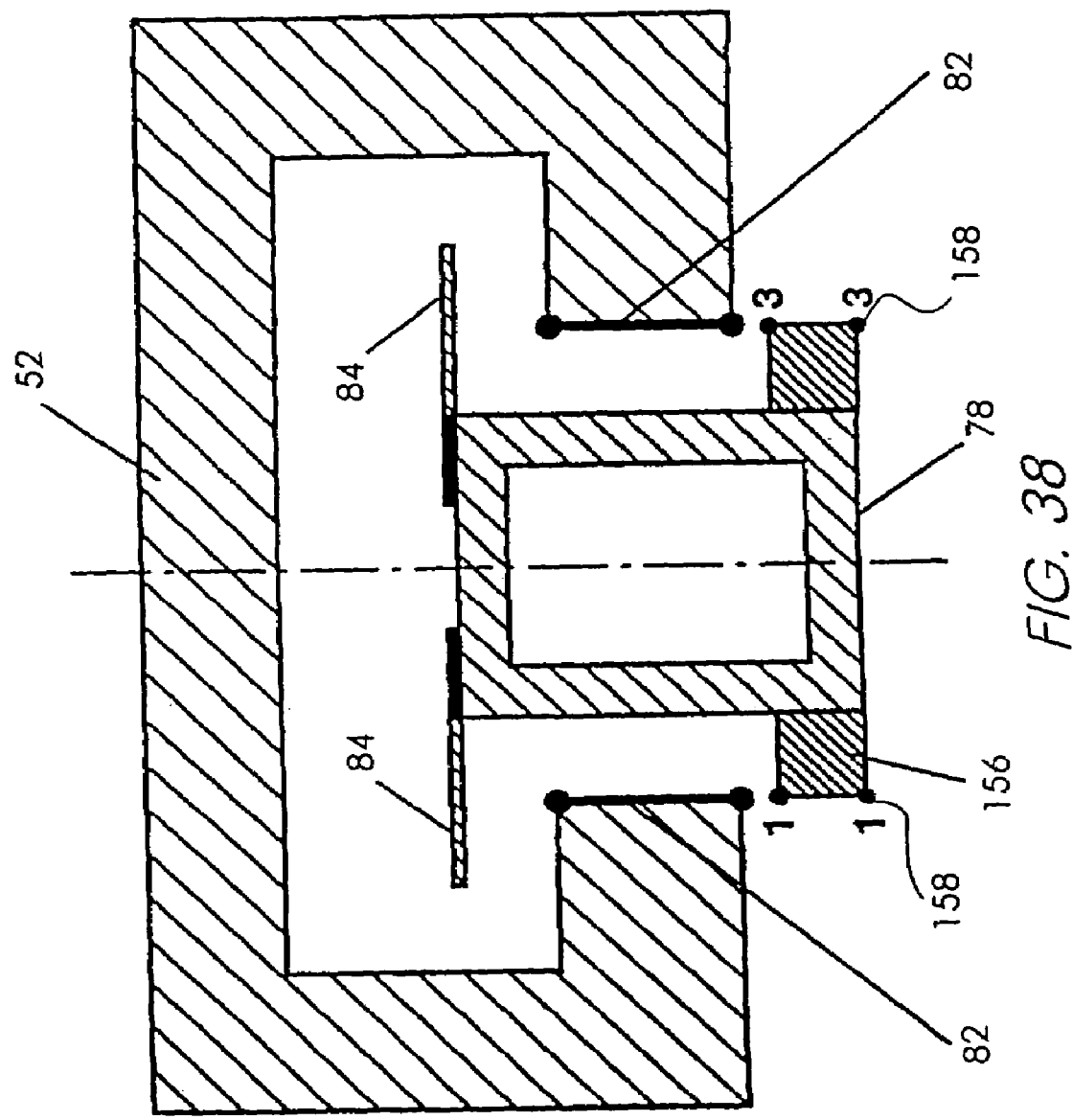
FIG. 38 is a cross-sectional view illustrating the iron lift and inductive loop arrangement of the system of the invention for electrical power storage and delivery.
Figure 39:
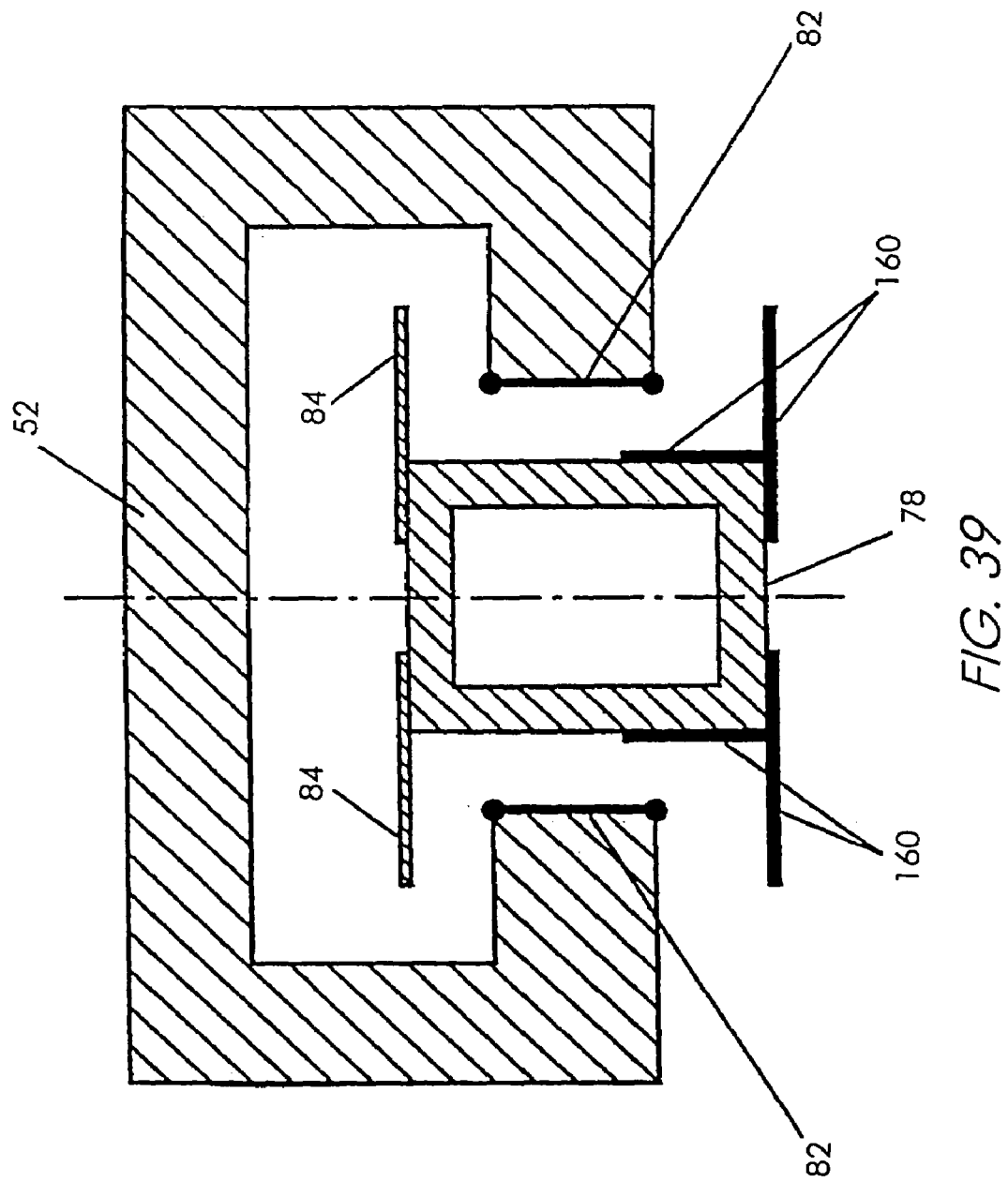
FIG. 39 is a cross-sectional view illustrating the iron lift and conducting sheet arrangement of the system of the invention for electrical power storage and delivery.

FIGS. 38 and 39 show two alternate designs to the baseline design for the narrow beam guideway. The design in FIG. 38 provides for an attached support structure 156 for (1-1) and (3-3) guideway dipole loops 158. The design in FIG. 39 uses the iron lift plates positioned to provide lateral stability instead of null flux dipole loops. If the vehicle moves either left or right laterally due to an external force, the iron plates generate an equal and opposite force to move the vehicle back to its equilibrium lateral position.

The iron plate suspension is not stable vertically, however. The inductive loops at the bottom of the narrow beam provide vertical stability, instead of the null flux Figure of 8 loops. If the vertical moves upwards or downwards due to an external force, the combination of lift forces from the iron lift plates, together with the lift forces from the inductive loops is stabilizing. That is, if the vehicle is pushed upwards, the lift force becomes smaller than the vehicle weight, causing it to return to its equilibrium position. If the vehicle is pushed downwards, the lift force becomes greater than the vehicle weight, causing it to return to its equilibrium position.

FIG. 39 shows a variant on the FIG. 38 design, in which the guideway inductive loops are replaced by conducting sheets 160, such as aluminum sheets, for example. It will behave like the inductive loop design, except that the $I^2R$ losses are greater with the conducting sheet design.

Figure 40:
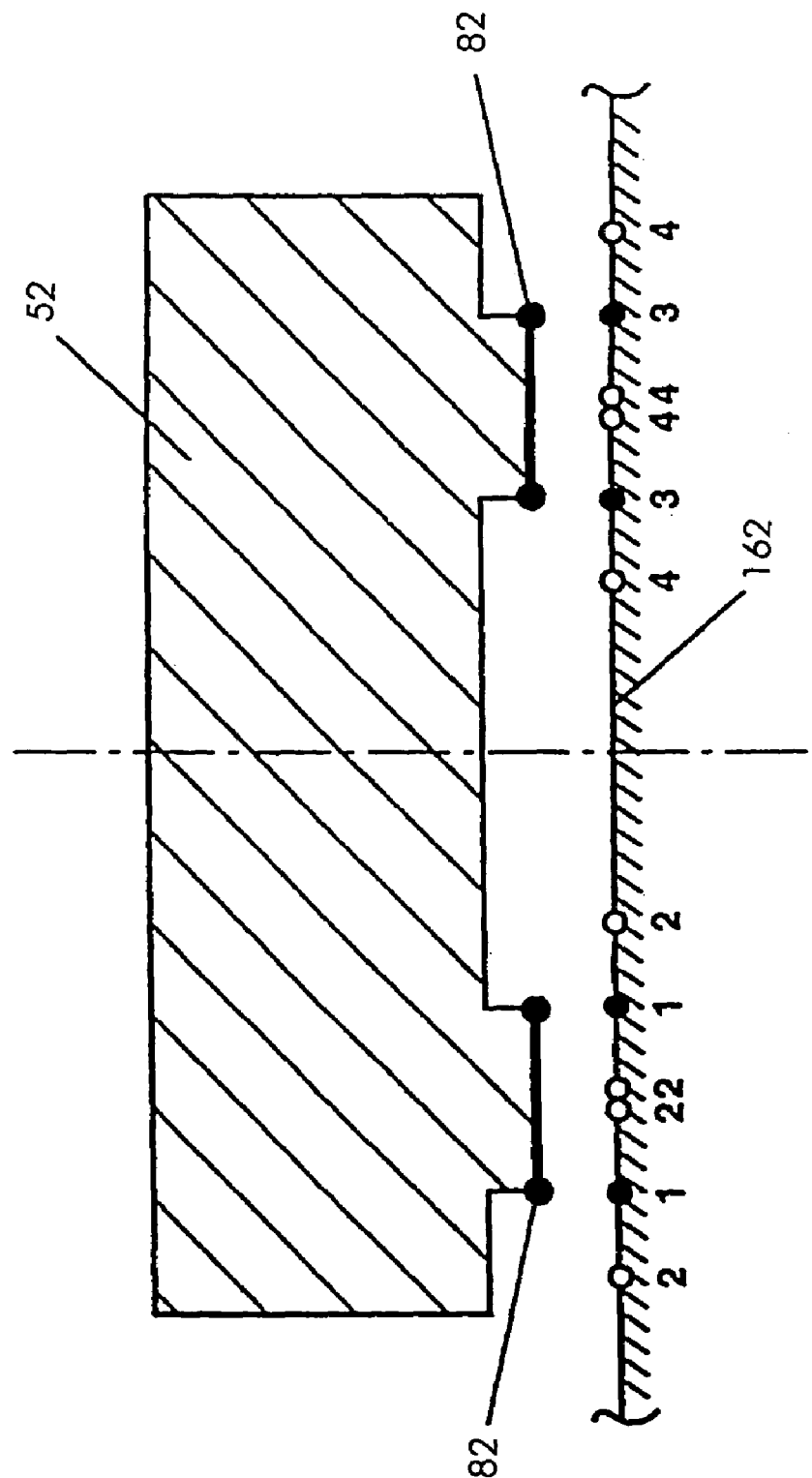
FIG. 40 is a schematic, sectional view illustrating an energy storage vehicle on a planar guideway.
Figure 41:
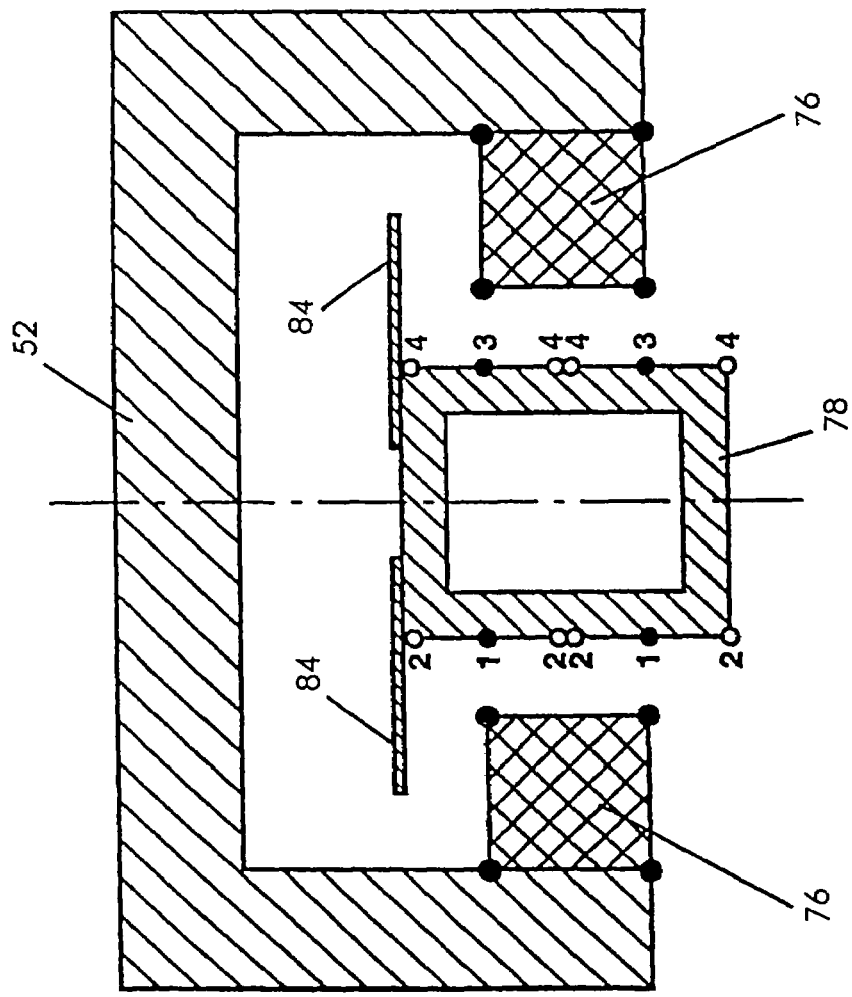
FIG. 41 is a schematic, sectional view illustrating an energy storage vehicle utilizing superconducting quadrupole magnet.

FIG. 40 shows a configuration for a planar guideway 162 for the system of the invention for electrical power storage and delivery while FIG. 41 shows a narrow beam configuration using superconducting quadrupole magnets on the vehicle instead of dipole. The quadrupole design would enable the vehicle to travel on, and transition between, both the narrow beam and planar guideways.

The technology for the system of the invention for electrical power storage and delivery can be used for other applications besides energy storage. One promising application is the upwards transport of mine ores from underground and open pit mines. In general, open pit mines would use angled surface guideways, while underground mines could use either angled underground tunnels or vertical shafts. In contrast to the system of the invention for electrical power storage and delivery, maglev mining systems would only transport the heavy masses upwards, and not upwards during electrical storage periods and downwards during electrical delivery periods.

A second difference between the system of the invention for electrical power storage and delivery and maglev mining is that the magnitude of the masses carried will be considerably smaller, e.g., 20 to 30 tons for mining compared to 100 tons for the system of the invention for electrical power storage and delivery. This greatly reduces the $I^2R$ losses in the propulsion windings, as well as the electric power needed to push the vehicles upwards.

EXAMPLE

Principal Parameters for Baseline maglev Mining System Using Angled Guideways 500 meter elevation change;

25 ton ore mass;

45 degree angle of inclination;

Either open pit surface or underground mine;

>90% electrical storage efficiency;

10 ton vehicle weight (unloaded);

35 ton gross vehicle (loaded);

30 meter/sec (67 mph) vehicle velocity;

60 seconds to load or unload vehicle;

20 round trips per hour for vehicles;

500 tons per hour capacity per vehicle;

Dipole loop magnets along each side of vehicle;

1 meter magnet pitch (distance between loops having same polarity);

30 hertz frequency in propulsion winding;

10 magnet pairs per vehicle (5 on each side);

Narrow beam guideway;

Iron plates above vehicle dipole loops provide vehicle lift force;

Figure of 8 null flux guideway loops provide vertical stability;

Dipole null flux guideway loops provide lateral stability; and

A 30 hertz propulsion winding acts as motor to propel loaded vehicle up the guideway.

The example above gives the principal parameters for a baseline maglev mining system using energy storage vehicles according to the system of the invention for electrical power storage and delivery on an inclined guideway. The example below give the principal parameters for a baseline maglev mining system using energy storage vehicles according to the system of the invention for electrical power storage and delivery on a vertical shaft guideway.

EXAMPLE

Principal Parameters for Baseline maglev Mining System Using Vertical Shaft Guideway 2000 meter elevation change;
25 ton ore mass;
90 degree angle of elevation;
Below surface;
10 ton vehicle weight (unloaded);
35 ton vehicle weight (loaded);
30 meters/sec (67 mph);
10 round trips per hour for vehicle;
100 seconds to load or unload vehicle;
Dipole loop magnets along each side of vehicle;
1 meter magnet pitch (distance between loops of same polarity);
10 magnet pairs per vehicle (5 on each side);
0.5 meter loop width; and
A 30 hertz propulsion winding acts as motor to propel loaded vehicle up the shaft.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. A method for generation of electrical energy, comprising the steps of:
    a) providing at least one magnetic levitation vehicle;
    b) providing a vertically oriented magnetic levitation guideway for the at least one magnetic levitation vehicle, the magnetic levitation guideway extending between an elevated upper end and a lower end at a lower elevation, the magnetic levitation guideway having a plurality of magnetic propulsion windings for propulsion of the at least one magnetic levitation vehicle;
    c) loading a storage mass on the at least one magnetic levitation vehicle;
    d) moving the at least one magnetic levitation vehicle from the elevated upper end of the magnetic levitation guideway to the lower end of the magnetic levitation guideway to generate electrical energy through the propulsion windings of the magnetic levitation guideway;
    e) powering said magnetic propulsion windings by electricity from a regional electrical power grid; and
    f) delivering said electrical energy generated through said propulsion windings to said regional electrical power grid.

2. The method of claim 1, further comprising the step of unloading the storage mass from the at least one magnetic levitation vehicle at the lower end of the magnetic levitation guideway.

3. The method of claim 2, further comprising the step of moving the unloaded at least one magnetic levitation vehicle from the lower end of the magnetic levitation guideway to the upper end of the magnetic levitation guideway.

4. The method of claim 3, further comprising repeating steps c) and d).

5. The method of claim 1, wherein at least a portion of said magnetic levitation guideway is disposed in a subsurface tunnel.

6. A method for generation of electrical energy, comprising the steps of:
    providing at least one magnetic levitation vehicle;
    providing a vertically oriented magnetic levitation guideway for the at least one magnetic levitation vehicle, the magnetic levitation guideway extending between an elevated upper end and a lower end at a lower elevation, the magnetic levitation guideway having a plurality of magnetic propulsion windings for propulsion of the at least one magnetic levitation vehicle;
    loading at least one storage mass on the at least one magnetic levitation vehicle at the lower end of the magnetic levitation guideway;
    propelling the at least one magnetic levitation vehicle with the at least one storage mass from the lower end of the magnetic levitation guideway to the upper end of the magnetic levitation guideway;
    unloading the at least one storage mass from the at least one magnetic levitation vehicle at the upper end of the magnetic levitation guideway to store gravitational potential energy;
    powering said magnetic propulsion windings by electricity from a regional electrical power grid; and
    delivering electrical energy generated through said propulsion windings to said regional electrical power grid.

7. The method of claim 6, further comprising the step of moving the at least one magnetic levitation vehicle from the elevated upper end of the magnetic levitation guideway to the lower end of the magnetic levitation guideway to convert the gravitational potential energy to electrical power through the propulsion windings of the magnetic levitation guideway.

8. The method of claim 6, wherein at least a portion of said magnetic levitation guideway is disposed in a subsurface tunnel.

9. A system for generation of electrical energy, comprising:
    at least one magnetic levitation vehicle to transport a storage mass;
    a vertically oriented magnetic levitation guideway for the at least one magnetic levitation vehicle, the magnetic levitation guideway extending between an elevated upper end and a lower end at a lower elevation, the magnetic levitation guideway having a plurality of magnetic propulsion windings for propulsion of the at least one magnetic levitation vehicle;
    means for moving the at least one magnetic levitation vehicle from the elevated upper end of the magnetic levitation guideway to the lower end of the magnetic levitation guideway to generate electrical energy through the propulsion windings of the magnetic levitation guideway;
    means for delivering electrical power from a regional electrical power grid to power the propulsion windings; and
    means for delivering the electrical energy generated through the propulsion windings to the regional electrical power grid.

10. The system of claim 9, wherein at least a portion of said magnetic levitation guideway is disposed in a subsurface tunnel.

11. A system for generation of electrical energy, comprising the steps of:
    at least one magnetic levitation vehicle;
    a vertically oriented magnetic levitation guideway for the at least one magnetic levitation vehicle, the magnetic levitation guideway extending between an elevated upper end and a lower end at a lower elevation, the magnetic levitation guideway having a plurality of magnetic propulsion windings for propulsion of the at least one magnetic levitation vehicle;

means for loading at least one storage mass on the at least one magnetic levitation vehicle at the lower end of the magnetic levitation guideway;

said magnetic propulsion windings provided for propelling the at least one magnetic levitation vehicle with the at least one storage mass from the lower end of the magnetic levitation guideway to the upper end of the magnetic levitation guideway;

means for unloading the at least one storage mass from the at least one magnetic levitation vehicle at the upper end of the magnetic levitation guideway to store gravitational potential energy;

means for moving the at least one magnetic levitation vehicle from the elevated upper end of the magnetic levitation guideway to the lower end of the magnetic levitation guideway to convert the gravitational potential energy to electrical power though the propulsion windings of the magnetic levitation guideway;

means for delivering electrical power from a regional electrical power grid to power the propulsion windings; and means for delivering the electrical power converted through the propulsion windings to the regional electrical power grid.

12. The system of claim 11, wherein at least a portion of said magnetic levitation guideway is disposed in a subsurface tunnel.

* * * * *

UNITED STATES PATENT AND TRADEMARK OFFICE
CERTIFICATE OF CORRECTION

PATENT NO. : 6,990,906 B2
APPLICATION NO. : 10/473314
DATED : January 31, 2006
INVENTOR(S) : James Russell Powell Page 1 of 1

It is certified that error appears in the above-identified patent and that said Letters Patent is hereby corrected as shown below:

Column 8,
Line 39, after "New York" insert --,-- (a comma).

Column 10,
Line 39, delete "iron left" and insert --iron lift--.

Column 25,
Line 27, after "and the like" insert --.-- (a period).

Column 32,
Line 3, delete "though" and insert --through--.

Signed and Sealed this

Twenty-fifth Day of July, 2006

JON W. DUDAS
*Director of the United States Patent and Trademark Office*